US012396914B2

(12) United States Patent
Cumella

(10) Patent No.: US 12,396,914 B2
(45) Date of Patent: Aug. 26, 2025

(54) PERSONAL MOBILITY SYSTEM

(71) Applicant: E.B. MOBILITY HOLDINGS LLC, Somerville, MA (US)

(72) Inventor: Matthew T. Cumella, Cambridge, MA (US)

(73) Assignee: Nuvio, Inc., Cambridge, MA (US)

( * ) Notice: Subject to any disclaimer, the term of this patent is extended or adjusted under 35 U.S.C. 154(b) by 308 days.

(21) Appl. No.: 18/000,915

(22) PCT Filed: Jun. 11, 2021

(86) PCT No.: PCT/US2021/037132
§ 371 (c)(1),
(2) Date: Dec. 6, 2022

(87) PCT Pub. No.: WO2021/252985
PCT Pub. Date: Dec. 16, 2021

(65) Prior Publication Data

US 2023/0218470 A1 Jul. 13, 2023

Related U.S. Application Data

(60) Provisional application No. 63/037,823, filed on Jun. 11, 2020, provisional application No. 63/077,120,
(Continued)

(51) Int. Cl.
*A61H 3/04* (2006.01)
*A61G 5/14* (2006.01)

(52) U.S. Cl.
CPC ................. *A61H 3/04* (2013.01); *A61G 5/14* (2013.01); *A61H 2201/0192* (2013.01); *A61H 2201/1633* (2013.01); *A61H 2201/1635* (2013.01)

(58) Field of Classification Search
CPC .............. A61H 3/04; A61H 2201/0192; A61H 2201/1633; A61H 2201/1635; A61G 5/14
See application file for complete search history.

(56) References Cited

U.S. PATENT DOCUMENTS 7,150,722 B1 * 12/2006 Tyrrell .................. A61H 3/008 602/26
9,687,411 B2 * 6/2017 Chen ........................ A61H 3/00
(Continued)

*Primary Examiner* — Erez Gurari
(74) *Attorney, Agent, or Firm* — Law Office of Matthew M. Yospin; Matthew M. Yospin

(57) ABSTRACT

A personal mobility system with multiple adjustments is presented. The personal mobility system may comprise one or more elastic stabilizer mechanisms. The adjustments may comprise a telescoping adjustment system for multiple handles, to adjust height and position of handles. The personal mobility system presents handles at a variety of positions, and of different types, to assist a user in moving from sitting to standing to walking, and to and from other positions, and presents a seat. The personal mobility system with elastic stabilizer mechanisms stabilizes the system against tipping over, improving user safety by reducing the occurrence of tips and falls. The elastic stabilizer mechanisms may be engaged by all handles and grip surfaces, or by a subset thereof, of the personal mobility system when a user begins to tip. The personal mobility system presents improvements in folding, convenience, and useability.

19 Claims, 34 Drawing Sheets

Related U.S. Application Data filed on Sep. 11, 2020, provisional application No. 63/130,571, filed on Dec. 24, 2020, provisional application No. 63/143,864, filed on Jan. 31, 2021.

(56) References Cited

U.S. PATENT DOCUMENTS

| | | | | |
|---|---|---|---|---|
| 10,639,226 | B1 * | 5/2020 | Keyes | A61H 3/04 |
| 11,648,170 | B1 * | 5/2023 | Abrahamson | F16C 1/18<br>280/47.34 |
| 2007/0023073 | A1 * | 2/2007 | Su | A61H 3/04<br>482/68 |
| 2007/0267835 | A1 * | 11/2007 | Huang | A61H 3/04<br>280/87.05 |
| 2008/0047785 | A1 * | 2/2008 | Huang | A61H 3/04<br>188/24.18 |
| 2014/0265256 | A1 * | 9/2014 | Rothstein | B62B 5/0466<br>280/651 |
| 2016/0151230 | A1 * | 6/2016 | Bagheri | A61H 3/008<br>280/87.041 |
| 2019/0105221 | A1 * | 4/2019 | Pan | A61G 5/08 |
| 2020/0246210 | A1 * | 8/2020 | Brodie | A61H 3/00 |
| 2020/0397643 | A1 * | 12/2020 | Bailey | A61H 3/04 |
| 2022/0211568 | A1 * | 7/2022 | AlGhazi | A61B 5/1117 |

* cited by examiner

PERSONAL MOBILITY SYSTEM

CROSS-REFERENCE TO RELATED APPLICATIONS

This application claims the benefit of U.S. Provisional Patent Application No. 63/143,864, filed Jan. 31, 2021, which is incorporated by reference herein in its entirety. This application claims the benefit of U.S. Provisional Patent Application No. 63/130,571, filed Dec. 24, 2020, which is incorporated by reference herein in its entirety. This application claims the benefit of U.S. Provisional Patent Application No. 63/077,120, filed Sep. 11, 2020, which is incorporated by reference herein in its entirety. This application claims the benefit of U.S. Provisional Patent Application No. 63/037,823, filed Jun. 11, 2020, which is incorporated by reference herein in its entirety. This application claims the benefit of PCT Patent Application PCT/US21/37132, filed Jun. 11, 2021, which is incorporated by reference herein in its entirety.

FIELD OF THE DISCLOSURE

The present disclosure relates generally to a personal mobility device. More specifically, and without limitation, the present disclosure relates to a personal mobility system with integrated standing and movement assistance features and components. However, the present disclosure is not limited to these novel and inventive systems and improvements and methods of use, and it may further be adapted for a variety of purposes.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright Nuvio, Inc. All rights reserved.

BACKGROUND OF THE DISCLOSURE

The present disclosure relates generally to forward mobility devices. The present disclosure relates to personal mobility devices for support during forward and lateral mobility and the like. Additionally, the present disclosure relates generally to a mobility system which also provides standing support to engage the system. More specifically, and without limitation, the present disclosure relates to a personal mobility system with an integrated movement structure and various design features. Additionally, and without limitation, the present disclosure is a device which provides flexibility in use, functionality, and appearance improvements to the state of the art. However, the present disclosure is not limited to these novel and inventive improvements, and it may further be adapted for a variety of purposes.

A disruption of mobility in any individual or user is often caused by any number of conditions, and commonly occurs in advanced aging. Individuals that are hindered by mobility limitations benefit from some type of assistance. This assistance can aid in movement for an individual and thus an improved lifestyle. The current state of the art is not devoid of mobility devices.

Mobility devices are well-known in the art. There exist a number of mobility devices in the art. Such devices and apparatus are generally referred to as "walkers". Along with the number of walkers which exist in the art come a great number of issues with existing walkers and long-felt needs in the art. Modern walkers lack stabilization and are also difficult for users to access whether standing or sitting. There has never been an easy or simple solution to these problems. Additionally, existing walkers do not provide for good posture or ease of use. Thus, modern walkers struggle to aid a user with a normal gait, normal posture, or a combination of these features while providing accessibility for the walker itself.

More specifically, a walker, or walker frame is a mobility device that serves injured, disabled, unsteady, or unstabilized users that may need additional support for walking and/or standing. The historical design of known walkers consists of a metal frame that is slightly wider than a user. These known walkers are positioned with handles at both sides. This requires the user's hands to be positioned at each of their sides. This can present difficulty in the operation of using the walker. During the time when a user wishes to provide support, the user must press downward, in an uncommon motion which also lacks strength. Furthermore, the requirement on a user in stabilizing the walker in this way can make moving the walker forward, and proceeding forward in direction, very difficult.

Many other problems exist with modern walkers. Modern walkers also make stepping, or normal gaits difficult, modern walkers make it difficult for a user to place one foot in front of another, and additionally are limited in support and functionality. One example of such limitations is the ability to access the walker. From a standing position, accessing the walker may prove difficult if engaged from the wrong direction. Additionally, accessing the walker from a seated position is also very difficult as the walker sides are too high for a seated user to reach and pull themselves up on.

Said another way, the common walker has gone largely unchanged for several decades. The typical walker, although inadequate, is intuitive and well-known to users such that users have seen this technology and its method of use. For this reason, although the walker has many issues, it continues to be used. In summary, and without limitations, some of the issues facing the art are instability and unsuitable support for a user, especially a user with low strength levels; compounded on this issue is when a user wishes to move to a standing or sitting position, the state of the art does not solve this issue and generally requires additional stand-alone tools or technology. Additionally, the state of the art has not addressed uneven surfaces, surface changes, sidewalk cracks, grooves, tile grooves of common flooring, or carpet.

Thus, there is a need in the art for a more sophisticated, accessible mobility device. The art is in need of a more stabilized mobility device, which not only provides for stabilization in the process of walking, but also provides an ease for standing and mobility functions. Additionally, there exists a long-felt need in the art for a more improved standing aid and mobility accessible device.

The present disclosure solves these problems as well as a host of other problems with modern mobility devices. The present disclosure combines unique physics with innovative design to achieve these goals which are long-felt in the state of the art and more. Thus, it is a primary objective of the present disclosure to provide a lightweight, comfortable mobility device capable of holding its position. Furthermore, it is the primary object of this disclosure to provide a mobility device with an integrated standing and sitting feature that provides stability and support while engaging in movement activities other than walking. Furthermore, it is a primary objective to provide a mobility device that provides demonstrated physics and physics usage to create a more stable, safe, and easy to use design. This is a complex challenge that the present disclosure provides solutions to. Thus, it is a primary object of the disclosure to provide a mobility device that is comfortable, stable, provides injury prevention, is aesthetically pleasing, is functional, reusable, easy to use, safe, and more. The present disclosure is directed toward providing these solutions and more.

SUMMARY OF THE DISCLOSURE

The purpose of this disclosure is to provide the state of the art with a mobility system which provides for increased functionality, flexibility, safety, and more. Said another way, the purpose of this disclosure solves many problems that exist in the state of the art as well as a host of other problems with modern mobility devices. The present disclosure combines unique physics with innovative design to achieve these goals which are long-felt in the state of the art and more. Thus, it is a primary objective of the present disclosure to provide a lightweight, comfortable mobility device capable of holding its position.

Furthermore, it is the primary object of this disclosure to provide a mobility device with an integrated standing and sitting feature that provides stability and support while engaging in movement activities other than walking. Furthermore, it is a primary objective to provide a mobility device that provides demonstrated physics and physics usage to create a more stable, safe, and easy to use design. This is a complex challenge that the present disclosure provides solutions to. Thus, it is a primary object of the disclosure to provide a mobility device that is comfortable, stable, provides injury prevention, is aesthetically pleasing, is functional, reusable, easy to use, safe, and more. The present disclosure is directed toward providing these solutions and more.

In combination with convenience, appearance, ease of use, enhanced method of use, longevity for lack of reduction of the supporting materials, the present disclosure offers a health solution and mechanics solution, along with innovations to those existing in the art. Many long-felt needs in the art, which prevents a user, needing or wanting a mobility device, but not using a mobility device due to a lack of functionality, appearance, choice, stability, trust, and loss of appearance qualities of existing walkers. Furthermore, the present disclosure provides a mass producible solution to providing a relatively affordable mobility option within the intuitive range of mobility devices, along with the other features and components herein.

In one aspect, the present disclosure comprises a personal mobility system which comprises a main body, wherein the main body further comprises a plurality of vertical main supports and wherein the main body further comprises a plurality of body lower arms, wherein each of the plurality of body lower arms comprises a lower arm proximal end and a lower arm distal end; and the personal mobility system comprising a plurality of elastic stabilizer mechanisms, wherein the plurality of elastic stabilizer mechanisms further comprises a plurality of elastic deformation components, a plurality of ground-elastic attachment components, a plurality of ground units, and a plurality of ground-main rotational joints; and wherein each of the plurality of ground units comprises a ground unit proximal end and a ground unit distal end; and wherein each of the plurality of ground units and the plurality of body lower arms engage together in an approximate area of their respective proximal ends, forming and being engaged together at and with a plurality of ground-main rotational joints; and wherein each of the plurality of ground units and the plurality of body lower arms engage together in an approximate area of their respective distal ends, at or with the plurality of elastic deformation components.

In one aspect, the present disclosure comprises a personal mobility system which comprises a plurality of elevation assistance components; wherein the plurality of elevation assistance components further comprises a plurality of vertical elevation supports and further comprises a plurality of elevation handles.

In one aspect, the present disclosure comprises a personal mobility system which comprises a main body further comprises a plurality of main handles, and wherein the plurality of main handles further comprises a plurality of primary grip regions.

In one aspect, the present disclosure comprises a personal mobility system which further comprises a plurality of telescoping handle mechanisms, and wherein the plurality of telescoping handle mechanisms may adjust at least one position of the plurality of main handles and/or the plurality of elevation handles.

In one aspect, the present disclosure comprises a personal mobility system in which the plurality of elevation assistance components further comprises a plurality of ground support components.

In one aspect, the present disclosure comprises a personal mobility system in which the main body further comprises a plurality of ground support components.

In one aspect, the present disclosure comprises a personal mobility system in which the personal mobility system further comprises a plurality of locomotion components.

In one aspect, the present disclosure comprises a personal mobility system which comprises a main body, wherein the main body further comprises a plurality of vertical main supports; a plurality of elevation assistance components; wherein the plurality of elevation assistance components further comprises a plurality of vertical elevation supports and further comprises a plurality of elevation handles; and a plurality of elastic stabilizer mechanisms.

In one aspect, the present disclosure comprises a personal mobility system in which the main body further comprises a plurality of main handles, and wherein the plurality of main handles further comprises a plurality of primary grip regions.

In one aspect, the present disclosure comprises a personal mobility system in which the personal mobility system further comprises a plurality of telescoping handle mechanisms, and wherein the plurality of telescoping handle mechanisms may adjust at least one position of the plurality of main handles and/or the plurality of elevation handles.

In one aspect, the present disclosure comprises a personal mobility system in which the main body further comprises a plurality of horizontal main supports.

In one aspect, the present disclosure comprises a personal mobility system in which the personal mobility system further comprises a seat, wherein the seat is rotatably affixed to the main body at a plurality of seat attachments.

In one aspect, the present disclosure comprises a personal mobility system in which the personal mobility system further comprises a plurality of locomotion components.

In one aspect, the present disclosure comprises a personal mobility system in which the plurality of elevation assistance components further comprises a plurality of horizontal-elevation-supports.

In one aspect, the present disclosure comprises a personal mobility system in which the main body further comprises a plurality of ground support components.

In one aspect, the present disclosure comprises a personal mobility system in which the plurality of ground support components further comprises a plurality of stabilizer pads.

In one aspect, the present disclosure comprises a personal mobility system in which the plurality of elevation assistance components further comprises a plurality of ground support components.

In one aspect, the present disclosure comprises a personal mobility system in which the plurality of elastic stabilizer mechanisms further comprises a plurality of elastic deformation components, a plurality of ground-elastic attachment components, a plurality of ground units, and a plurality of ground-main rotational joints; and wherein each of the plurality of ground units comprises a ground unit proximal end and a ground unit distal end; and wherein the main body further comprises a plurality of body lower arms, wherein each of the plurality of body lower arms comprises a lower arm proximal end and a lower arm distal end; and wherein each of the plurality of ground units and the plurality of body lower arms engage together in an approximate area of their respective distal ends, at or with the plurality of elastic deformation components.

In one aspect, the present disclosure comprises a personal mobility system which comprises a main body, wherein the main body further comprises a plurality of vertical main supports and wherein the main body further comprises a plurality of body lower arms, wherein each of the plurality of body lower arms comprises a lower arm proximal end and a lower arm distal end; and wherein the main body further comprises a plurality of main handles; a plurality of elastic stabilizer mechanisms, wherein the plurality of elastic stabilizer mechanisms further comprises a plurality of elastic deformation components, a plurality of ground-elastic attachment components, a plurality of ground units, and a plurality of ground-main rotational joints; and wherein each of the plurality of ground units comprises a ground unit proximal end and a ground unit distal end; and a plurality of elevation assistance components; wherein the plurality of elevation assistance components further comprises a plurality of vertical elevation supports and further comprises a plurality of elevation handles.

In one aspect, the present disclosure comprises a personal mobility system in which the personal mobility system further comprises a plurality of telescoping handle mechanisms, and wherein the plurality of telescoping handle mechanisms may adjust at least one position of the plurality of main handles and/or the plurality of elevation handles.

In one aspect, the present disclosure comprises a personal mobility system, comprising a main body, wherein the main body further comprises a plurality of vertical main supports; a plurality of elevation assistance components; wherein the plurality of elevation assistance components further comprises a plurality of vertical elevation supports and further comprises a plurality of elevation handles; and a plurality of main-elevation-horizontal-supports, wherein the plurality of main-elevation-horizontal-supports affix the plurality of vertical main supports and the plurality of vertical elevation supports to each other.

In one aspect, the present disclosure comprises a personal mobility system, wherein the personal mobility system can fold, and wherein when the personal mobility system is folded, the personal mobility system is vertically stable.

In one aspect, the present disclosure comprises a personal mobility system, wherein the personal mobility system further comprises a plurality of locomotion components; and wherein the personal mobility system can fold, and wherein when the personal mobility system is folded, the personal mobility system can roll on the plurality of locomotion components with a zero-turning radius.

In one aspect, the present disclosure comprises a personal mobility system, wherein the plurality of main-elevation-horizontal-supports further comprise a plurality of elastic stabilizer mechanisms.

In one aspect, the present disclosure comprises a personal mobility system, wherein the personal mobility system further comprises a plurality of braking components; and wherein the plurality of braking components comprises a plurality of handbrake levers, a plurality of handbrake cables, and a plurality of brake shoes.

In one aspect, the present disclosure comprises a personal mobility system, wherein the personal mobility system further comprises a plurality of horizontal main supports.

In one aspect, the present disclosure comprises a personal mobility system, wherein the personal mobility system further comprises a seat, and wherein the seat is rotatably affixed to the plurality of horizontal main supports with a plurality of seat attachments, such that the seat can be raised to an upright position and can be lowered to a horizontal position, and wherein the seat folds to a vertical or stowed position by being rotated towards a front of the personal mobility system.

Through a solution that incorporates convenience, health, gait, chiropractic, comfort, overall health, injury prevention, stabilization advantages and more, along with functionality advantages, as well as proper deployment, the disclosure herein presents a much improved, novel, and needed mobility device solution.

Thus, it is a primary object of the disclosure to provide a personal mobility system and methods of use that improves upon the state of the art. Another object of the disclosure is to provide a personal mobility system and methods of use that provides stability for a user. Yet another object of the disclosure is to provide a personal mobility system and methods of use that provides suitable support for a user. Another object of the disclosure is to provide a personal mobility system and methods of use that provides stabilization for a user when the user mobilizes from a seated position to a standing position. Yet another object of the disclosure is to provide a personal mobility system and methods of use that provides stabilization for a user when the user transitions from a standing position to a seated position. Another object of the disclosure is to provide a personal mobility system and methods of use that prevents tipping during operation. Yet another object of the disclosure is to provide a personal mobility system and methods of use that is tip preventative during a sitting action. Another object of the disclosure is to provide a personal mobility system and methods of use that is tip preventative during a standing action. Yet another object of the disclosure is to provide a personal mobility system and methods of use that provides a user a means to use hands for support during operation. Another object of the disclosure is to provide a personal mobility system and methods of use that provides a user a means to use hands for support during standing action. Yet another object of the disclosure is to provide a personal mobility system and methods of use that provides a user a means to use hands for support during a sitting action.

Another object of the disclosure is to provide a personal mobility system and methods of use that accepts basic household surface changes. Yet another object of the disclosure is to provide a personal mobility system and methods of use that accepts basic community surface changes. Another object of the disclosure is to provide a personal mobility system and methods of use that handles sidewalk cracks. Yet another object of the disclosure is to provide a personal mobility system and methods of use that handles grooves in tile with ease. Another object of the disclosure is to provide a personal mobility system and methods of use that handles grooves of tile and other obstructions with ease. Yet another object of the disclosure is to provide a personal mobility system and methods of use that works on carpeted surfaces with relative ease. Another object of the disclosure is to provide a personal mobility system and methods of use that is suitable for a wide spectrum of users. Yet another object of the disclosure is to provide a personal mobility system and methods of use that is adjustable for users of varying sizes. Another object of the disclosure is to provide a personal mobility system and methods of use that utilizes physics to improve performance. Yet another object of the disclosure is to provide a personal mobility system and methods of use that provides lower handholds. Another object of the disclosure is to provide a personal mobility system and methods of use that provides armrest extensions. Yet another object of the disclosure is to provide a personal mobility system and methods of use that provides a comprehensive walking, standing, and sitting mobility device. Another object of the disclosure is to provide a personal mobility system and methods of use that minimizes backwards tipping of a user.

Yet another object of the disclosure is to provide a personal mobility system and methods of use that minimizes backwards tipping of the device. Another object of the disclosure is to provide a personal mobility system and methods of use that eliminates backwards tipping for the mobility device. Yet another object of the disclosure is to provide a personal mobility system and methods of use that brakes without removing wheels from the ground. Another object of the disclosure is to provide a personal mobility system and methods of use that provides improved balance. Yet another object of the disclosure is to provide a personal mobility system and methods of use that provides for mitigation of feet leaving the ground. Another object of the disclosure is to provide a personal mobility system and methods of use that promotes the feet of a user to stay on the ground in the event of tipping. Yet another object of the disclosure is to provide a personal mobility system and methods of use that provides torsion springs. Another object of the disclosure is to provide a personal mobility system and methods of use that provides and addresses long-felt unmet needs of the existing state of the art. Yet another object of the disclosure is to provide a personal mobility system and methods of use that provides support during transfer scenarios. Another object of the disclosure is to provide a personal mobility system and methods of use that prevents tipping. Yet another object of the disclosure is to provide a personal mobility system and methods of use that aids a user in standing. Another object of the disclosure is to provide a personal mobility system and methods of use that is intuitive. Yet another object of the disclosure is to provide a personal mobility system and methods of use that is simple. Another object of the disclosure is to provide a personal mobility system and methods of use that is accessible. Yet another object of the disclosure is to provide a personal mobility system and methods of use that is portable. Another object of the disclosure is to provide a personal mobility system and methods of use that is universal. Yet another object of the disclosure is to provide a personal mobility system and methods of use that is adaptable. Another object of the disclosure is to provide a personal mobility system and methods of use that are modular. Yet another object of the disclosure is to provide a personal mobility system and methods of use that is sleek. Another object of the disclosure is to provide a personal mobility system and methods of use that is aesthetically pleasing. Yet another object of the disclosure is to provide a personal mobility system and methods of use that is user friendly.

Another object of the disclosure is to provide a personal mobility system and methods of use that is stable against both horizontal and vertical forces and any combination thereof. Yet another object of the disclosure is to provide a personal mobility system and methods of use that is lightweight. Another object of the disclosure is to provide a personal mobility system and methods of use that is easy to handle. Yet another object of the disclosure is to provide a personal mobility system and methods of use that provides for a retractable standing system. Another object of the disclosure is to provide a personal mobility system and methods of use that provides multiple handrail positions. Yet another object of the disclosure is to provide a personal mobility system and methods of use that provides for an optimized angle of orientation. Another object of the disclosure is to provide a personal mobility system and methods of use that provides an angle of orientation of 88 degrees. Yet another object of the disclosure is to provide a personal mobility system and methods of use that provides an angle of orientation between 70-75 degrees. Another object of the disclosure is to provide a personal mobility system and methods of use that provides for a plurality of anti-slip features. Yet another object of the disclosure is to provide a personal mobility system and methods of use that is easy to use. Another object of the disclosure is to provide a personal mobility system and methods of use that is safe. Yet another object of the disclosure is to provide a personal mobility system and methods of use that is robust. Another object of the disclosure is to provide a personal mobility system, telescoping adjustable handle system, and methods of use that provide for adjustment of users to varying heights and sizes. These and other objects, features, or advantages of the present disclosure will become apparent from the specification and claims.

BRIEF DESCRIPTION OF THE DRAWINGS

The foregoing summary, as well as the following detailed description of various aspects, is better understood when read in conjunction with the appended drawings. For the purposes of illustration, the drawings show exemplary aspects; but the presently disclosed subject matter is not limited to the specific methods and instrumentalities disclosed. In the drawings, like reference characters generally refer to the same components or steps of the device throughout the different figures. In the following detailed description, various aspects of the present disclosure are described with reference to the following drawings, in which.

DETAILED DESCRIPTION OF THE DISCLOSURE

Figure 1:
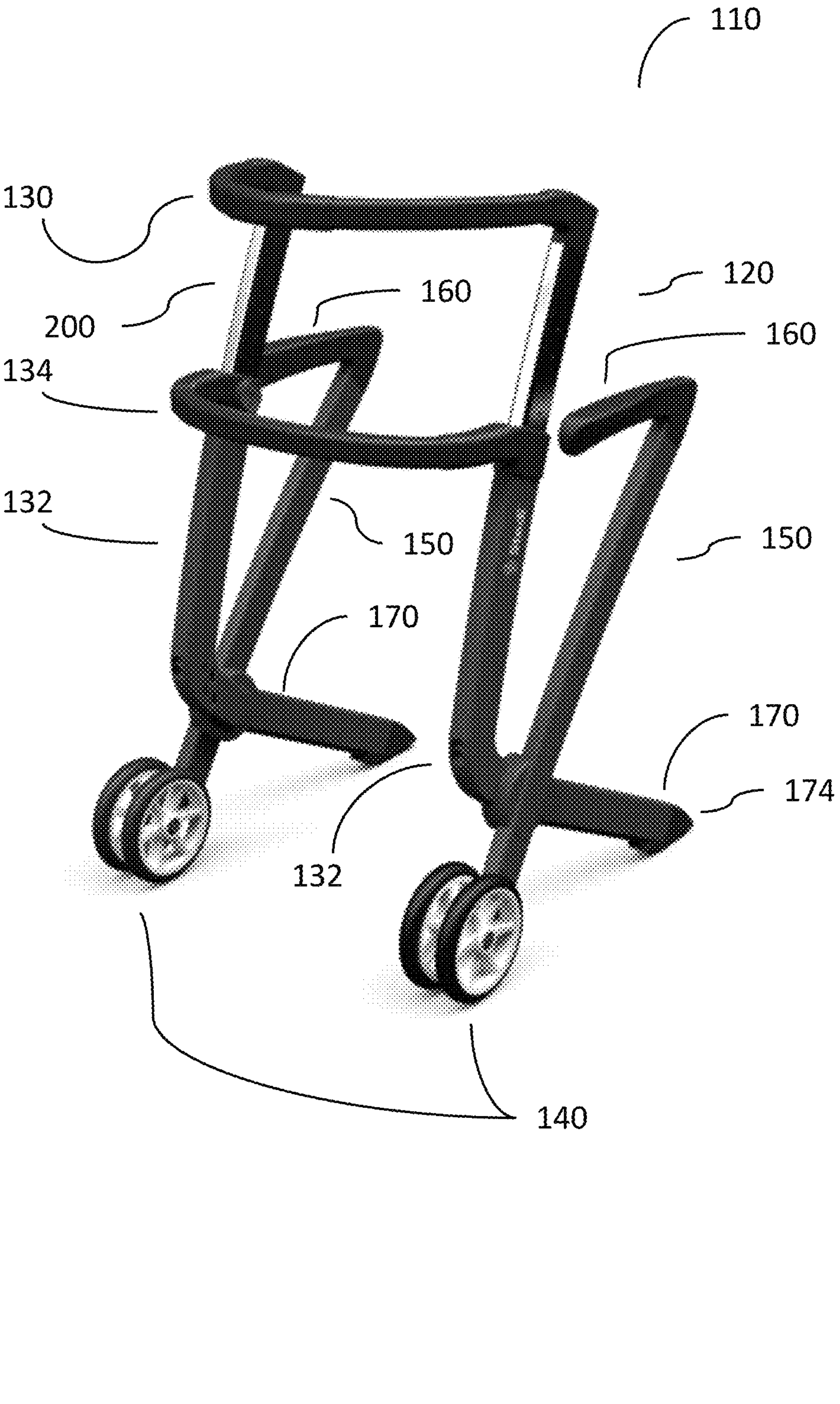
FIG. 1 shows a front and top perspective view of an aspect of the apparatus of the present disclosure.
Figure 2:
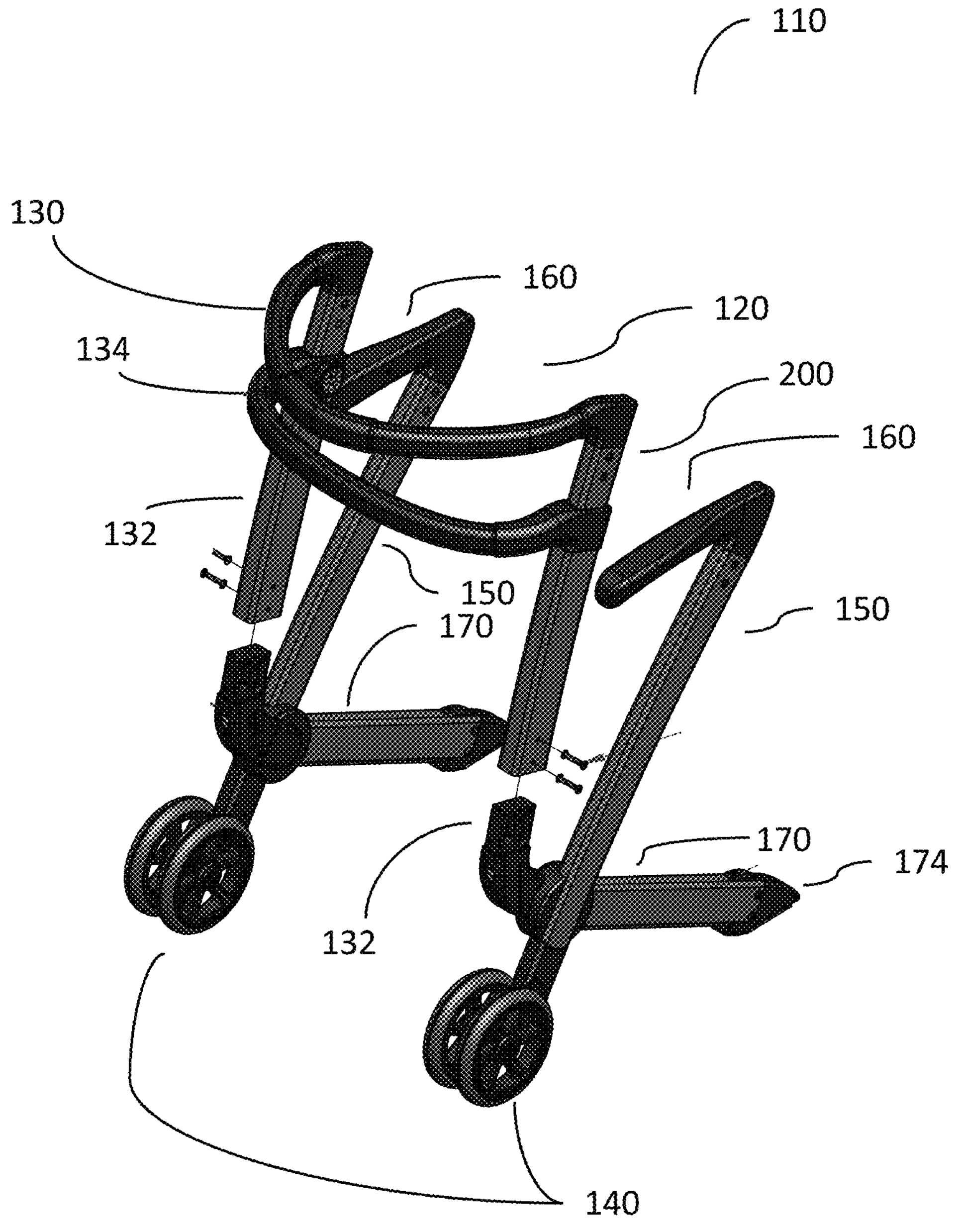
FIG. 2 shows an exploded front and top perspective view of an aspect of the apparatus of the present disclosure.
Figure 3:
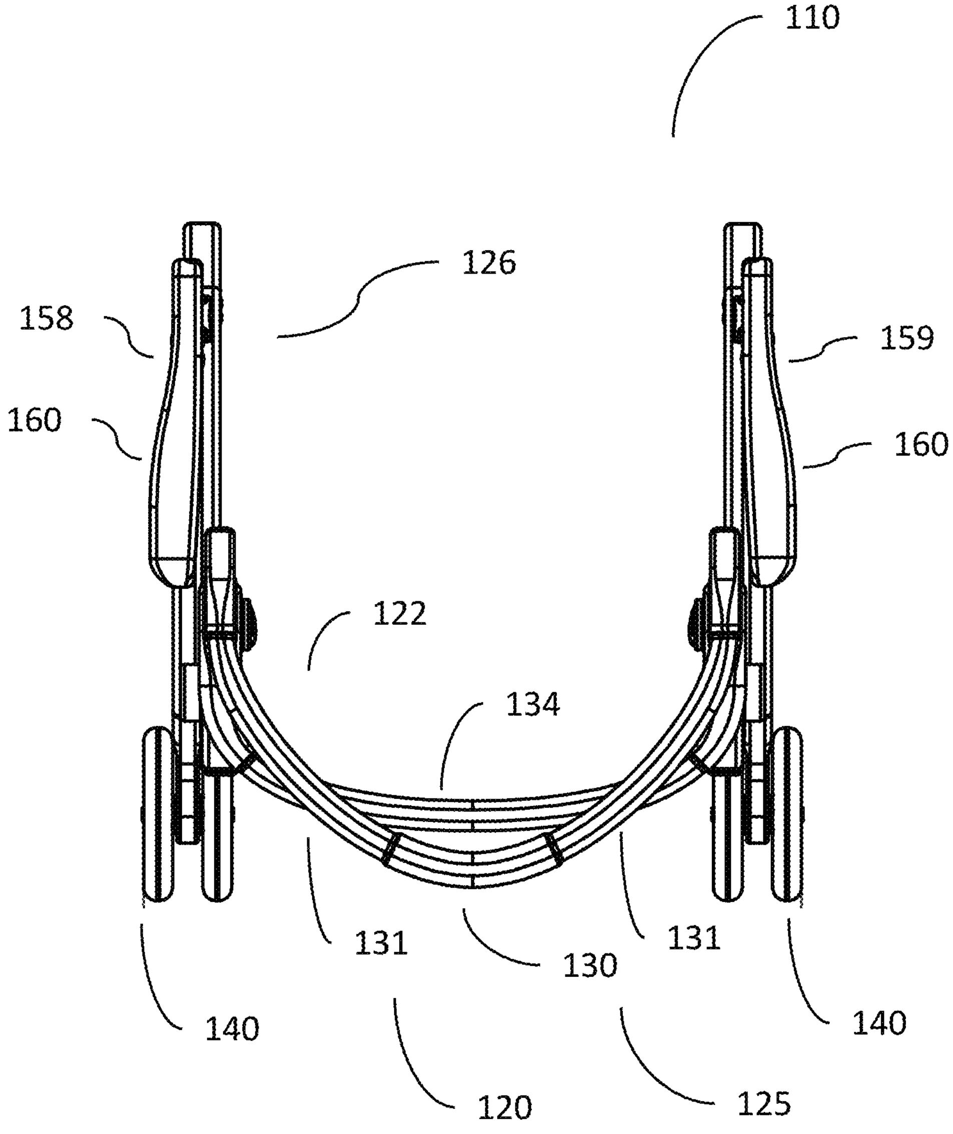
FIG. 3 shows a top plan view of an aspect of the apparatus of the present disclosure.
Figure 4:
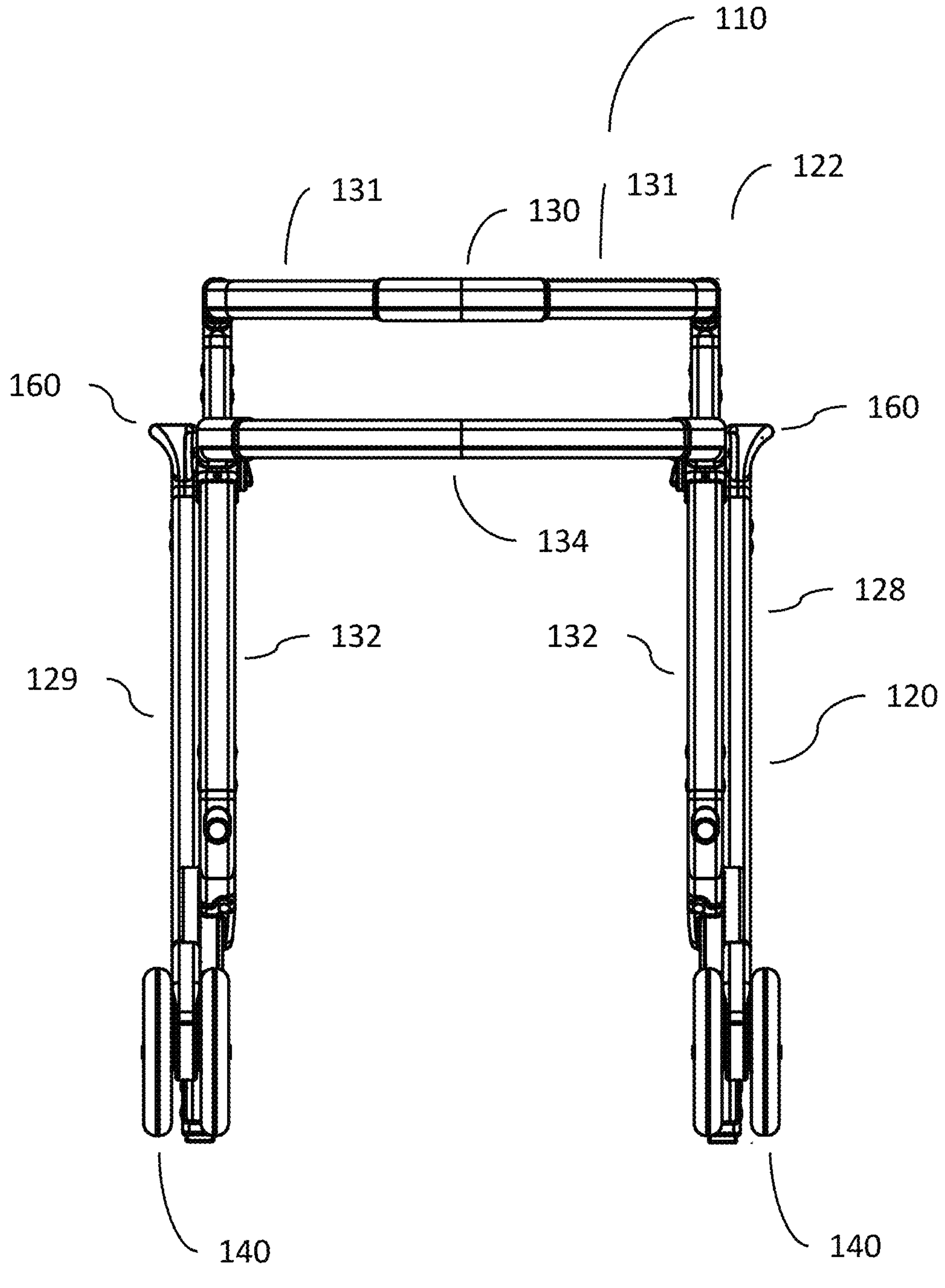
FIG. 4 shows a front elevation view of an aspect of the apparatus of the present disclosure.
Figure 5:
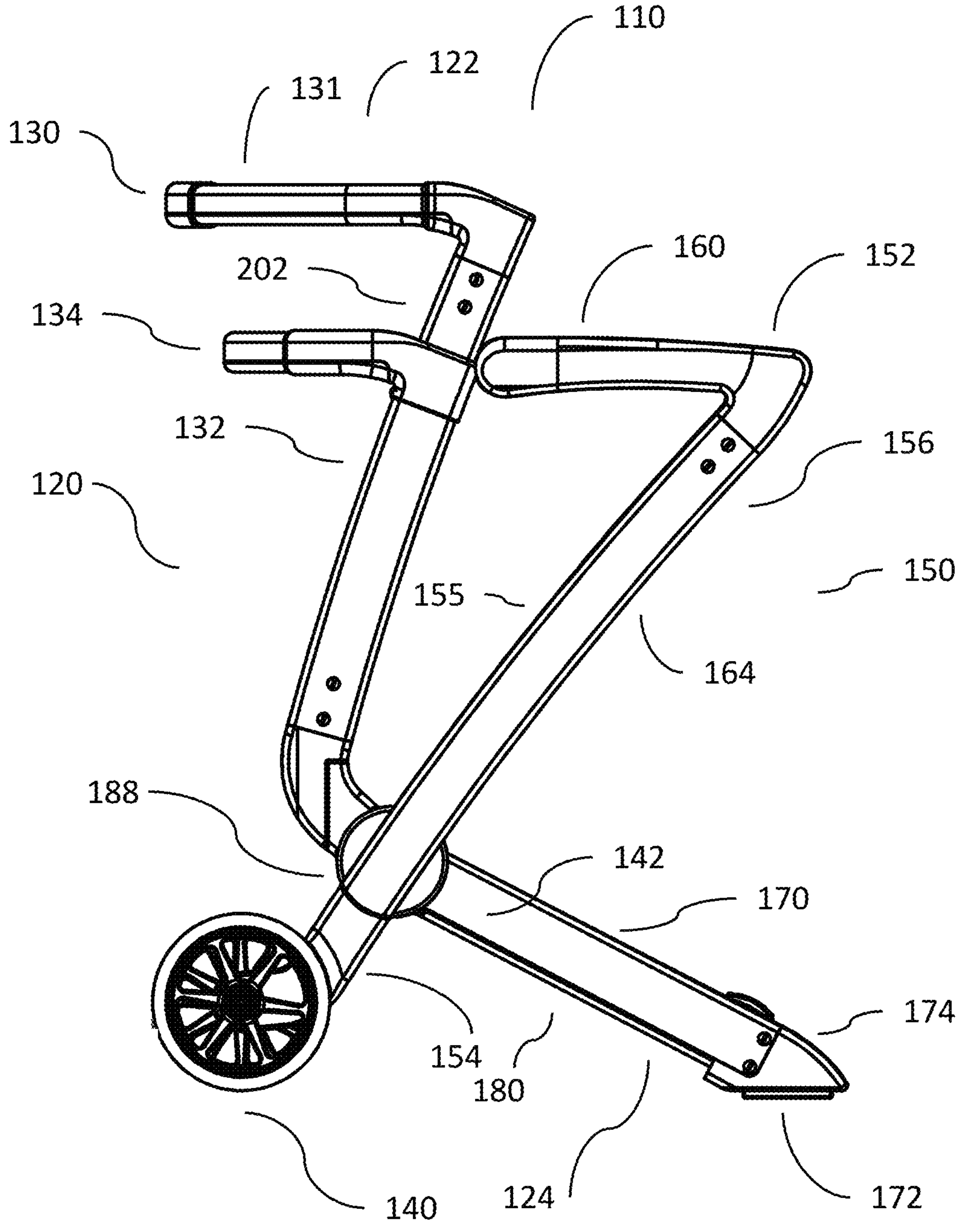
FIG. 5 shows a left side elevation view of an aspect of the apparatus of the present disclosure.
Figure 6:
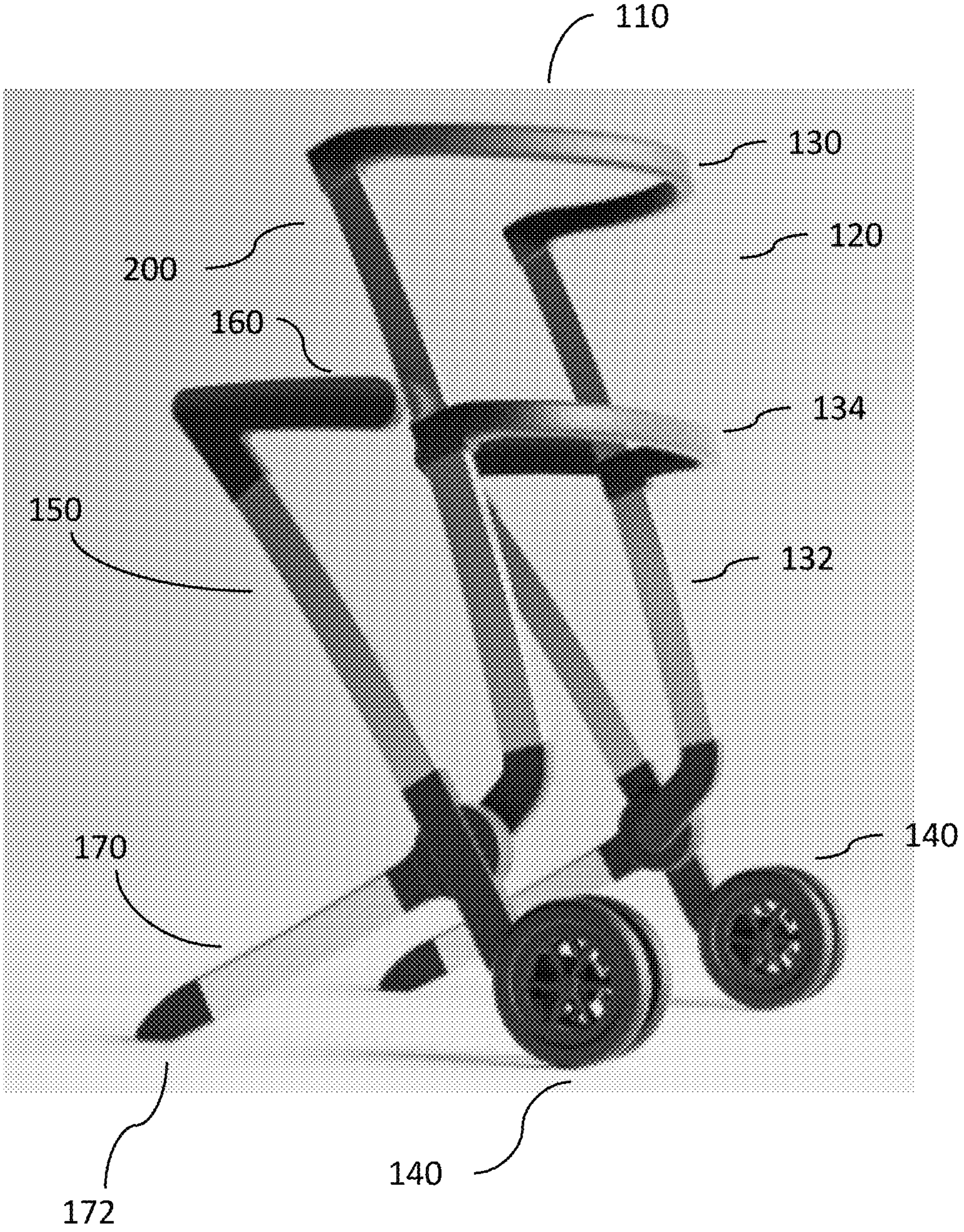
FIG. 6 shows a front and side perspective view of an aspect of the apparatus of the present disclosure.
Figure 7:
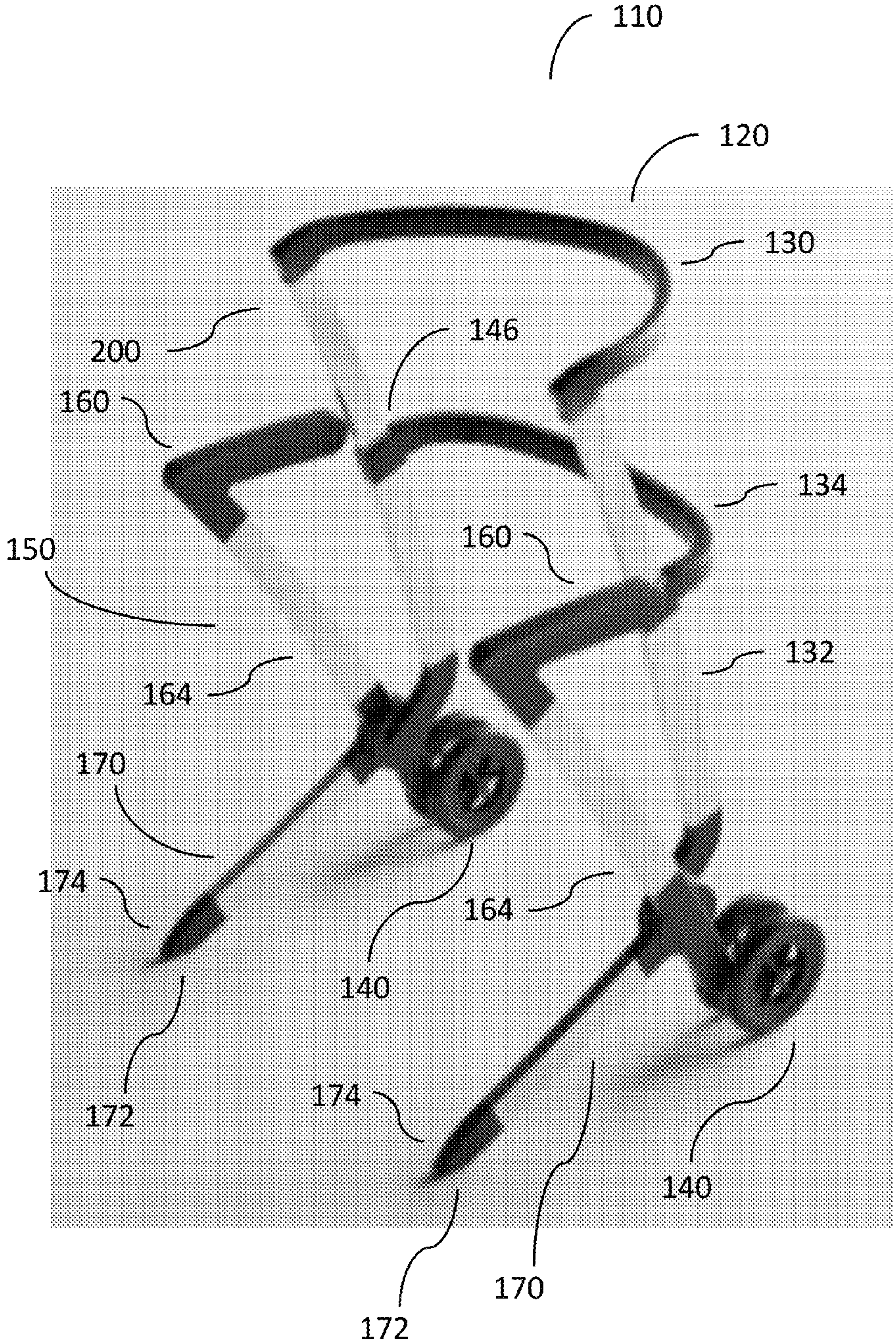
FIG. 7 shows a rear and top perspective view of an aspect of the apparatus of the present disclosure.
Figure 8:
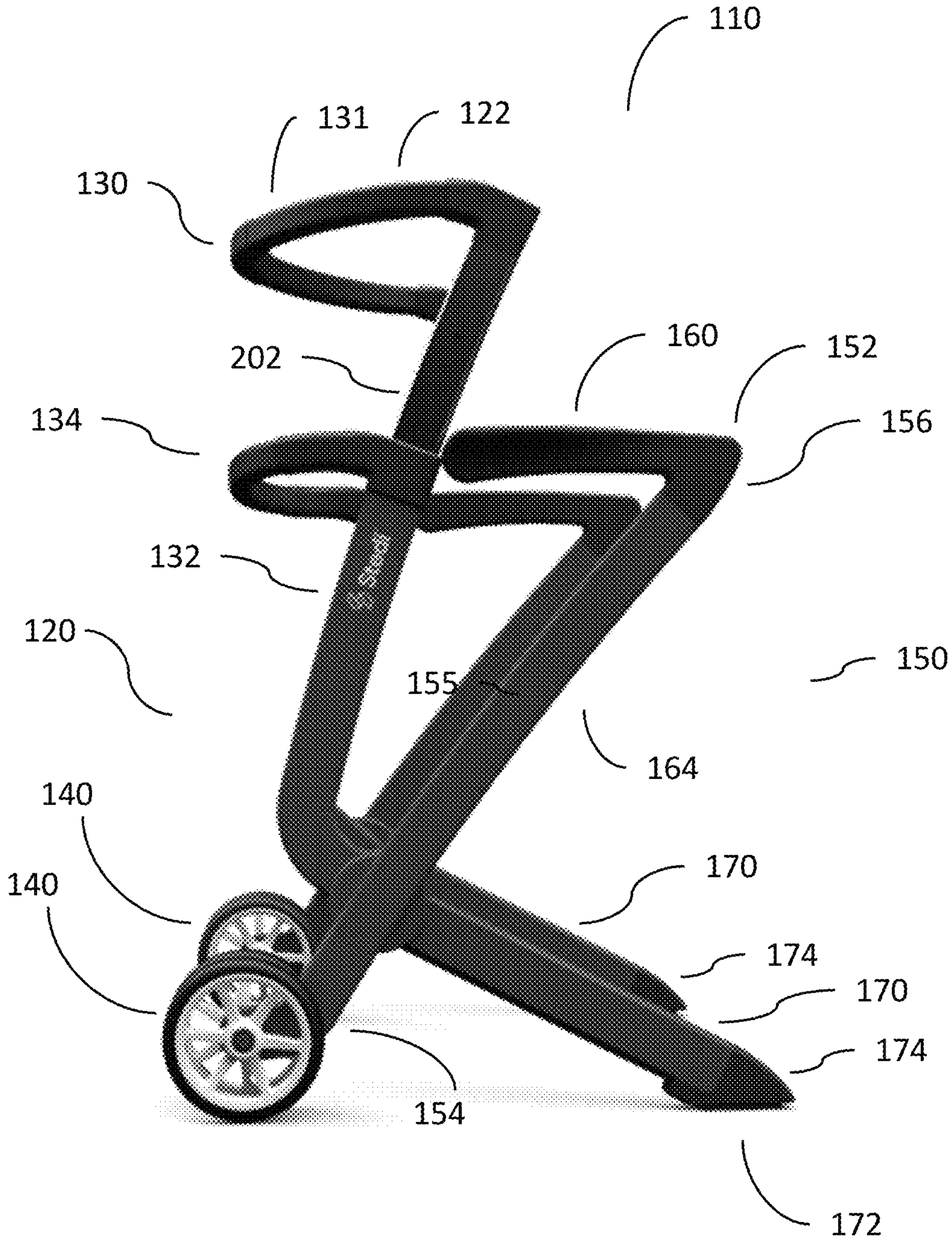
FIG. 8 shows a left side perspective view of an aspect of the apparatus of the present disclosure.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

The presently disclosed disclosure is described with specificity to meet statutory requirements. But, the description itself is not intended to limit the scope of this patent. Rather, the claimed disclosure might also be configured in other ways, to include different steps or elements similar to the ones described in this document, in conjunction with other present or future technologies. Moreover, although the term "step" or similar terms may be used herein to connote different aspects of methods employed, the term should not be interpreted as implying any particular order among or between various steps herein disclosed unless and except when the order of individual steps is explicitly described. The word "approximately" as used herein means within 5% of a stated value, and for ranges as given, applies to both the start and end of the range of values given.

In the following description, numerous specific details are set forth to provide a thorough understanding of the disclosure. But, the present disclosure may be practiced without these specific details. Structures and techniques that would be known to one of ordinary skill in the art have not been shown in detail, in order not to obscure the disclosure. Referring to the figures, it is possible to see the various major elements constituting the apparatus and methods of use the present disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

All illustrations of the drawings are for the purpose of describing selected versions of the present disclosure and are not intended to limit the scope of the present disclosure.

Although the disclosure has been explained in relation to its preferred embodiment, it is to be understood that many other possible modifications and variations can be made without departing from the spirit and scope of the disclosure.

With reference to the figures, a personal mobility system is presented. The personal mobility system is designed to solve well-known and long standing problems in the mobility assisted and movement art. As one solution to long existing problems, the personal mobility system is not bulky and does not hinder the ability of a user to walk about and/or move through a space. As another solution to these long existing problems, the personal mobility system provides an integrated, stable standing and sitting component. As yet another solution to these long existing problems, the personal mobility system, with a plurality of stabilization features, provides support, even in a user's transition state to from a standing to sitting position and/or a sitting to standing position. Another solution to these long felt needs, the personal mobility system and present disclosure solve various issues with modern walking aids and more.

Said another way, the present disclosure provides a personal mobility system with integrated mobility aids, standing aids, sitting aids, stabilization features, and a plurality of design features that are easy to use, that are aesthetically pleasing, that are comfortable, that are ergonomic, that are stable, that reduce the risk of injury of a user, and that do not slip and provide a personal mobility device solving these problems and more.

These long felt needs, other functionality, and additional features are some of the features presented herein with the personal mobility system with a plurality of features. These features, taken alone as personal mobility feature, as a plurality of innovations to a personal mobility feature, or in combination present a novel personal mobility system, a novel personal mobility system, and a plurality of novel designs which changes the state of the art and make using personal mobility systems more comfortable, ergonomic, safe, easy, fun, and efficient. These features, other features, and a combination of these features will become more apparent from the description of the specification, claims, and other information presented herein.

With reference to FIG. 1, FIG. 2, FIG. 3, FIG. 4, FIG. 5, FIG. 6, FIG. 7, FIG. 8, FIG. 9, FIG. 10, FIG. 18, FIG. 24, FIG. 26, FIG. 27, FIG. 28, FIG. 29, FIG. 30, FIG. 31, FIG. 32, and FIG. 33, a personal mobility system 110 (or "personal mobility system", or simply "system") is disclosed. The personal mobility system 110 may be formed of any suitable size, shape, and design and is configured to provide a comfortable, stable, ergonomic, and more functional personal mobility system that does not slip, that is comfortable. The personal mobility system 110 presented herein comprises a plurality of elevation assistance components 150 that provides for a more efficient means of standing and/or sitting and/or moving about.

Said another way, the personal mobility system 110 provides an aesthetically pleasing, easy to use mobility device. The flexibility of the system not only allows a user to be comfortable and stabilized in a mobility device, but allows the user to be aided in sitting and/or standing with ergonomic support and stability throughout the entire process. At these times, and at other times when engaging in weight-bearing activities the ergonomics of standing and/or sitting to engage a device can be difficult.

In addition, many devices get in the way throughout and or during the process of engaging a personal mobility device. The personal mobility system presented herein provides for instantaneous flexibility in use, but the system also provides for stabilization of the system itself-in stabilizing a user-stabilization of the user during the standing and/or sitting process-within and/or engaging with the personal mobility system.

In an arrangement shown, as one example, the personal mobility system 110 may comprise a main body 120, a plurality of elevation assistance components 150, and may comprise a plurality of elastic stabilizer mechanisms 180, among other components, features, systems, and functions.

Main Body.

In an arrangement shown, as one example, personal mobility system 110 may comprise a main body 120. With reference to FIG. 1, FIG. 2, FIG. 3, FIG. 4, FIG. 5, FIG. 6, FIG. 7, FIG. 8, FIG. 9, FIG. 10, FIG. 18, and FIG. 24, FIG. 26, FIG. 27, FIG. 28, FIG. 29, FIG. 30, FIG. 31, and FIG. 32, the main body 120 may be formed of any suitable size, shape, and design and is configured as the main support and stabilization system and/or component of personal mobility system 110. Said another way, main body 120 is the main interaction system and primary structure of personal mobility system 110.

Figure 9:
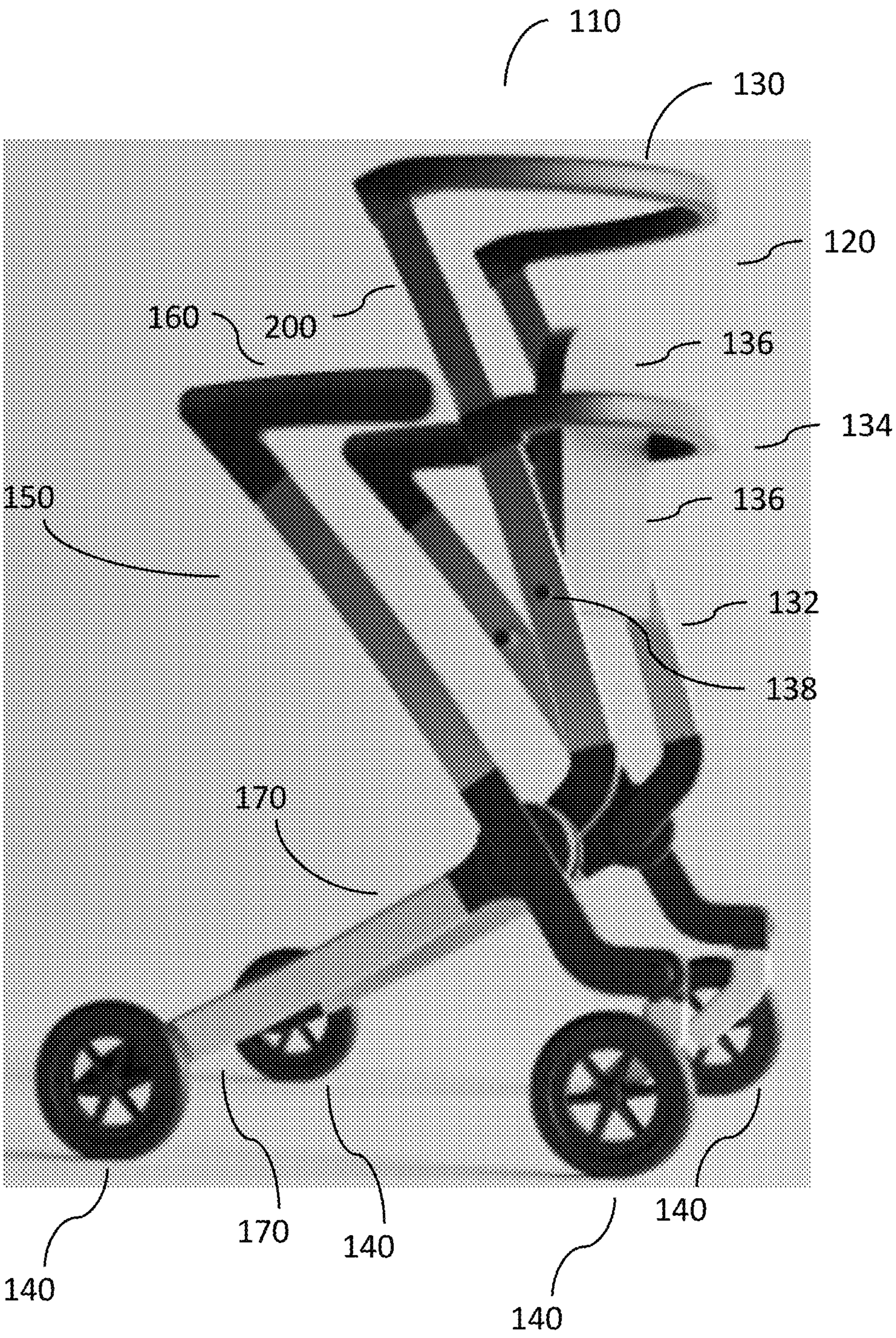
FIG. 9 shows a right-side perspective view of an aspect of the apparatus of the present disclosure.
Figure 10:
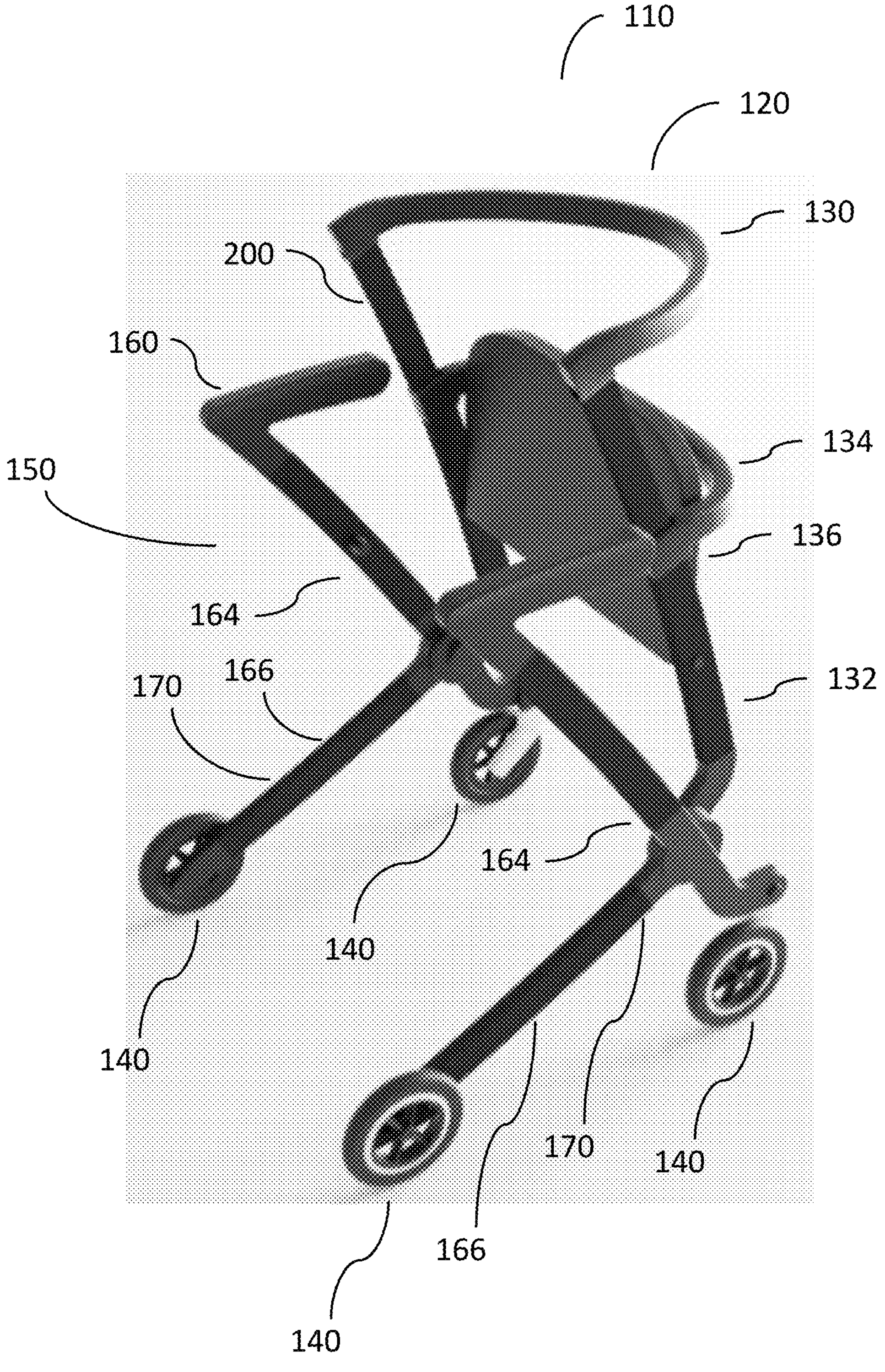
FIG. 10 shows a rear and top perspective view of an aspect of the apparatus of the present disclosure.
Figure 11:
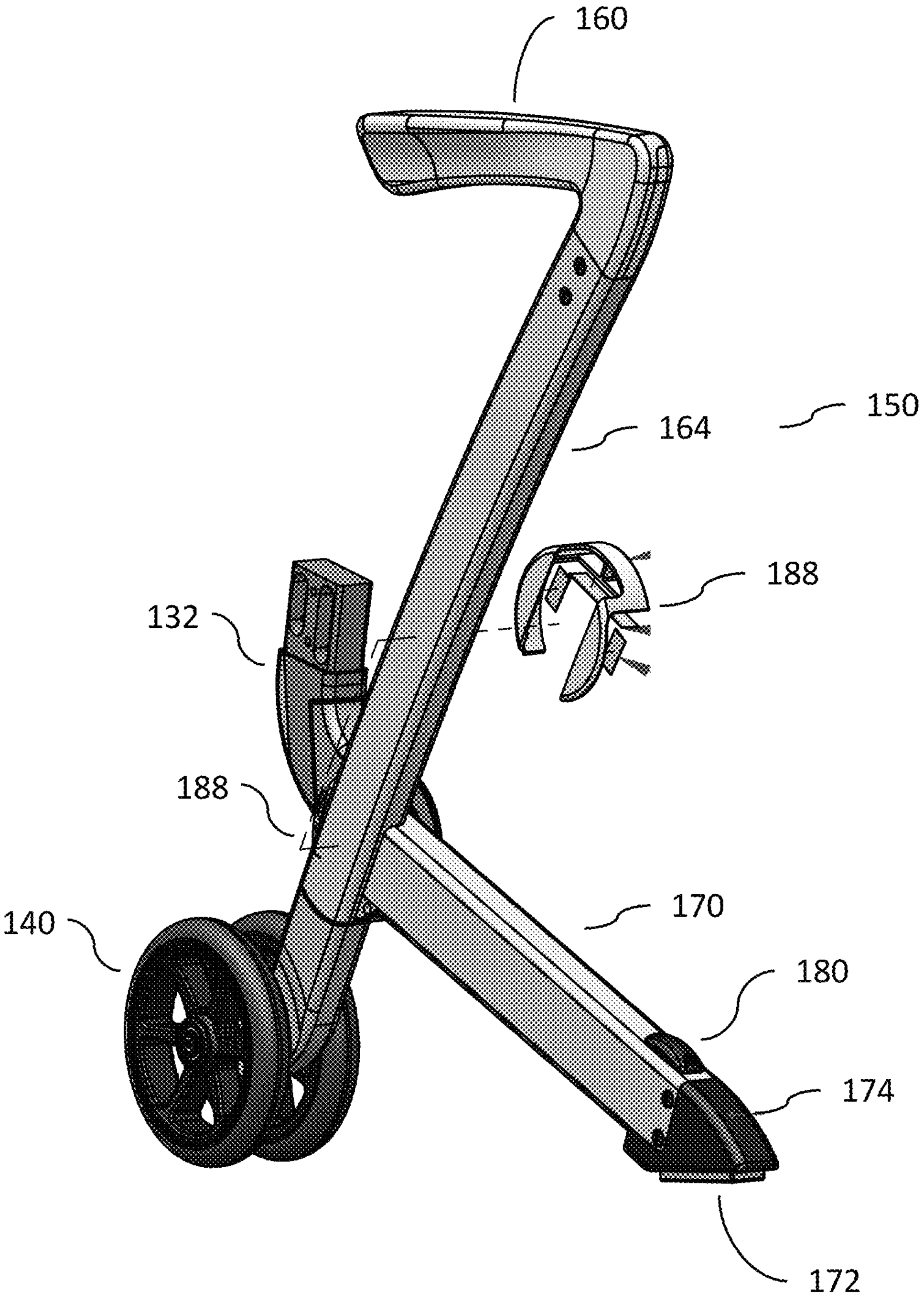
FIG. 11 shows a rear and side perspective view of a selected portion of an aspect of the apparatus of the present disclosure.
Figure 12:
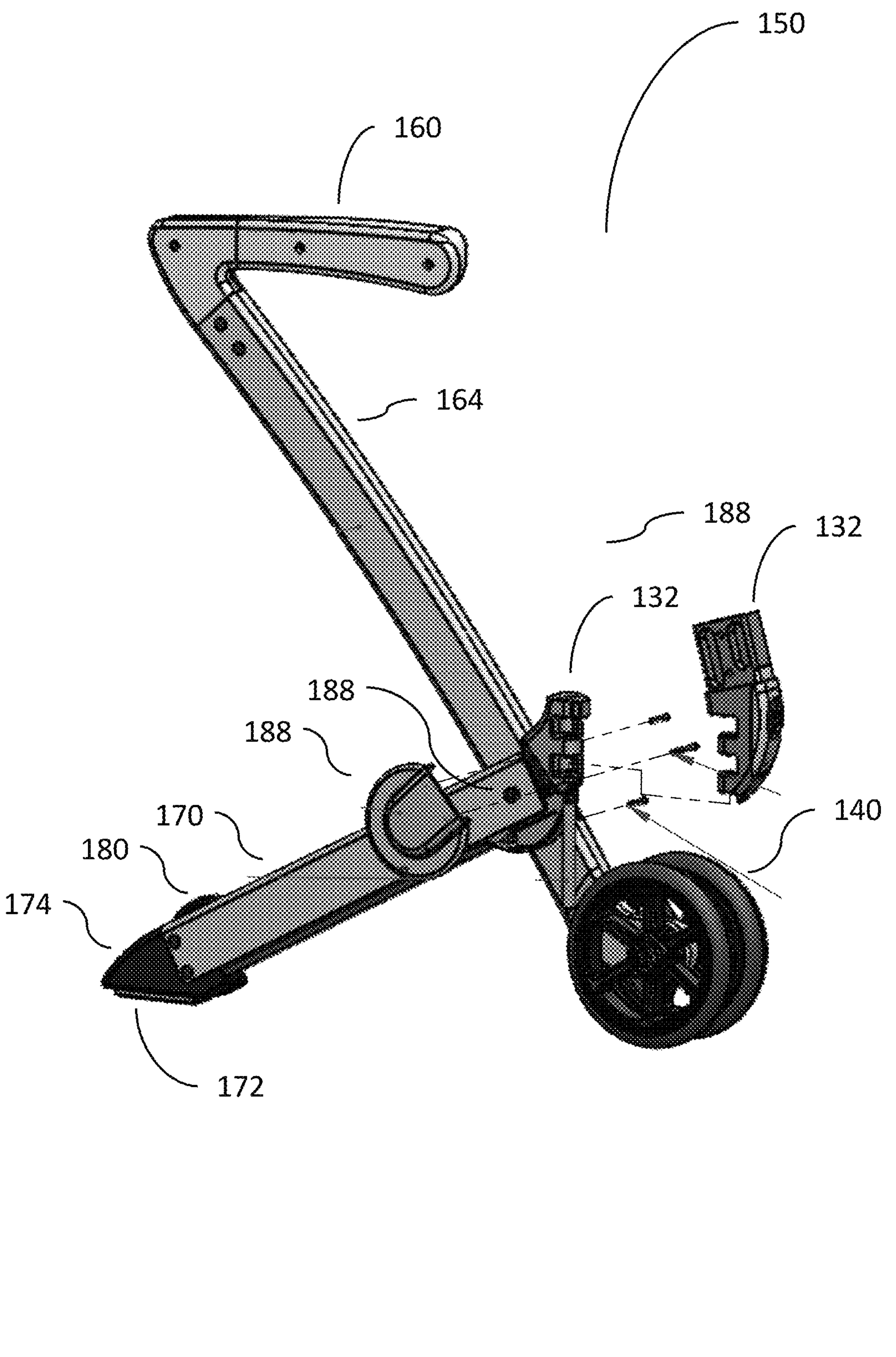
FIG. 12 shows a rear and side perspective view of a selected portion of an aspect of the apparatus of the present disclosure.
Figure 13:
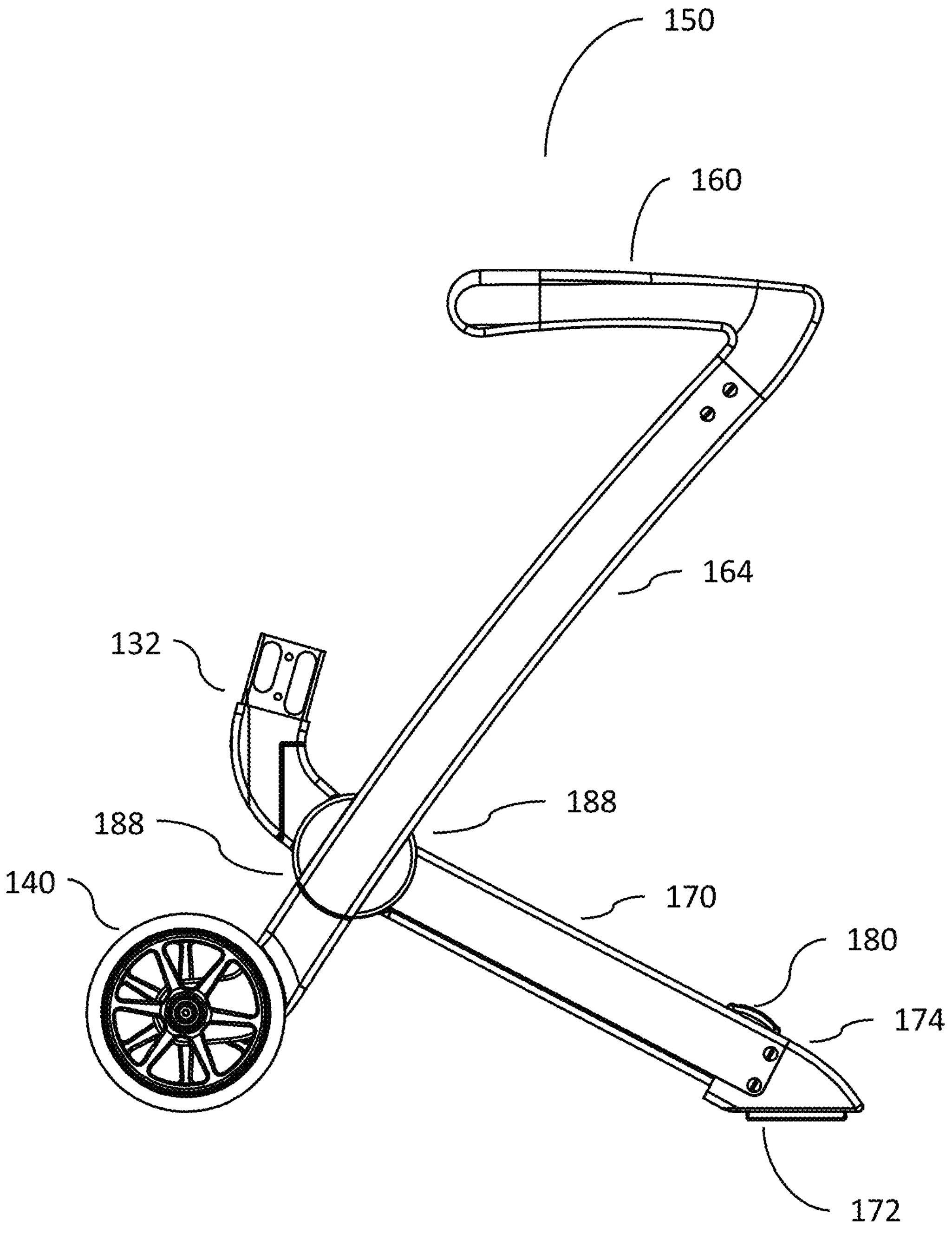
FIG. 13 shows a side elevation view of a selected portion of an aspect of the apparatus of the present disclosure.
Figure 14:
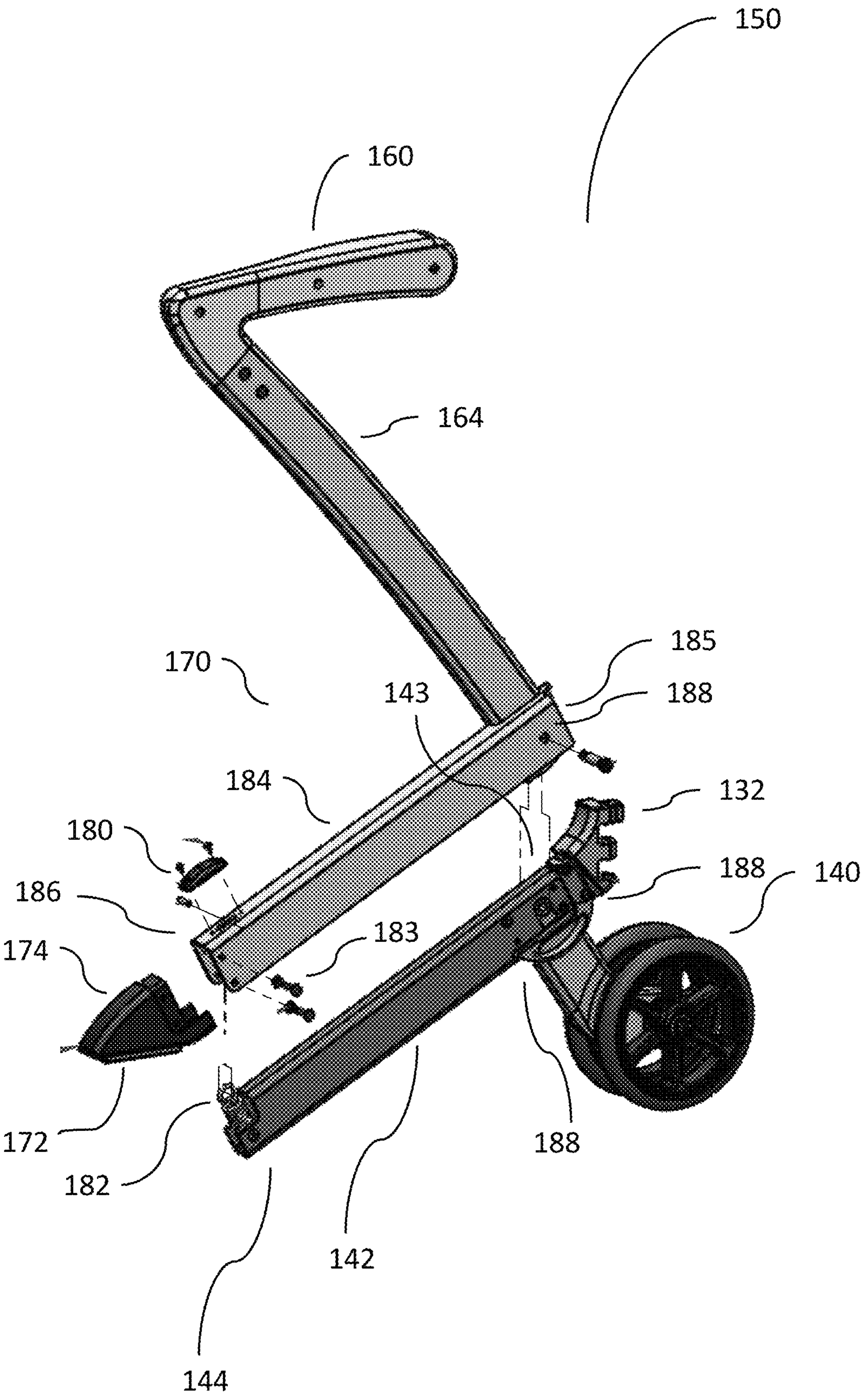
FIG. 14 shows an exploded rear and side perspective view of a selected portion of an aspect of the apparatus of the present disclosure.
Figure 15:
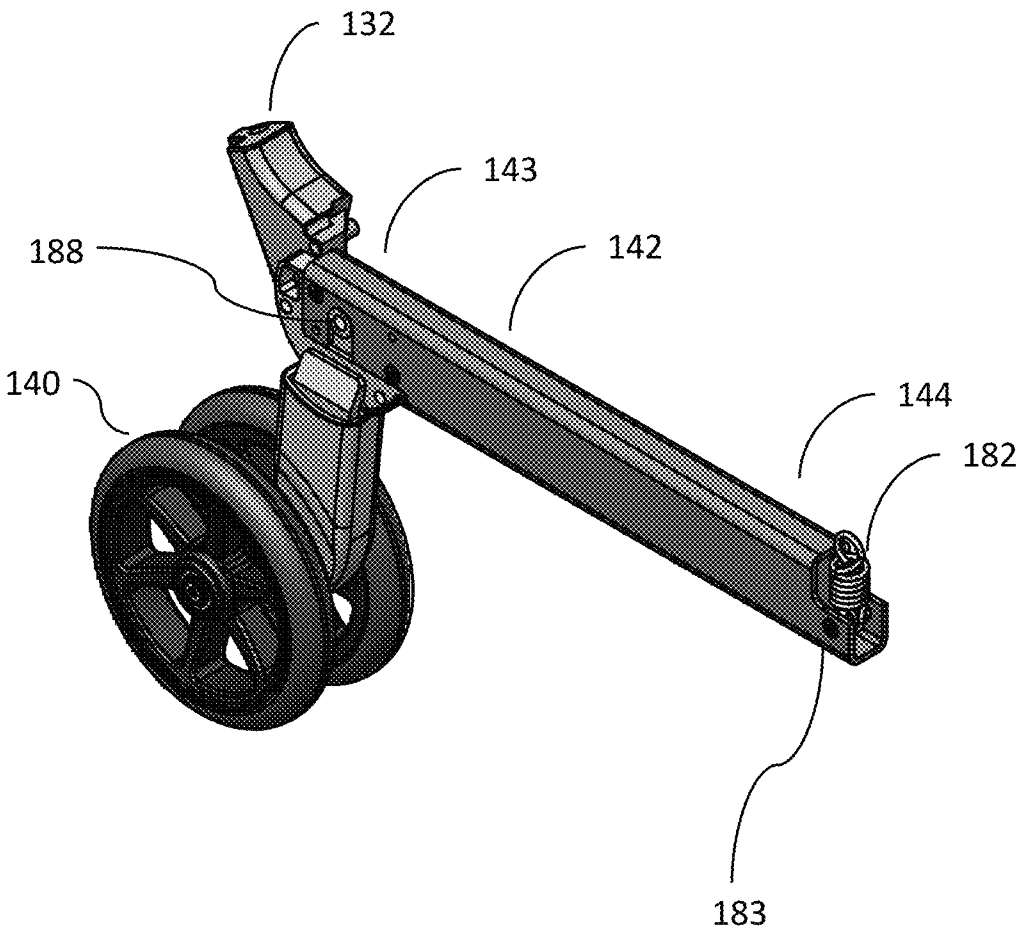
FIG. 15 shows a rear and side perspective view of a selected portion of an aspect of the apparatus of the present disclosure.
Figure 16:
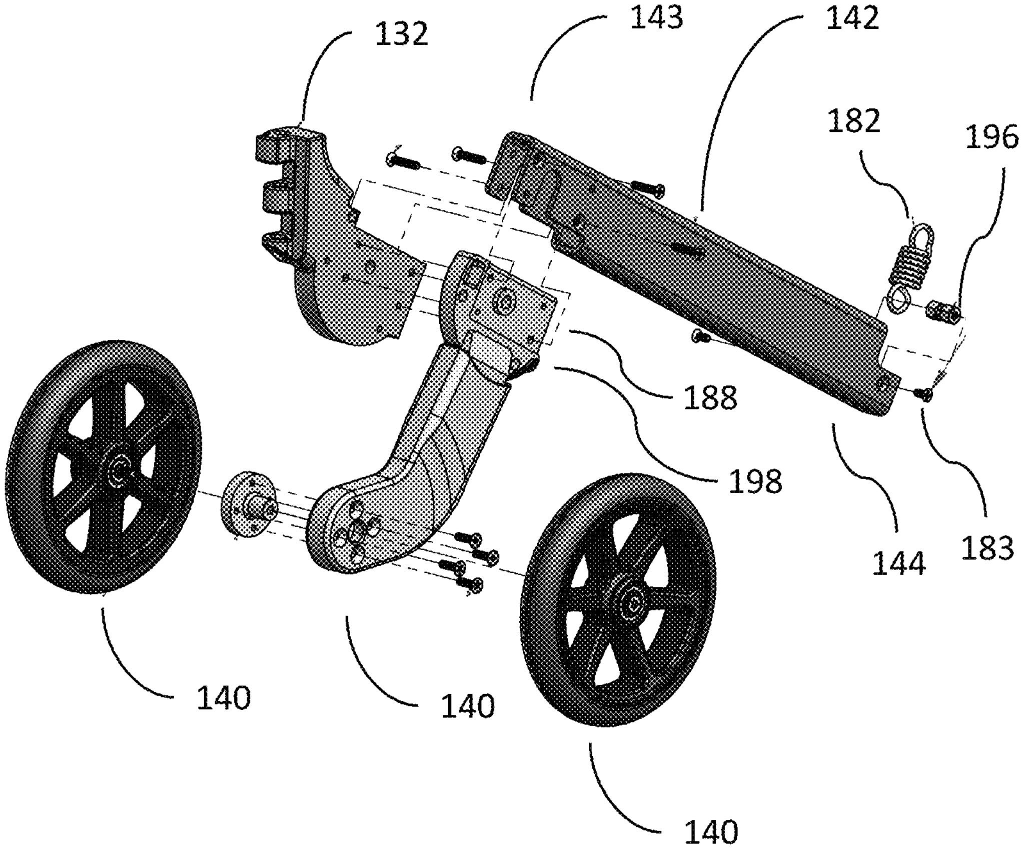
FIG. 16 shows an exploded front and side perspective view of a selected portion of an aspect of the apparatus of the present disclosure.
Figure 17:
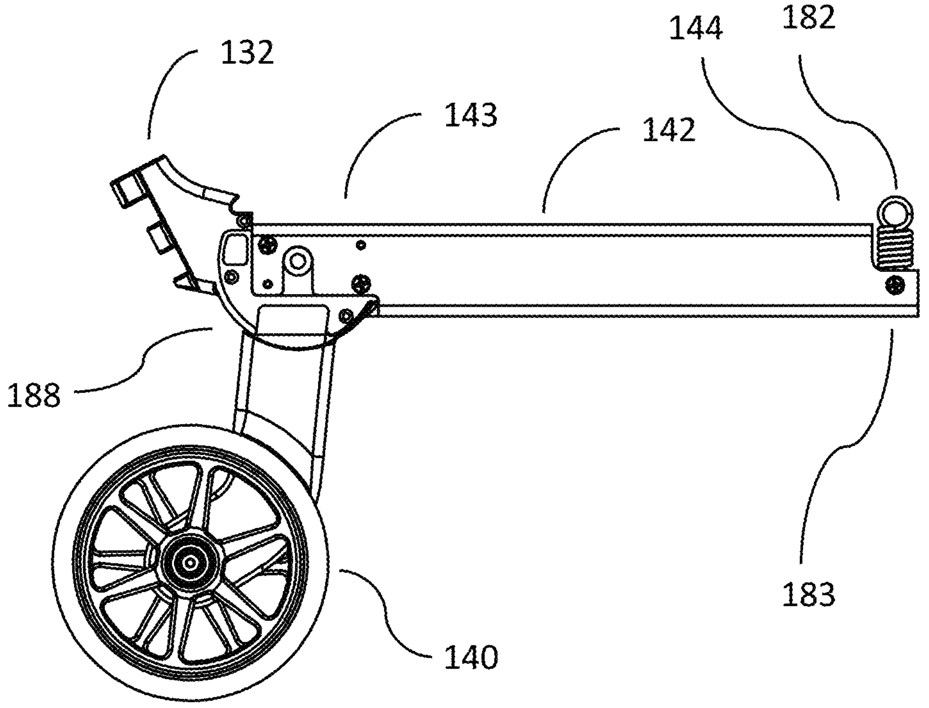
FIG. 17 shows a side elevation view of a selected portion of an aspect of the apparatus of the present disclosure.
Figure 18A:
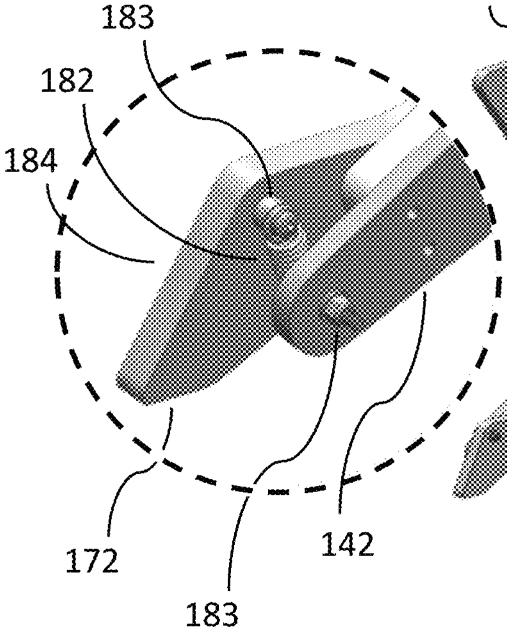
FIG. 18 shows a rear and side perspective view of an aspect of the apparatus of the present disclosure, with an expanded view of a selected portion, marked as FIG. 18A.
Figure 18:
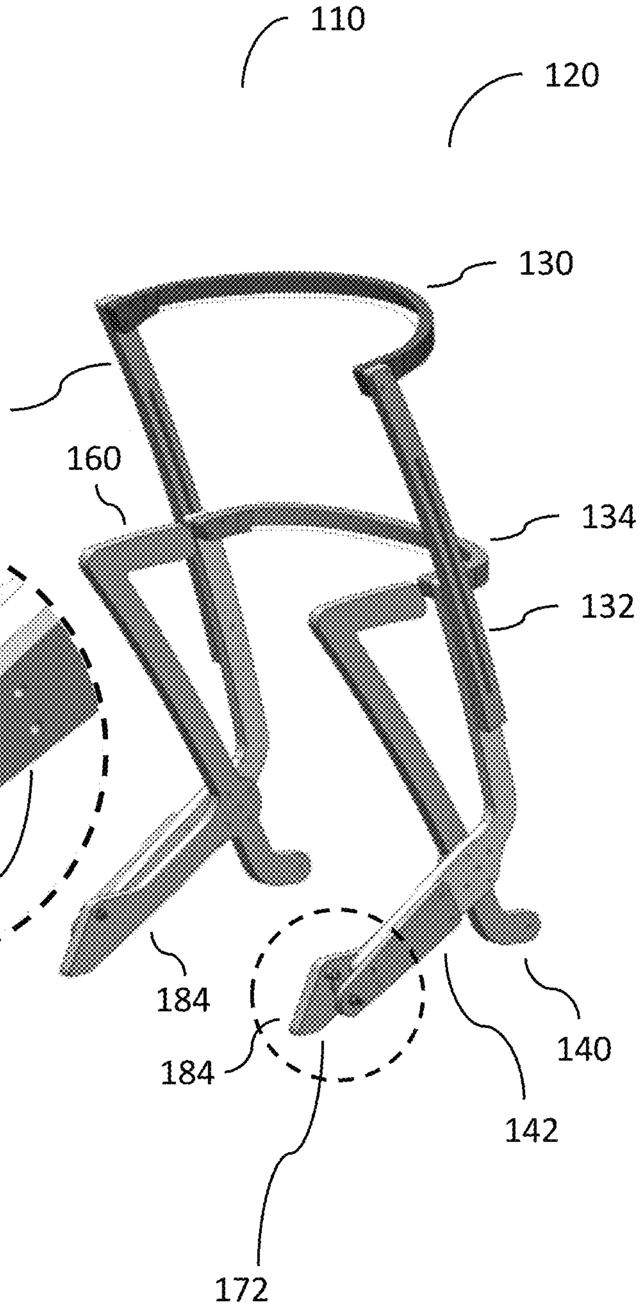
Figure 19:
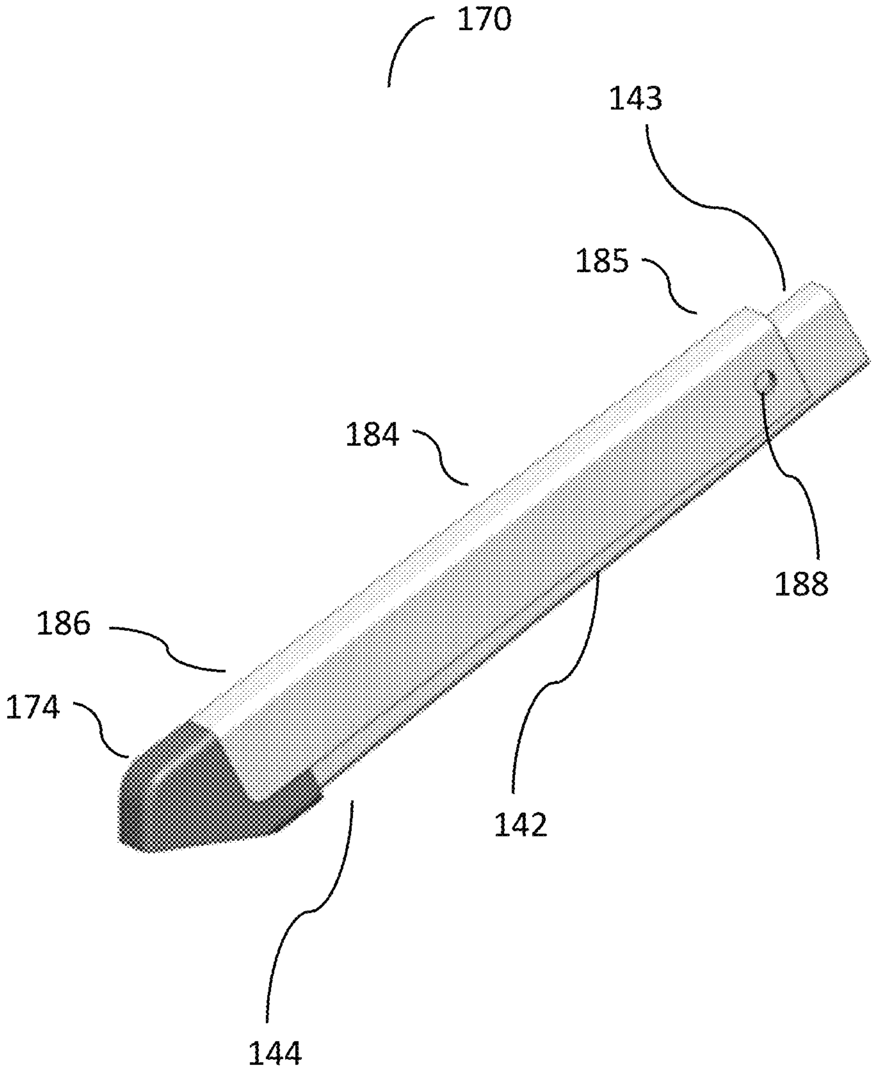
FIG. 19 shows a side perspective view of an aspect of the apparatus of the present disclosure.
Figure 20:
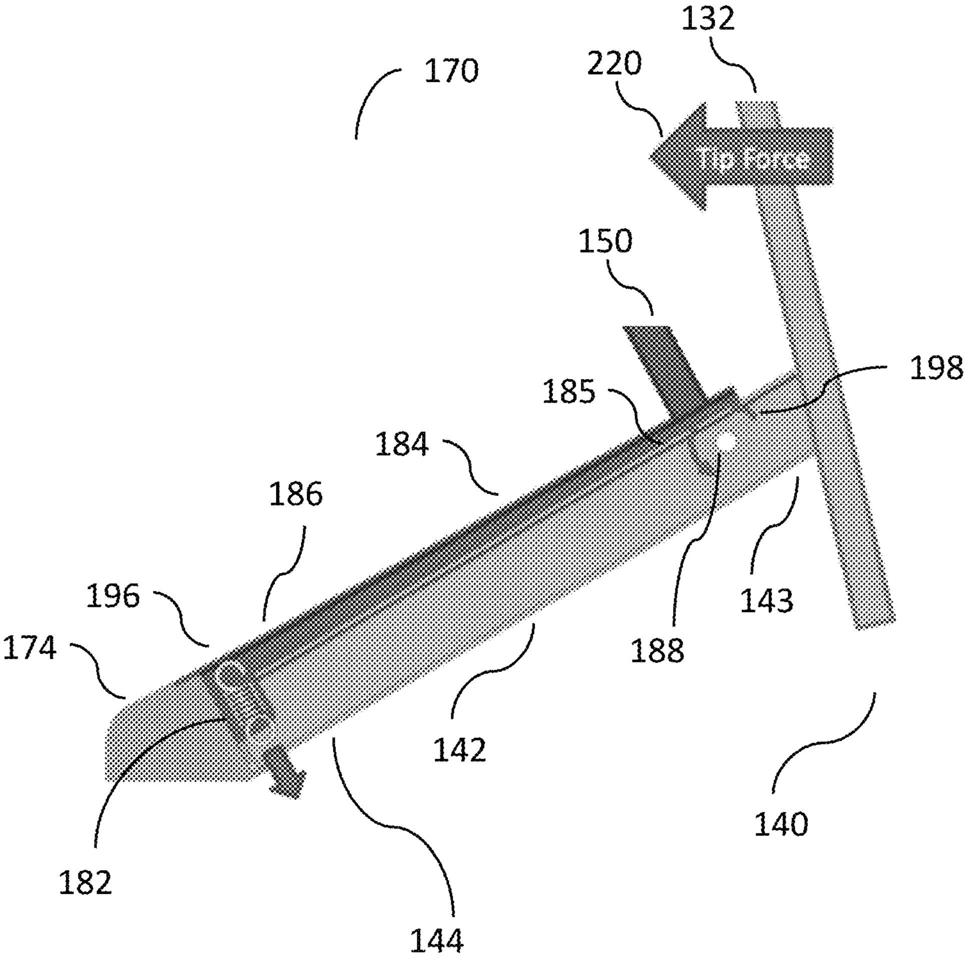
FIG. 20 shows a cutaway side elevation view of an aspect of the apparatus of the present disclosure.

In an arrangement shown, as one example, the main body 120 extends from a top 122 to a bottom 124; the main body 120 having a front 125 and a rear 126, and a left side 128 and a right side 129. In an arrangement shown, as one example, the main body also comprises a plurality of main handles 130 (the plurality of main handles 130 of the main body 120 to be further described herein). In an arrangement shown, as one example, the main body 120 comprises a plurality of vertical main supports 132 and a plurality of horizontal main supports 134 (the plurality of vertical main supports 132 and the plurality of horizontal main supports 134 of the main body 120 to be further discussed herein). Additionally, and in an arrangement shown, as one example, the main body 120 may comprise a plurality of locomotion components 140 (the plurality of locomotion components 140 of the main body 120, or of the personal mobility system 110 as the plurality of locomotion components 140 may not be part of the main body 120, is also to be further discussed herein). Additionally, and in an arrangement shown, the main body 120 may comprise a plurality of attachments 146. With reference to FIG. 9 and FIG. 10, in some aspects of the present disclosure, the main body 120 further comprises a seat 136. The seat 136 may be rotatably affixed to the main body 120 at a plurality of seat attachments 138 such that the seat 136 may be raised to an upright position, or lowered to a horizontal position, such that the seat 136 may be used by a user 300 to sit on. With reference to FIG. 26, FIG. 27, FIG. 28, FIG. 29, FIG. 30, FIG. 31, FIG. 32, and FIG. 34, the seat 136 may be rotatably affixed to the plurality of horizontal main supports 134 with the plurality of seat attachments 138 such that the seat 136 may be raised to an upright position, or lowered to a horizontal position, such that the seat 136 may be used by the user 300 to sit on. The plurality of seat attachments 138 may, in this aspect, be affixed to the plurality of horizontal main supports 134. In such aspects, the seat 136 may advantageously fold to a vertical or stowed position by being rotated towards the front 125 of the personal mobility system 110. Advantageously, this allows the user 300 to walk closer to the front 125 of the personal mobility system 110 when using the personal mobility system 110, providing multiple advantages over the prior art in stability and support when standing or walking. In addition, with the seat 136 folding down into the space in the center of the personal mobility system 110 in such aspects, when the user 300 uses the seat 136, the plurality of main handles 130 may serve as a backrest for support, comfort and safety, and the plurality of plurality of elevation handles 160 may serve as armrests for support, comfort, and safety.

Plurality of Handles.

In an arrangement shown, as one example, and with reference to FIG. 1, FIG. 2, FIG. 3, FIG. 4, FIG. 5, FIG. 6, FIG. 7, FIG. 8, FIG. 9, FIG. 10, FIG. 18, FIG. 24, FIG. 26, FIG. 27, FIG. 28, FIG. 29, FIG. 30, FIG. 31, FIG. 32, and FIG. 34 the main body 120 may comprise a plurality of main handles 130, which may be referred to herein as a "handle", a "handle component", or simply a "grip"). The plurality of main handles 130 may be formed of any suitable size, shape, and design and is configured to be the primary gripping location for a user when the user is engaging, moving, or walking with the personal mobility system 110. In this way, the plurality of main handles 130 (not to be confused with a plurality of elevation handles 160 of the plurality of elevation assistance components 150, to be further discussed herein) is the region or regions on the main body 120 in which the user 300 will grip the personal mobility system 110 and push the system forward, push the system backward, move the personal mobility system 110 side to side—laterally—and move the personal mobility system 110 up and down, and/or hold on to the personal mobility system 110 for support or stability. In this way, the plurality of main handles 130 is the primary interaction point of personal mobility system 110 for the user 300.

In an arrangement shown, as one example, the plurality of main handles 130 may comprise a plurality of primary grip regions 131. Advantageously, the number of the plurality of primary grip regions 131 may be two. Each of the plurality of primary grip regions 131 may be configured at an angle to one another for ergonomic benefits of the user 300. In this way, a user 300 can grip any of the plurality of main handles 130 at the same time with ease and with arms in a great position to appropriately handle the personal mobility system 110. While two of the plurality of main handles 130 are shown in an arrangement as one example, any number of the plurality of main handles 130 are hereby contemplated for use in controlling and manipulating the personal mobility system 110. For example, additional of the plurality of main handles 130 may be located to the sides of the user 300, in proximity to the left side 128 and/or to the right side 129, as opposed to in the front 125, or in other locations on the personal mobility system 110 that provide flexibility for a user 300.

With reference to FIG. 1, FIG. 2, FIG. 3, FIG. 4, FIG. 5, FIG. 6, FIG. 7, FIG. 8, FIG. 9, FIG. 10, FIG. 18, FIG. 26, FIG. 27, FIG. 28, FIG. 29, FIG. 30, FIG. 31, FIG. 32, and FIG. 34, other numbers of the plurality of main handles 130 are hereby contemplated for use, including but not limited to, one single component for the plurality of main handles 130, which may comprise a bar or the like, or three, four, five, six, seven, eight, nine, or any other number of the plurality of main handles 130, as deemed suitable for ease of use, as will be apparent to one of skill in the art. The plurality of main handles 130 may comprise any number of the plurality of main handles 130 at a first position, and any number of the plurality of main handles 130 at a second position, or at three positions, four positions, five positions, six positions, seven positions, eight positions, nine positions, or any other number of positions; positions being understood to mean a position, a location, and an orientation. The plurality of main handles 130 may comprise hand grips, one or more bars, forearm pads or other objects suitably disposed for a user 300 to rest arms, torso, palms, or another body part on, or other types of objects or surfaces.

In an arrangement shown, as one example, the plurality of main handles 130 are arranged at an angle that is approximately 110-150 degrees from parallel with the front of a user 300. However, other incline angles are hereby contemplated for use, including but not limited to an incline angle of 0-5 degrees, an incline angle of 5-10 degrees, an incline angle of 10-15 degrees, an incline angle of 15-20 degrees, an incline angle of 20-25 degrees, an incline angle of 25-30 degrees, an incline angle of 30-35 degrees, an incline angle of 35-40 degrees, or an incline angle of 40-45 degrees, an incline angle of 45-50 degrees, an incline angle of 50-55 degrees, an incline angle of 55-60 degrees, an incline angle of 60-65 degrees, an incline angle of 65-70 degrees, an incline angle of 70-75 degrees, an incline angle of 75-80 degrees, an incline angle of 80-85 degrees, an incline angle of 85-90 degrees, and the like. Similarly, other incline angles for the plurality of main handles 130 are also hereby contemplated for use, which change the angle of association with the main body 120 in a vertical orientation as well as in a horizontal orientation.

While a metal alloy is considered herein for the construction of the plurality of main handles 130, in an arrangement shown, as one example, other materials are also hereby contemplated for use. Other materials may be wood, polymers, enhanced polymers, a combination of cushioned materials and polymers, a combination of metals, alloys, or other lightweight materials that are easy to maneuver and easy to use and safe, or any other material or combination thereof.

Plurality of Supports.

With reference to FIG. 1, FIG. 2, FIG. 3, FIG. 4, FIG. 5, FIG. 6, FIG. 7, FIG. 8, FIG. 9, FIG. 10, FIG. 18, FIG. 24, FIG. 26, FIG. 27, FIG. 28, FIG. 29, FIG. 30, FIG. 31, FIG. 32, and FIG. 34, in the arrangements shown, as examples, the main body 120 may comprise a plurality of vertical main supports 132, which may be referred to as "structure", "bars", or simply "supports". The plurality of vertical main supports 132 are formed of any suitable size, shape, and design and is configured to make up the main structure of the personal mobility system 110. In an arrangement shown, as one example, the structure of the main body 120 comprises the plurality of vertical main supports 132 and the plurality of horizontal main supports 134. In an arrangement shown, as one example, the plurality of vertical main supports 132 comprise approximately vertical bar-shaped, elongated structures and the plurality of horizontal main supports 134 comprise approximately horizontal bar-shaped, elongated structures that connect in a frame like pattern such that a stable frame of the main body 120 is formed. In this way, the plurality of vertical main supports 132 and the plurality of horizontal main supports 134 form the main body 120 of the personal mobility system 110. The plurality of vertical main supports 132 and the plurality of horizontal main supports 134 may comprise the same components, wherein the main body 120 or the personal mobility system 110 more broadly comprise a single or unitary construction. Any subset of the plurality of vertical main supports 132 and/or the plurality of horizontal main supports 134 may comprise the same components, as described herein.

In an arrangement shown, as one example, the plurality of vertical main supports 132 comprise individual bars or individual pieces which are then connected to each other and/or to the plurality of horizontal main supports 134, which comprise individual bars or individual pieces which are then connected to each other and/or to the plurality of vertical main supports 132 through permanent connection methods or by attaching with fasteners and or adhesives, welding, or any other connection means. However, the main body 120 may also be formed of a single unitary construction through a single extrusion, single mould, or the like. In this way, a single, unitary piece may be formed. In this way, the frame and/or main body 120 may be stronger and easier to make and use.

In an arrangement shown, as one example, the main body 120 body comprises two of the plurality of vertical main supports 132, wherein each of the plurality of vertical main supports 132 is approximately vertically positioned. Connecting the plurality of vertical main supports 132 at each side, namely the left side 128 and the right side 129, are two of the plurality of horizontal main supports 134. One of the plurality of horizontal main supports 134 may be disposed near the middle, by height, of the plurality of vertical main supports 132, wherein the one of the plurality of horizontal main supports 134 extends from the one of the vertical main supports 132 at the left side 128 to the one of the vertical main supports 132 at the right side 129. Additionally, a lower one of the plurality of horizontal main supports 134 may connect the two of the plurality of vertical main supports 132 nearer the bottom 124 of the personal mobility system 110. Additionally, an upper one of the plurality of horizontal main supports 134 may connect the two of the plurality of vertical main supports 132 nearer the top 122 of the personal mobility system 110, and may comprise a plurality of main handles 130.

In an arrangement shown, as one example, two of the plurality of vertical main supports 132 are connected by any of the plurality of horizontal main supports 134 to form the main body 120. However, any other number of the plurality of vertical main supports 132 and any other number of the plurality of horizontal main supports 134 is hereby contemplated for use. Said another way, the personal mobility system 110 may have three, four, five, or more of the plurality of vertical main supports 132 as appropriate. Said another way, the personal mobility system 110 may have one, two, three, four, or more of the plurality of horizontal main supports 134. Additionally, and as contemplated earlier herein, the personal mobility system 110 may comprise a unitary construction with a plurality of vertical main supports 132 and a plurality of horizontal main supports 134, or the personal mobility system 110 may comprise a unitary construction in which a plurality of vertical main supports 132 and a plurality of horizontal main supports 134 are not elongated bars but singular panels of unitary construction and/or extrusion.

In an arrangement shown, as one example, and with reference to FIG. 26, FIG. 27, FIG. 28, FIG. 29, FIG. 30, FIG. 31, FIG. 32, FIG. 33 and FIG. 34, two of the plurality of vertical main supports 132 are connected by any of the plurality of horizontal main supports 134 to form the main body 120, wherein the plurality of horizontal main supports 134 are arranged in front of the plurality of vertical main supports 132, that is, towards the front 125 relatively to the plurality of vertical main supports 132. In such aspects, the plurality of horizontal main supports 134 are advantageously curved. The plurality of horizontal main supports 134 advantageously have the seat 136 attached thereto, in a region of the plurality of horizontal main supports 134 towards the front 125 of the plurality of horizontal main supports 134, such that the seat 136 may hinge (meaning swing or be rotated) down, such that the seat 136 may be used by the user 300 to sit, kneel, brace, or otherwise rest upon.

In some such aspects, the main body 120 may further comprise a plurality of main-elevation-horizontal-supports 135, wherein the plurality of main-elevation-horizontal-supports 135 affix the plurality of vertical main supports 132 and the plurality of vertical elevation supports 164 to each other, respectively, for the number of each of the foregoing components. The plurality of horizontal main supports 134 may be contiguous with the plurality of main-elevation-horizontal-supports 135. The plurality of horizontal main supports 134 may be adjacent to or near to the plurality of main-elevation-horizontal-supports 135. In some aspects of the present disclosure, the plurality of horizontal main supports 134 and the plurality of main-elevation-horizontal-supports 135 may be formed or made from a continuous or single piece of material. In such aspects, the main body 120 being formed with the plurality of horizontal main supports 134 and the plurality of main-elevation-horizontal-supports 135 towards or in the front 125 of the personal mobility system 110 provides structural support and strength to the personal mobility system 110, such that the seat 136 does not require a frame or X-frame (a frame shaped with an "X" or crossing pieces, for support, strength, and stability of the apparatus) under it, as is typically needed and found in the prior art, to provide stability of the prior art devices. With the arrangement as taught herein, the personal mobility system 110 has multiple advantages over the prior art, in strength, weight, stability, comfort, and usability. For instance, without limiting the foregoing, the arrangement as disclosed herein makes it simpler and easier for the user 300 to carry out reaching tasks, as the user 300 is closer to the front 125 of the personal mobility system 110 at all times, and is in or approximately in the center of the personal mobility system 110, as opposed to walking behind the device, as with the prior art. Providing advantages to the user 300 in their ability to reach counters, cabinets, tables, doorknobs, light switches, books, and anything else is a boost to safety of the user, and to useability and practicality of the personal mobility system 110.

The personal mobility system 110, with the frame structure and geometry as disclosed herein, provides further advantages over the prior art. The personal mobility system 110 can fold, as shown with refence to FIG. 24 and FIG. 32, in multiple aspects of the present disclosure. When folded, as in FIG. 32, the personal mobility system 110 is vertically stable, meaning that it can stand and remain standing on its own. This provides multiple advantages in useability and practicality of the personal mobility system 110. For instance, and without limitation, the personal mobility system 110 may be used by a user to get to a table, chair, bed, bench, or other place, and then be folded to take up less space and allow others to maneuver more easily through a space, such as in a restaurant, dining hall, concert venue, train car, or airport. It also facilitates storage of any number of apparatuses of the personal mobility system 110, especially in a location with many such devices, such as a care facility, because the personal mobility system 110 take up considerably less floor space than prior art devices. Additionally, because of the arrangement of the components of the personal mobility system 110, when the personal mobility system 110 is folded it can roll on the plurality of locomotion components 140 with a zero-turning radius. This is an improvement over the prior art, as it makes it possible and simple to move the personal mobility system 110 when it is folded, for either storage or to reduce the space occupied by it, by rolling it. This allows the user 300 or anyone to move the personal mobility system 110 simply and safely while it is folded, providing improvements to convenience, storage, and movement of the personal mobility system 110. The geometry and arrangement of the frame elements of the present disclosure make these improvements possible.

The angle of the plurality of vertical main supports 132 and the plurality of horizontal main supports 134 is extremely important for enhancing the stability of the main body 120. The angle of the plurality of vertical main supports 132 is also critical in the physics of enhancing the stability of the personal mobility system 110 to prevent tipping or falling which can occur from use during the operation of the personal mobility system 110.

In an arrangement shown, as one example, the plurality of vertical main supports 132 are arranged at an angle that is approximately 88 degrees from perpendicular with a floor. In another embodiment, the arrangement of the plurality of vertical main supports 132 at an angle of 70-75 degrees is specifically resistant to tipping for a user 300, understanding that different arrangements or configurations of the disclosed components of the present disclosure may be required depending on the height and weight of a user 300. However, other angles, when measured from a perpendicularly situated floor are hereby contemplated for use, including but not limited to an incline angle of 50-55 degrees, an incline angle of 55-60 degrees, an incline angle of 60-65 degrees, an incline angle of 65-70 degrees, an incline angle of 80-85 degrees, an incline angle of 85-90 degrees, and the like. Similarly, other incline angles are also hereby contemplated for use, which change the angle of association with the main body 120 in a horizontal orientation as well.

While a metal alloy is considered herein for the construction of the plurality of vertical main supports 132, in the arrangement shown, as one example, other materials are also hereby contemplated for use. Other materials may be wood, polymers, enhanced polymers, a combination of cushioned materials and polymers, a combination of metals, alloys, or other lightweight materials that are easy to maneuver and easy to use and safe, or any other material or combination thereof.

Plurality of Mobility Features.

With reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 26, FIG. 27, FIG. 28, FIG. 29, FIG. 30, FIG. 31, FIG. 32, FIG. 33, and FIG. 34, the main body 120 comprises at least one in a plurality of locomotion components 140. The plurality of locomotion components 140 may comprise wheels, rollers, sliders, low-friction areas, tracks, or any suitable mobility feature, as will be apparent to one of skill in the art, and the plurality of locomotion components 140 may further comprise attachments and mechanisms to suitably affix the foregoing subset of the plurality of locomotion components 140 to the main body 120 or to the personal mobility system 110. The plurality of locomotion components 140 may be formed of any suitable size, shape, and design and is configured to aid a user 300 in moving the personal mobility system 110 when the user 300 is engaging, moving, or walking with the personal mobility system 110. Said another way, and in the arrangement shown, the plurality of locomotion components 140 may comprise two wheels, with one wheel situated at the bottom of each of the plurality of vertical elevation supports 164. In this way, a user 300 can tilt the main body 120 forward in a way where the weight of personal mobility system 110 rests on the wheels and the personal mobility system 110 can more easily move forward, backward, or any other desired direction.

In an arrangement shown, as one example, the plurality of locomotion components 140 comprises two wheels. However, any other type of component may comprise the plurality of locomotion components 140, and the plurality of locomotion components 140 may be omitted from the personal mobility system 110. The personal mobility system 110 may not need a plurality of locomotion components 140. Additionally, the personal mobility system 110 may comprise a plurality of locomotion components 140 that allow the device to roll in any direction instead of straight forward or straight back. Additionally, the plurality of locomotion components 140 may comprise gyrational functionality, and/or other features.

In an arrangement shown, as one example, with reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 26, FIG. 27, FIG. 28, FIG. 29, FIG. 30, FIG. 31, FIG. 32, FIG. 33, and FIG. 34, the locomotion components 140 that are towards the front 125 of the personal mobility system 110 may be able to swivel freely through a 360° range of motion, relative to the main body 120, or may be able to swivel through a smaller range of motion, as may be found advantageous for the personal mobility system 110. Advantageously, the locomotion components 140 that are towards the front 125 may be capable of being locked in a fixed position. The locomotion components 140 that are towards the rear 126 may advantageously be fixed, and unable to swivel. In some aspects, it may be advantageous to allow the locomotion components 140 that are towards the rear 126 to rotate through a limited range of motion.

In an arrangement shown, and with reference to FIG. 26, FIG. 27, FIG. 28, FIG. 29, FIG. 30, FIG. 31, FIG. 32, FIG. 33, and FIG. 34, the present disclosure teaches a plurality of braking components 230. The plurality of braking components 230 comprises a plurality of handbrake levers 232, a plurality of handbrake cables 234 or other mechanism for transmitting force or a signal, and a plurality of brake shoes 236. The handbrake levers 232 are operably connected to the plurality of handbrake cables 234 or other mechanism for transmitting force or a signal, and the plurality of handbrake cables 234 are operably connected to the plurality of brake shoes 236. The plurality of brake shoes 236 are mounted on the plurality of ground support components 170 such that the plurality of brake shoes 236, when actuated, apply force to some of the plurality of locomotion components 140, braking the personal mobility system 110. Advantageously, the plurality of brake shoes 236 should be applied to those of the plurality of locomotion components 140 that are towards the rear 126, to reduce the risk of tipping of the personal mobility system 110. Advantageously, the plurality of handbrake levers 232 may be attached to or near the plurality of primary grip regions 131, and/or attached to or near the plurality of telescoping handle mechanism 200, and/or attached to or near the plurality of plurality of elevation handles 160, attached to or near the plurality of plurality of vertical elevation supports 164.

In this way, the plurality of locomotion components 140 can provide flexibility and options for the personal mobility system 110, in operation and directionality-such as when a user 300 pushes the system forward, pushes the system backward, moves the personal mobility system 110 side to side—laterally—and moves the system up and down. In this way, the plurality of locomotion components 140 is the primary interaction point between personal mobility system 110 and the floor and/or surface upon which the plurality of locomotion components 140.

In an arrangement shown, as one example, the plurality of locomotion components 140 may comprise two main wheels. Each location is configured at a parallel spaced relation to one another for ergonomic benefits of the user 300. While two of the plurality of locomotion components 140 are shown in FIGS. 1-8, in an arrangement as one example, any number of the plurality of locomotion components 140 are hereby contemplated for use; including but not limited to, one, three, four (as shown in FIG. 9 and FIG. 10), or any other number of the plurality of locomotion components 140 as deemed suitable for ease of use and functionality of the personal mobility system 110.

While a rubber wheel and/or rubber wheels are considered herein for the construction of the mobility features, in an arrangement shown, as one example, other materials are also hereby contemplated for use. Other mobility features may be rollers, wheels, grips, or other lightweight materials that are easy to maneuver and easy to use and safe, or any other material or combination thereof, or that may improve the balance of the user 300.

Elevation Assistance System.

With reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 18, FIG. 26, FIG. 27, FIG. 28, FIG. 29, FIG. 30, FIG. 31, FIG. 32, and FIG. 34, the personal mobility system 110 may comprise a plurality of elevation assistance components 150 (or "lever system", or "standing system"). The plurality of elevation assistance components 150 is formed of any suitable size, shape, and design and is configured to provide assistance to a user 300, that is, to allow the user 300 to assist themselves by making use of the plurality of elevation assistance components 150, when standing and/or sitting, or from any position to any other position. In this way, when a user wishes to engage the personal mobility system 110, the user can first engage the plurality of elevation assistance components 150 such that the user 300 can go from a seated position to a standing position with ease and without the need of an additional device. Additionally, in this way, a user 300 needs and/or desires to stand without the personal mobility system 110 in place as it will be needed. Conversely, the plurality of elevation assistance components 150 is also configured to aid a user in sitting after the personal mobility system 110 has been utilized.

In an arrangement shown, as one example, the plurality of elevation assistance components 150 extends from a top 152 to a bottom 154; the plurality of elevation assistance components 150 having a front 155 and a rear 156 and a left side 158 and a right side 159. In an arrangement shown, as one example, the plurality of elevation assistance components 150 also may comprise a plurality of elevation handles 160 (the plurality of elevation handles 160 of the plurality of elevation assistance components 150 to be further described herein). In an arrangement shown, as one example, the elevation assistance system 150 also may comprise a plurality of vertical elevation supports 164 (the plurality of vertical elevation supports 164 of the plurality of elevation assistance components 150 to be further discussed herein). Additionally, and in an arrangement shown, as one example, the plurality of elevation assistance components 150 may comprise a plurality of ground support components 170 (the plurality of ground support components 170 of the plurality of elevation assistance components 150 to be further discussed herein). Additionally, and in an arrangement shown, the plurality of elevation assistance components 150 may further comprise a plurality of attachments 176. In other aspects of the present disclosure, the main body 120 (rather than the plurality of elevation assistance components 150) may comprise the plurality of ground support components 170.

In another aspect of the present disclosure, the plurality of elevation assistance components 150 may comprise a contiguous component of the main body 120, such that the main body 120 comprises the plurality of elevation assistance components 150 and the plurality of elevation assistance components 150 is a plurality of components of the main body 120. In such an aspect of the present disclosure, the various components comprising the plurality of elevation assistance components 150 may be implemented within or as components of the main body 120. In such an aspect of the present disclosure, the plurality of ground support components 170 may be implemented separately from the plurality of elevation assistance components 150.

Plurality of Handle Features of the Elevation Assistance System.

With reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 18, FIG. 24, FIG. 26, FIG. 27, FIG. 28, FIG. 29, FIG. 30, FIG. 31, FIG. 32, and FIG. 34, the plurality of elevation assistance components 150 may comprise at least one from the plurality of elevation handles 160 (or "handle", "handle component", or simply "grip"). The plurality of elevation handles 160 is formed of any suitable size, shape, and design and is configured to be the primary gripping location for a user when the user is engaging, moving, or standing up to engage with the personal mobility system 110 and/or sitting down to disengage from the personal mobility system 110. In this way, the plurality of elevation handles 160 (not to be confused with the plurality of main handles 130 of the main body 120) is the holding point on the plurality of elevation assistance components 150 at which a user 300 will typically grip the plurality of elevation assistance components 150 so as to propel themselves upward from a seated position or to aid themselves downward from a standing position. In this way, the plurality of elevation handles 160 is the primary interaction point for a user 300 when engaging with the plurality of elevation assistance components 150, so as to stand and/or sit.

In an arrangement shown, as one example, the plurality of elevation handles 160 may comprise two main handle grip locations. Each location is configured at an angle to the main body 120 and at an angle to one another for ergonomic benefits of the user 300 while standing and or sitting. In this way, a user 300 can grip two of the plurality of elevation handles 160 at the same time with ease and with the arms of the user 300 in a great position to appropriately aid in the user 300 standing and/or sitting.

While two of the plurality of elevation handles 160 are shown, in the arrangements of FIG. 1, FIG. 2, FIG. 3, FIG. 4, FIG. 6, FIG. 7, FIG. 8, FIG. 9, FIG. 10, FIG. 26, FIG. 27, FIG. 28, FIG. 29, FIG. 30, FIG. 31, FIG. 32, and FIG. 34, another number of the plurality of elevation handles 160 are hereby contemplated for use in controlling the personal mobility system 110, or in aiding in standing and/or sitting. For example, additional of the plurality of elevation handles 160 may be located to the front of the user 300, as opposed to the side of the user 300 or in other locations, that provide flexibility for the user 300. Other numbers of the plurality of elevation handles 160 are hereby contemplated for use, including but not limited to, a single one of the plurality of elevation handles 160—which may be configured as a bar or rod or single curved piece or the like, or may be configured as three, four, five, six, seven, eight, nine, or any other number of the plurality of elevation handles 160 as deemed suitable for ease of use. Furthermore, the plurality of elevation handles 160 may be in a ladder-like arrangement or may be in multiple positions to aid the user at different levels of standing and/or sitting. The plurality of plurality of elevation handles 160 may comprise hand grips, one or more bars, forearm pads or other objects suitably disposed for a user 300 to rest arms, torso, palms, or another body part on, or other types of objects or surfaces.

In the arrangement shown, as one example, the plurality of elevation handles 160 are arranged at an angle that is approximately 30 degrees from parallel with the front of a user 300. However, other incline angles are hereby contemplated for use, including but not limited to an incline angle of 0-5 degrees, an incline angle of 5-10 degrees, an incline angle of 10-15 degrees, an incline angle of 15-20 degrees, an incline angle of 20-25 degrees, an incline angle of 25-30 degrees, an incline angle of 30-35 degrees, an incline angle of 35-40 degrees, or an incline angle of 40-45 degrees, an incline angle of 45-50 degrees, an incline angle of 50-55 degrees, an incline angle of 55-60 degrees, an incline angle of 60-65 degrees, an incline angle of 65-70 degrees, an incline angle of 70-75 degrees, an incline angle of 75-80 degrees, an incline angle of 80-85 degrees, an incline angle of 85-90 degrees, and the like. Similarly, other incline angles are also hereby contemplated for use, which change the angle of association with the plurality of elevation assistance components 150 in a vertical orientation as well as in a horizontal orientation.

While a metal alloy is considered herein for the construction of the handles of the support system and the support system itself, in the arrangement shown, as one example, other materials are also hereby contemplated for use. Other materials may be wood, polymers, enhanced polymers, a combination of cushioned materials and polymers, a combination of metals, alloys, or other lightweight materials that are easy to maneuver and easy to use and safe, or any other material or combination thereof.

Plurality of Supports.

With reference to FIG. 5, FIG. 7, FIG. 8, FIG. 10, FIG. 11, FIG. 12, FIG. 13, FIG. 14, FIG. 26, FIG. 27, FIG. 28, FIG. 29, FIG. 30, FIG. 31, FIG. 32, and FIG. 34, the plurality of elevation assistance components 150 may comprise a plurality of vertical elevation supports 164 (or "structure", "bars", or simply "supports") and may include a plurality of horizontal-elevation-supports 166. The plurality of vertical elevation supports 164 are formed of any suitable size, shape, and design and is configured to make up the main structure of the plurality of elevation assistance components 150. In an arrangement shown, as one example, the plurality of elevation assistance components 150 comprises the plurality of vertical elevation supports 164 and the plurality of horizontal-elevation-supports 166. In the arrangement shown, as one example, the plurality of vertical elevation supports 164 comprise approximately vertical bar-shaped, elongated structures, and the plurality of horizontal-elevation-supports 166 comprise approximately horizontal bar-shaped, elongated structures, wherein the plurality of vertical elevation supports 164 and the plurality of horizontal-elevation-supports 166 connect in a frame-like pattern such that a stable frame is formed. In this way, the plurality of vertical elevation supports 164 and the plurality of horizontal-elevation-supports 166 form the plurality of elevation assistance components 150 of the personal mobility system 110 by a plurality of elongated bars and connections.

In an arrangement shown, as one example, the plurality of vertical elevation supports 164 and the plurality of horizontal-elevation-supports 166 comprise individual bars and/or individual pieces which are then connected through permanent connection methods or by attaching with fasteners and or adhesives, welding, or any other connection means. However, the plurality of elevation assistance components 150 may also be formed of a single unitary construction through a single extrusion, single mold, or the like. In this way, a single, unitary piece is formed. In this way, the plurality of elevation assistance components 150 may be stronger and easier to make and use.

In an arrangement shown, as one example, the plurality of elevation assistance components 150 comprises a plurality of vertical elevation supports 164, wherein the plurality of vertical elevation supports 164 are two and are approximately vertically positioned. Connecting the two of the plurality of vertical elevation supports 164 at each side of the plurality of elevation assistance components 150 are two of the horizontal-elevation-supports 166, which are approximately horizontally positioned. One of the horizontal-elevation-supports 166 is located near the top 152 of the plurality of elevation assistance components 150, which extends from one of the plurality of vertical elevation supports 164 to the other of the plurality of vertical elevation supports 164. Additionally, a lower one of the horizontal-elevation-supports 166 connects the two of the plurality of vertical elevation supports 164 nearer the bottom 154 of the plurality of elevation assistance components 150. Additionally, any of the horizontal-elevation-supports 166 connecting the two of the plurality of vertical elevation supports 164 at or near the top 152 may act as a handle feature. It will be apparent to one of skill in the art that any number of the plurality of vertical elevation supports 164 and any number of the plurality of horizontal-elevation-supports 166 may be used.

In an arrangement shown, as one example, two of the horizontal-elevation-supports 166 extend outwardly, and perpendicularly to each or any of the plurality of vertical elevation supports 164. The horizontal-elevation-supports 166 may comprise the plurality of ground support components 170. The plurality of ground support components 170 are discussed further herein.

In an arrangement shown, as one example, two of the plurality of vertical elevation supports 164 may be connected by any of the horizontal-elevation-supports 166 to form part of the plurality of elevation assistance components 150. However, any other number of the plurality of vertical elevation supports 164 and any other number of horizontal-elevation-supports 166 is hereby contemplated for use. Said another way, the plurality of elevation assistance components 150 may have three of the plurality of vertical elevation supports 164, four of the plurality of vertical elevation supports 164, five of the plurality of vertical elevation supports 164 or more of the plurality of vertical elevation supports 164 as appropriate. Said another way, the personal mobility system 110 may have a single one of the horizontal-elevation-supports 166, two of the horizontal-elevation-supports 166, three of the horizontal-elevation-supports 166, four of the horizontal-elevation-supports 166, or more of the horizontal-elevation-supports 166 in the plurality of horizontal-elevation-supports 166. Additionally, and as contemplated earlier herein, the system may be a unitary construction with supports, but may also be a single unitary construction in which the supports are not elongated bars but singular panels of unitary construction and/or extrusion.

The angle of the plurality of vertical elevation supports 164 and of the plurality of horizontal-elevation-supports 166 is extremely important for enhancing the stability of the plurality of elevation assistance components 150. The angle of the plurality of vertical elevation supports 164 is also critical in the physics of enhancing the stability of the plurality of elevation assistance components 150 to prevent tipping or falling during the standing and/or sitting process, which can occur from use during the operation of the personal mobility system 110.

In an arrangement shown, as one example, the plurality of vertical elevation supports 164 are arranged at an angle that is approximately 88 degrees from perpendicular with a floor. In another embodiment, the arrangement of the plurality of vertical elevation supports 164 at an angle of 70-75 degrees is specifically resistant to tipping for a user 300, among a typical range of heights and weights of a user 300. However, other angles, when measured from a perpendicularly situated floor or other surface are hereby contemplated for use, including but not limited to an incline angle of 50-55 degrees, an incline angle of 55-60 degrees, an incline angle of 60-65 degrees, an incline angle of 65-70 degrees, an incline angle of 80-85 degrees, an incline angle of 85-90 degrees, and the like. Similarly, other incline angles are also hereby contemplated for use, which change the angle of association with the plurality of elevation assistance components 150 in a horizontal orientation as well.

While a metal alloy is considered herein for the construction of the plurality of vertical elevation supports 164, in the arrangement shown, as one example, other materials are also hereby contemplated for use. Other materials may be wood, polymers, enhanced polymers, a combination of cushioned materials and polymers, a combination of metals, alloys, or other lightweight materials that are easy to maneuver and easy to use and safe, or any other material or combination thereof.

Plurality of Stabilizer Features.

With reference to FIG. 1, FIG. 2, FIG. 5, FIG. 6, FIG. 7, FIG. 8, FIG. 9, FIG. 10, FIG. 11, FIG. 12, FIG. 13, FIG. 14, FIG. 19 and FIG. 20, the plurality of elevation assistance components 150 comprises a plurality of ground support components 170 (which may be referred to herein as a, or a plurality of, “ground support”, “ground stabilizer”, “ground support feature”, or simply “grounder”). The plurality of ground support components 170 may be formed of any suitable size, shape, and design and are configured to engage and disengage the floor surface during the standing and/or sitting process. In this way, and in the arrangement shown as one example, the plurality of ground support components 170 engages the ground and/or floor surface in order to stabilize and/or lock the personal mobility system 110 in place while the user 300 engages the plurality of elevation assistance components 150 in order to move from a standing to a seated position and/or as the user 300 moves from a seated to a standing position, or between a prone position and some other position. In the arrangement shown, as one example, the plurality of ground support components 170 comprise approximately two generally horizontal bar-shaped, elongated structures that connect to the plurality of elevation assistance components 150 nearer the bottom of the plurality of vertical elevation supports 164; extending outwardly and perpendicularly from the plurality of elevation assistance components 150.

In the arrangement shown, as one example, the plurality of ground support components 170 comprise individual bars or individual pieces which are then connected through permanent connection methods or by attaching with fasteners and or adhesives, welding, or any other connection means. However, the plurality of ground support components 170 may comprise a single unitary construction through a single extrusion, single mold, or the like which is a singular piece with the plurality of elevation assistance components 150. In this way, a single, unitary piece is formed. In this way, the plurality of elevation assistance components 150 may be stronger and easier to make and use.

In the arrangement shown, as one example, two of the horizontal supports are connected by the plurality of elevation assistance components 150. However, any other number of supports is hereby contemplated for use. Said another way, the plurality of ground support components 170 may have three horizontal and/or vertical supports, four vertical and/or horizontal supports, five vertical and/or horizontal supports or more vertical and/or horizontal supports as appropriate. Said another way, the plurality of ground support components 170 may have a single horizontal support, two horizontal supports, three horizontal supports, four horizontal supports, or more horizontal supports. Additionally, and as contemplated earlier herein, the system may be a unitary construction with supports, but may also be a single unitary construction in which the supports are not elongated bars but singular panels of unitary construction and/or extrusion.

In other aspects of the present disclosure, the main body 120 may comprise the plurality of ground support components 170. The main body 120 may comprise the plurality of ground support components 170 in aspects of the present disclosure wherein the main body 120 and the plurality of elevation assistance components 150 are separate assemblies or construction. The main body 120 may comprise the plurality of ground support components 170 in aspects of the present disclosure wherein the main body 120 and the plurality of elevation assistance components 150 are a contiguous assembly or construction, that is, in aspects of the present disclosure where the main body 120 may comprise the plurality of ground support components 170.

The angle of the plurality of ground support components 170 is important for enhancing the stability of the plurality of elevation assistance components 150 during the standing and/or sitting movement of a user 300. The angle of the plurality of ground support components 170 is also critical in the physics of enhancing the stability of the plurality of elevation assistance components 150 to prevent tipping or falling during the standing and/or sitting process, which can occur from use during the operation of the personal mobility system 110.

In the arrangement shown, as one example, the plurality of ground support components 170 are arranged at an angle that is approximately 80-90 degrees and 90-110 degrees from the plurality of vertical elevation supports 164 of the plurality of elevation assistance components 150. In another embodiment, the arrangement of the plurality of horizontal-elevation-supports 166 at an angle of 95 degrees is specifically resistant to tipping for a user 300, among a typical range of heights and weights of a user 300. However, other angles, when measured from a perpendicularly situated floor are hereby contemplated for use, including but not limited to an incline angle of 50-55 degrees, an incline angle of 55-60 degrees, an incline angle of 60-65 degrees, an incline angle of 65-70 degrees, an incline angle of 80-85 degrees, an incline angle of 85-90 degrees, an incline angle of 95-100 degrees, and incline angle of 100-105 degrees, an incline angle of 105-110, an incline angle of 110-115, an incline angle of greater than 115 degrees, and the like. Similarly, other incline angles are also hereby contemplated for use, which change the angle of association with the plurality of elevation assistance components 150 in a horizontal orientation as well.

While a metal alloy is considered herein for the construction of the plurality of ground support components 170, in the arrangement shown, as one example, other materials are also hereby contemplated for use. Other materials may be wood, polymers, enhanced polymers, a combination of cushioned materials and polymers, a combination of metals, alloys, or other lightweight materials that are easy to maneuver and easy to use and safe, or any other material or combination thereof.

Plurality of Stabilizer Pads.

With reference to FIG. 5, FIG. 6, FIG. 7, FIG. 8, FIG. 11, FIG. 12, FIG. 13, FIG. 14, FIG. 18, FIG. 18A, FIG. 19, and FIG. 20, the plurality of ground support components 170 may comprise a plurality of stabilizer pads 172. The plurality of stabilizer pads 172 may be formed of any suitable size, shape, and design, and is configured to provide grip and friction between the plurality of ground support components 170 and the floor or other surface with which the plurality of ground support components 170 is engaging. In the arrangement shown, as one example, the one of the plurality of stabilizer pads 172 is formed of a circular rubber pad. However, other stabilizer features, including but not limited to anti-slip materials, are hereby contemplated for use. In some aspects of the present disclosure, the plurality of ground support components 170 may further comprise a plurality of feet 174. The plurality of feet 174 may be affixed at or comprise the distal ends of the plurality of ground support components 170, the distal ends of the plurality of ground support components 170 being the ends farther from the front 125. The plurality of stabilizer pads 172 may be affixed to the plurality of feet 174.

Elastic Stabilizer Mechanism.

With reference to FIG. 5, FIG. 11, FIG. 12, FIG. 13, FIG. 14, FIG. 15, FIG. 16, FIG. 17, FIG. 18, FIG. 18A, FIG. 19, and FIG. 20, personal mobility system 110 may comprise a plurality of elastic stabilizer mechanisms 180. The plurality of elastic stabilizer mechanisms 180 (or “extension system”, “extension mechanism”, or “engagement mechanism”) is formed of any suitable size, shape, and design.

In one aspect of the present disclosure, the plurality of elastic stabilizer mechanisms 180 may be configured as part of the connection of the main body 120 to the plurality of elevation assistance components 150. In another aspect of the present disclosure, the personal mobility system 110 may not comprise the plurality of elevation assistance components 150 and the plurality of elastic stabilizer mechanisms 180 may be comprised of components, as disclosed herein, without the plurality of elevation assistance components 150. In another aspect of the present disclosure, the plurality of elevation assistance components 150 may be reduced in scope, and aspects of the plurality of elevation assistance components 150 may be present and affixed to the plurality of elastic stabilizer mechanisms 180, without all possible aspects of the plurality of elevation assistance components 150, while other aspects that may be components of the plurality of elevation assistance components 150 may comprise components of the main body 120. In another aspect of the present disclosure, the main body 120 may comprise the plurality of elevation assistance components 150, and the plurality of elastic stabilizer mechanisms 180 may be configured on, with, or to the main body 120.

With reference to FIG. 5, FIG. 11, FIG. 12, FIG. 13, FIG. 14, FIG. 15, FIG. 16, FIG. 17, FIG. 18, FIG. 18A, FIG. 19, and FIG. 20, the plurality of elastic stabilizer mechanisms 180 comprises a plurality of elastic deformation components 182, a plurality of ground-elastic attachment components 183, a plurality of ground units 184, each of the plurality of ground units 184 comprising a ground unit proximal end 185 and a ground unit distal end 186, and a plurality of ground-main rotational joints 188.

With reference to FIG. 5, FIG. 14, FIG. 15, FIG. 16, FIG. 17, FIG. 18, FIG. 18A, FIG. 19, FIG. 20, FIG. 26, FIG. 27, FIG. 28, FIG. 29, FIG. 30, FIG. 31, FIG. 32, FIG. 33, and FIG. 34, the main body 120 may further comprise a plurality of body lower arms 142. The body lower arms 142 may advantageously extend backwards from the front 125 of the main body 120, though other arrangements of the body lower arms 142 are possible. Each of the plurality of body lower arms 142 comprises a lower arm proximal end 143, proximal as it is nearer to the front 125, and a lower arm distal end 144, distal as it is farther from the front 125, and therefore closer to the user 300 in most uses of the personal mobility system 110. Collectively, each lower arm distal end 144 may be referred to as a plurality of lower arm distal ends 144. In some aspects of the present disclosure, with further reference to FIG. 26, FIG. 27, FIG. 28, FIG. 29, FIG. 30, FIG. 31, FIG. 32, FIG. 33, and FIG. 34, the body lower arms 142 may not be present, and instead, the plurality of vertical elevation supports 164 may extend from a subset of the plurality of locomotion components 140 to the plurality of plurality of elevation handles 160, respectively for the number of each of the foregoing. In such aspects, the plurality of plurality of vertical elevation supports 164 may be affixed to the vertical main supports 132 with the plurality of main-elevation-horizontal-supports 135, as further discussed herein.

With reference to FIG. 26, FIG. 27, FIG. 28, FIG. 29, FIG. 30, FIG. 31, FIG. 32, and FIG. 34, the plurality of elastic stabilizer mechanisms 180 may be configured as part of the connection of the main body 120 to the plurality of elevation assistance components 150, as discussed previously herein, and specifically, the plurality of elastic stabilizer mechanisms 180 may be formed as part of the plurality of main-elevation-horizontal-supports 135, such that the plurality of main-elevation-horizontal-supports 135 comprise the plurality of elastic stabilizer mechanisms 180. In such aspects of the present disclosure, the plurality of elastic stabilizer mechanisms 180 comprises the plurality of elastic deformation components 182, as discussed herein, such that the elastic deformation taught with regard to the plurality of elastic deformation components 182 occurs on, in, or around the plurality of main-elevation-horizontal-supports 135. In such aspects of the present disclosure, as one example, the plurality of elastic stabilizer mechanisms 180 and the plurality of elastic deformation components 182 connect and function as described elsewhere in the present disclosure. The plurality of main-elevation-horizontal-supports 135 may, in such aspects, be utilized like the plurality of ground units 184 to comprise or otherwise contain the plurality of elastic stabilizer mechanisms 180, and in such aspects, the plurality of main-elevation-horizontal-supports 135 may comprise the plurality of ground-main rotational joints 188.

Each of the plurality of ground units 184 and the plurality of body lower arms 142 engage together in an approximate area of their respective proximal ends, the lower arm proximal end 143 and the proximal end 185, forming and being engaged together at and with the plurality of ground-main rotational joints 188. Each of the plurality of ground-main rotational joints 188 may comprise a pivot, a hinge, a rotational mechanism, or other mechanisms now known or later invented that allows the plurality of ground units 184 and the plurality of body lower arms 142 (and thus the main body 120) to rotate relative to each other.

Each of the plurality of ground units 184 and the plurality of body lower arms 142 engage together in an approximate area of their respective distal ends, lower arm distal end 144 and the distal end 186, at or with the plurality of elastic deformation components 182, Therefore, as each lower arm proximal end 143 and each proximal end 185 rotates relative to each other at the plurality of ground-main rotational joints 188, each of the plurality of lower arm distal ends 144 and each of the plurality of distal end 186 move relatively away from each other exerting force on the elastic deformation components 182; it being understood that the foregoing description applies to each respective pair or set of one or more of the lower arm proximal end 143 and one or more of the proximal end 185. Thereafter, each of the plurality of lower arm distal ends 144 and each of the plurality of distal end 186 move relatively towards each other, driven or assisted by the plurality of elastic deformation components 182 and the energy stored in the plurality of elastic deformation components 182. With the plurality of elastic deformation components 182 absorbing force and then returning it to the rest of the personal mobility system 110, the plurality of elastic deformation components 182 reduce the likelihood of the personal mobility system 110 tipping, and serve to keep the personal mobility system 110—and the user 300 using it—upright. The plurality of ground-elastic attachment components 183 affix the plurality of elastic deformation components 182 to the plurality of ground units 184 and affix the plurality of ground-elastic attachment components 183 to the plurality of body lower arms 142. A tip force 220 is applied, typically by the user 300 losing their balance, or beginning to fall or trip, to the personal mobility system 110, and the tip force 220 is typically applied at the main body 120 or the plurality of main handles 130, though the tip force 220 could be applied to any components of the main body 120 or of the personal mobility system 110.

Figure 25A:
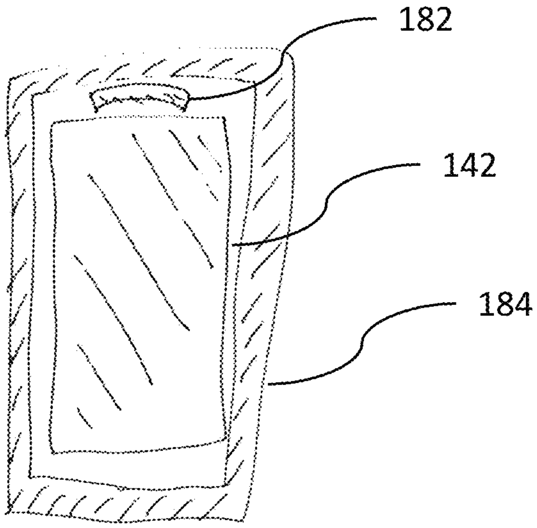
FIG. 25A, FIG. 25B, and FIG. 25C each show a different cross-sectional view of aspects of the apparatus of the present disclosure.
Figure 25B:
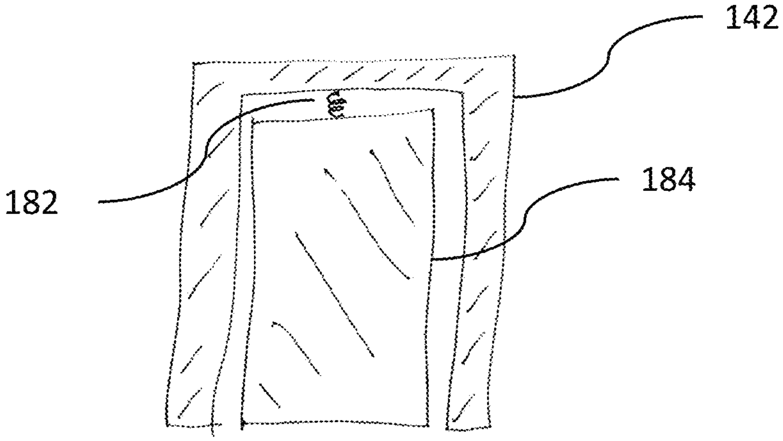
Figure 25C:
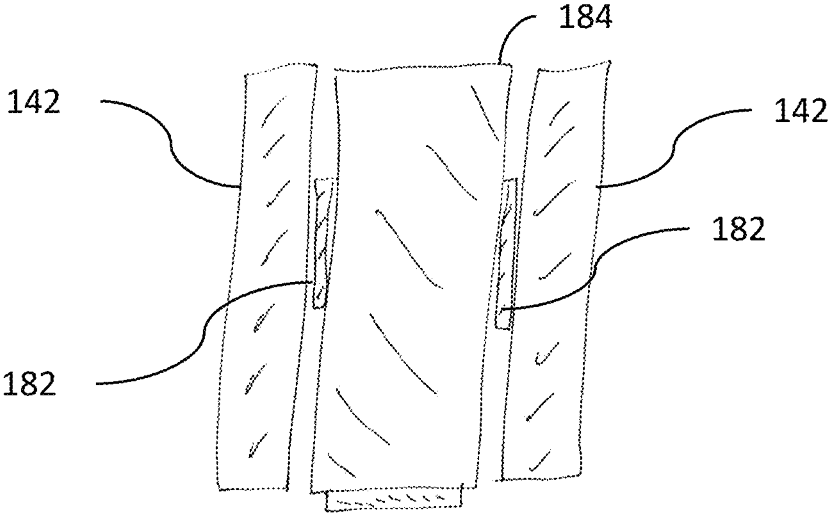
Figure 26:
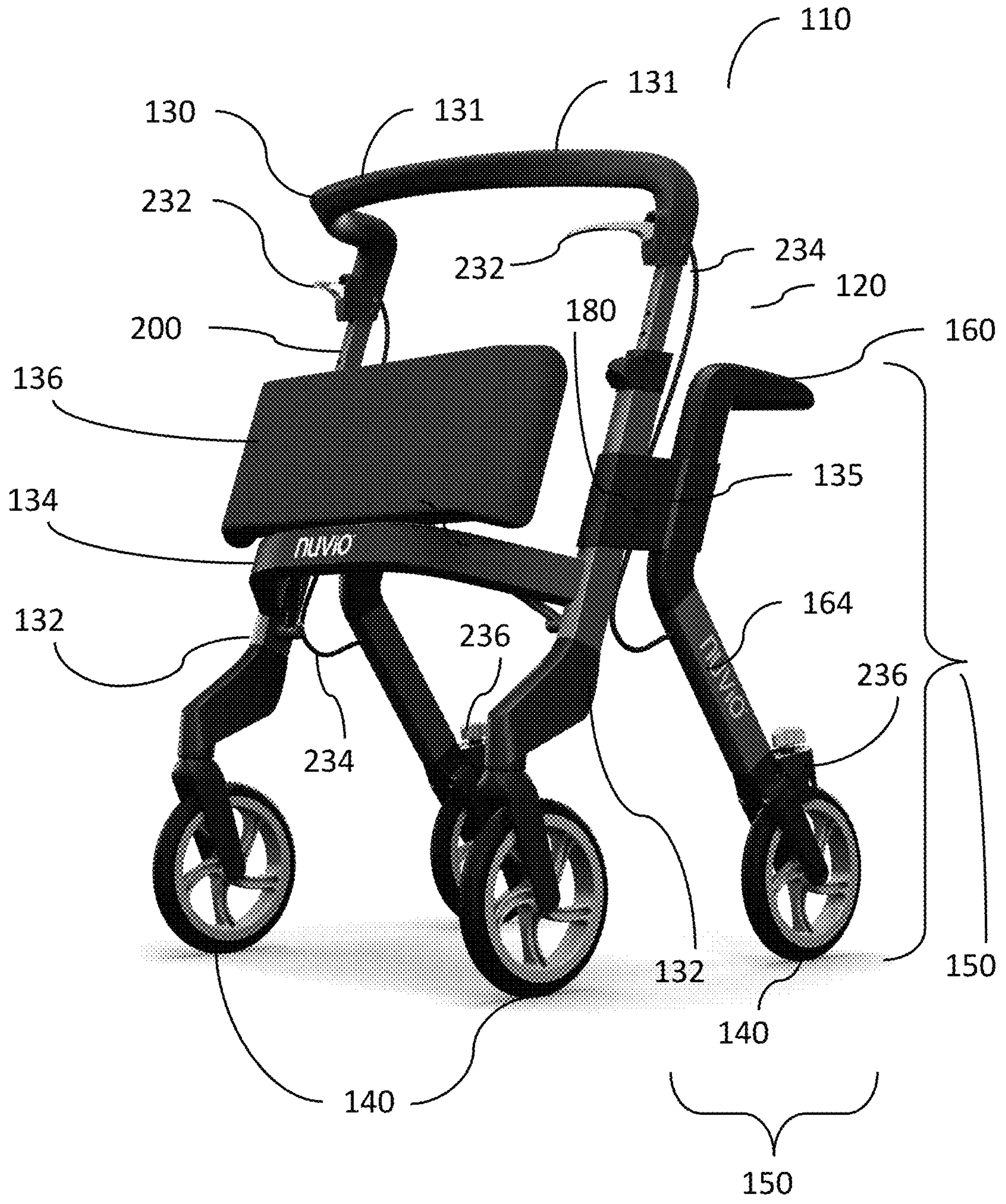
FIG. 26 shows a front and side perspective view of an aspect of the apparatus of the present disclosure.
Figure 27:
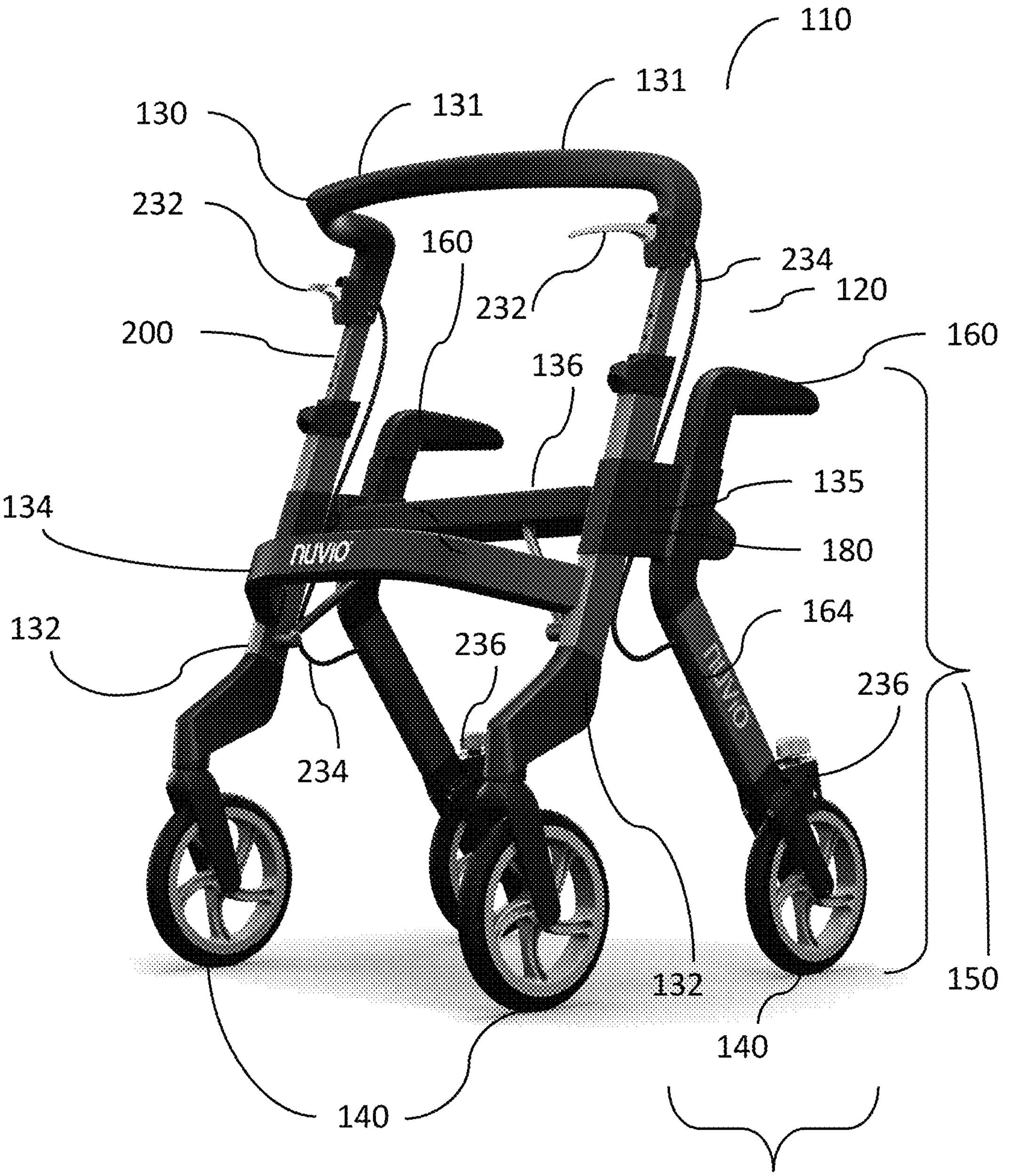
FIG. 27 shows a front and side perspective view of an aspect of the apparatus of the present disclosure.
Figure 28:
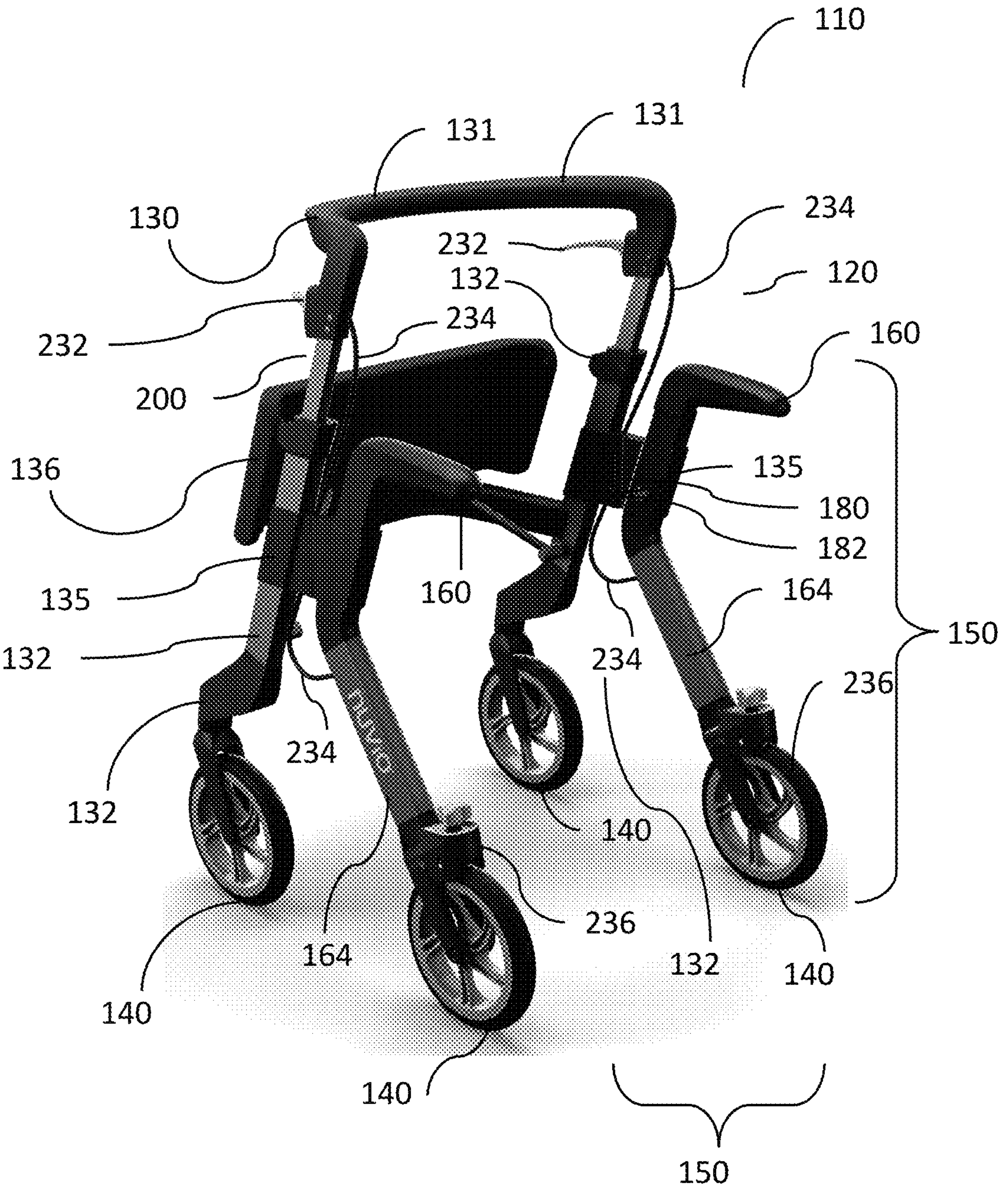
FIG. 28 shows a rear and top perspective view of an aspect of the apparatus of the present disclosure.
Figure 29:
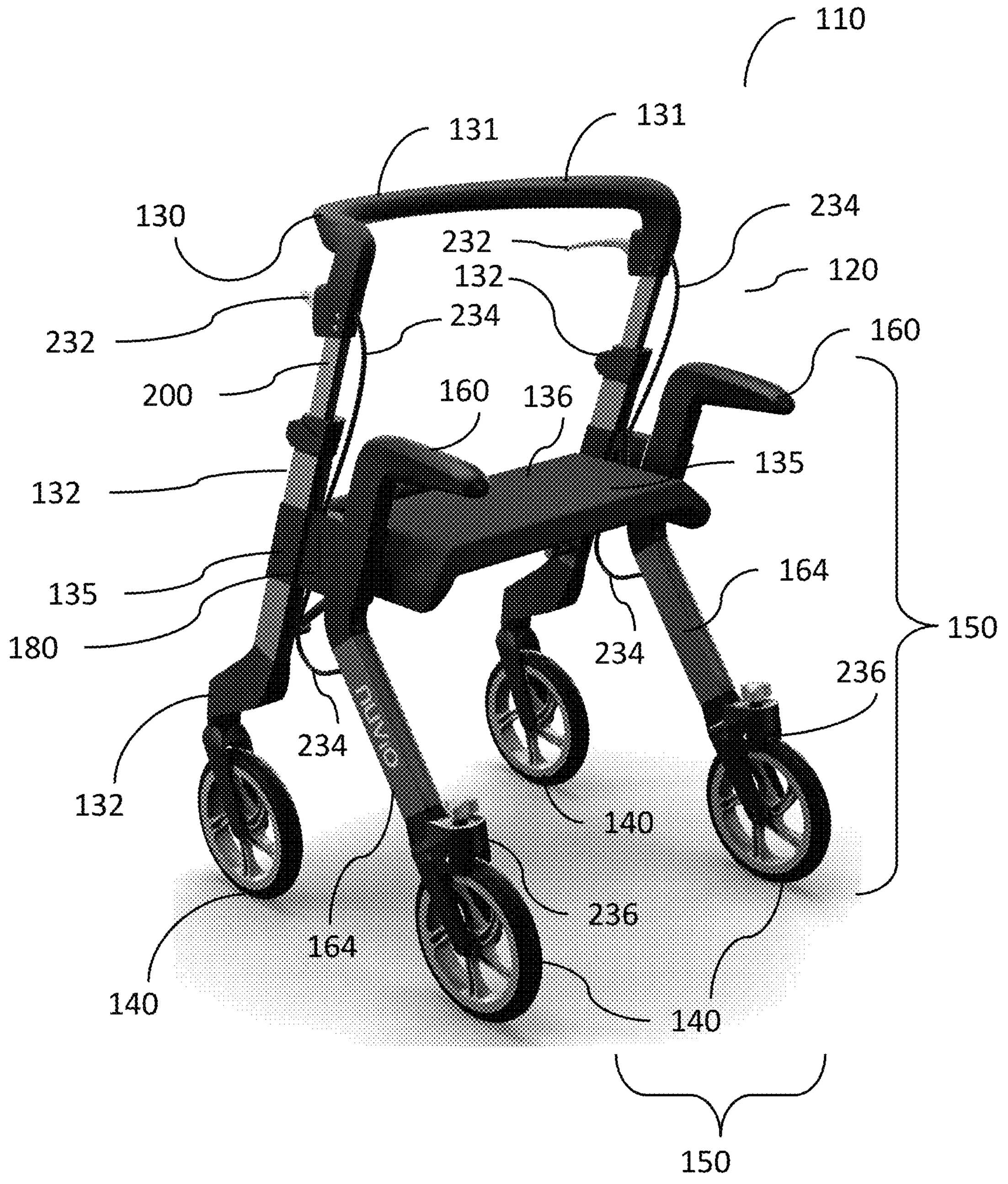
FIG. 29 shows a rear and top perspective view of an aspect of the apparatus of the present disclosure.
Figure 30:
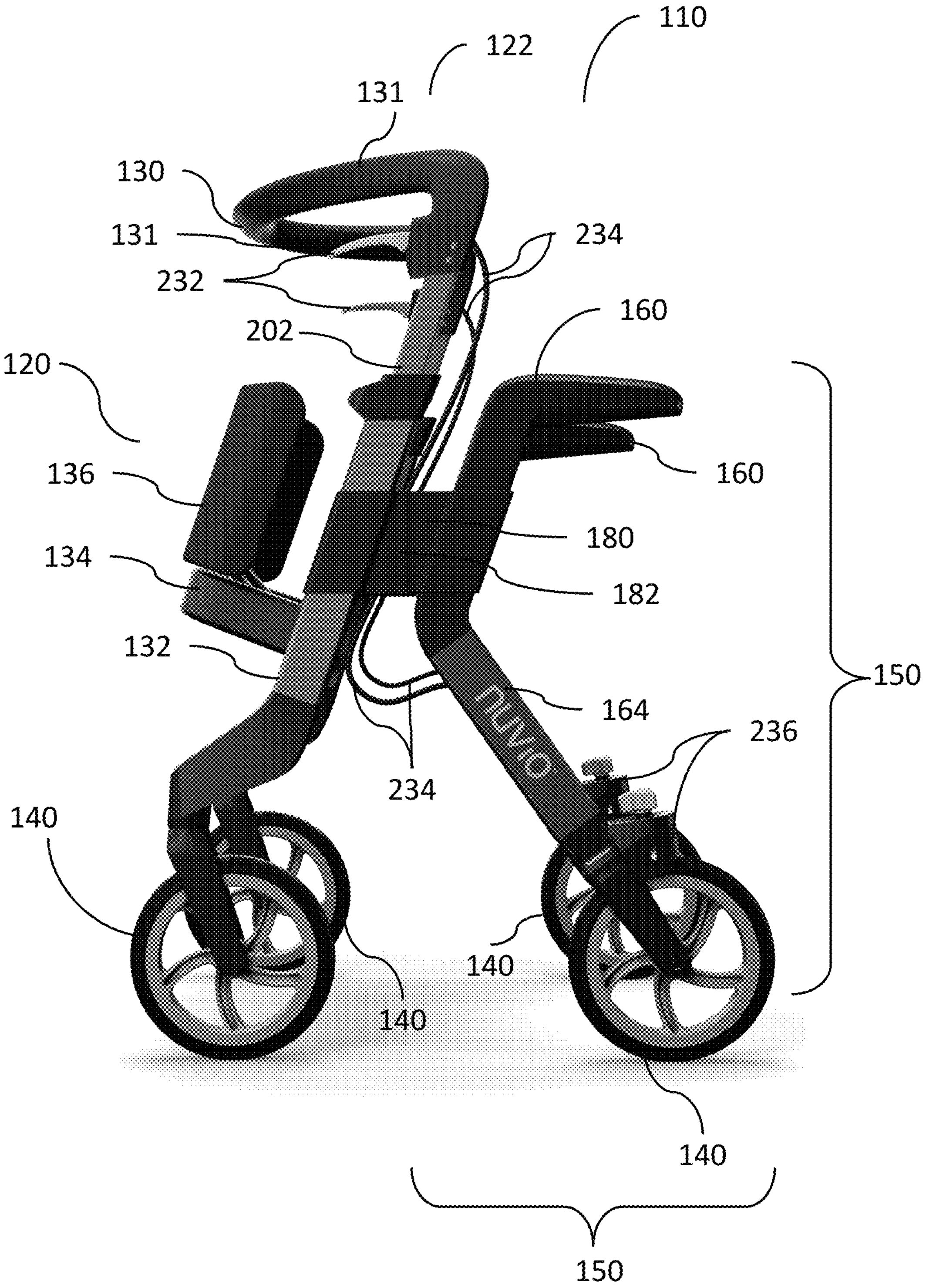
FIG. 30 shows a left side perspective view of an aspect of the apparatus of the present disclosure.
Figure 31:
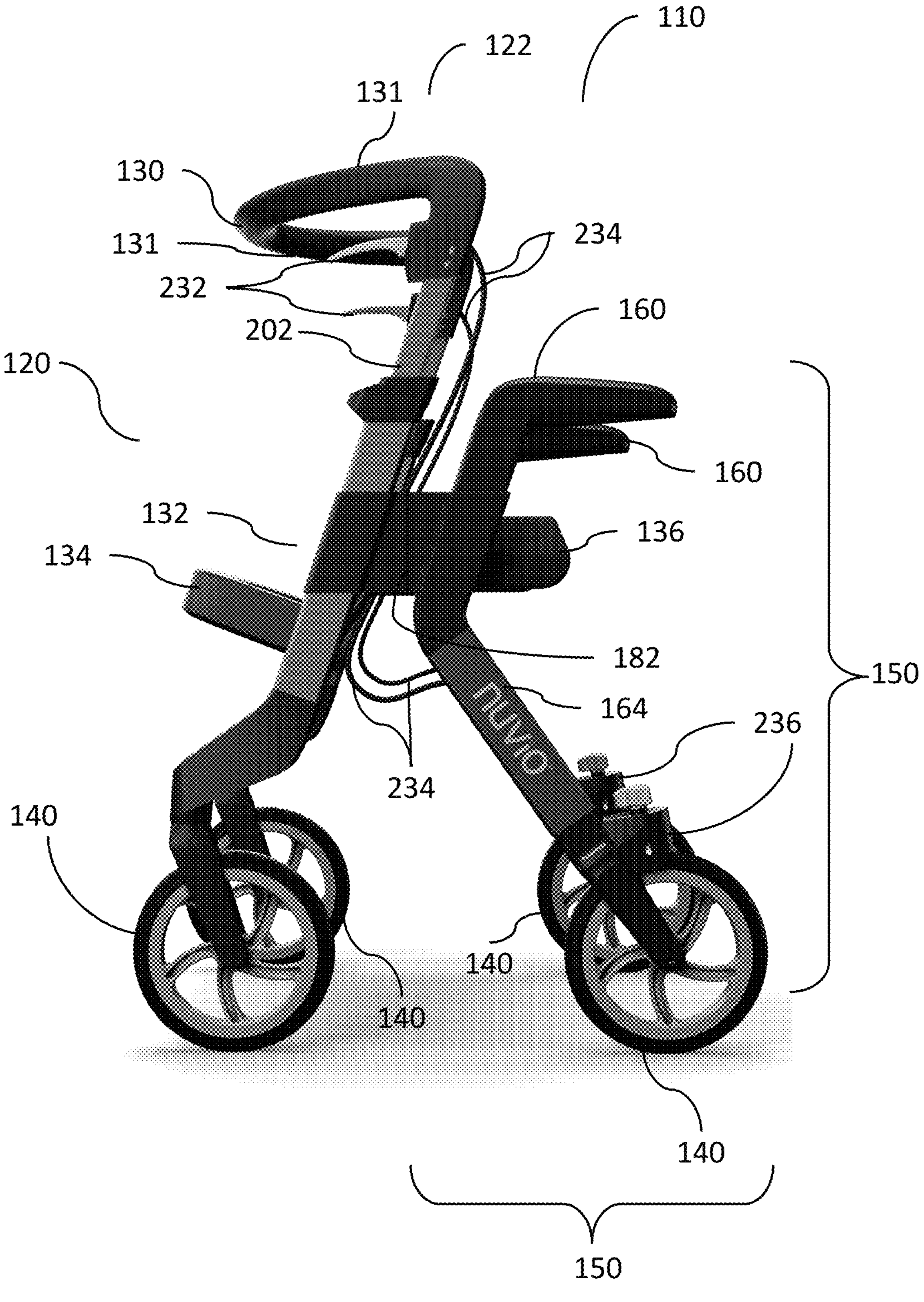
FIG. 31 shows a left side perspective view of an aspect of the apparatus of the present disclosure.
Figure 32:
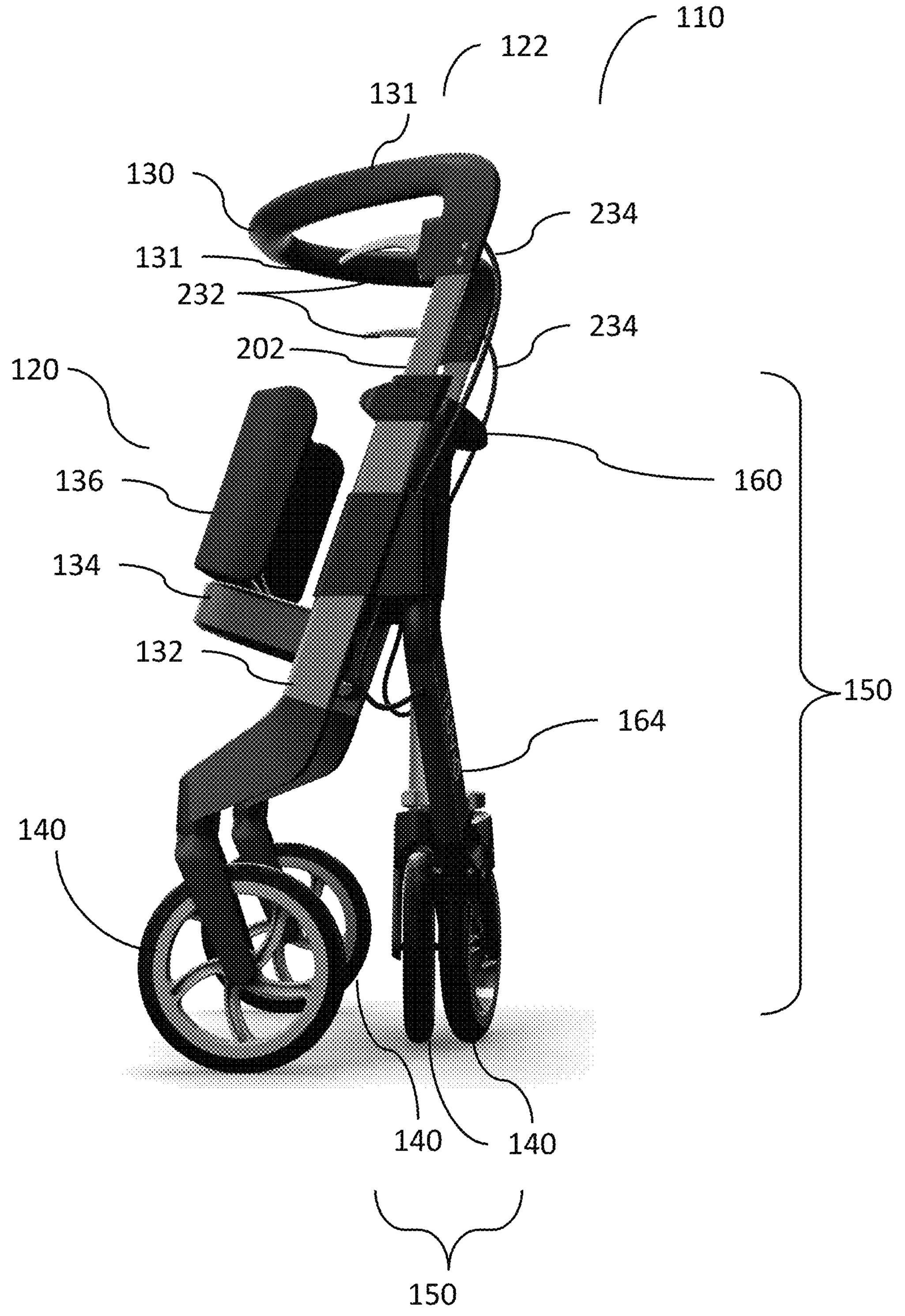
FIG. 32 shows a left side perspective view of an aspect of the apparatus of the present disclosure, when folded.
Figure 33:
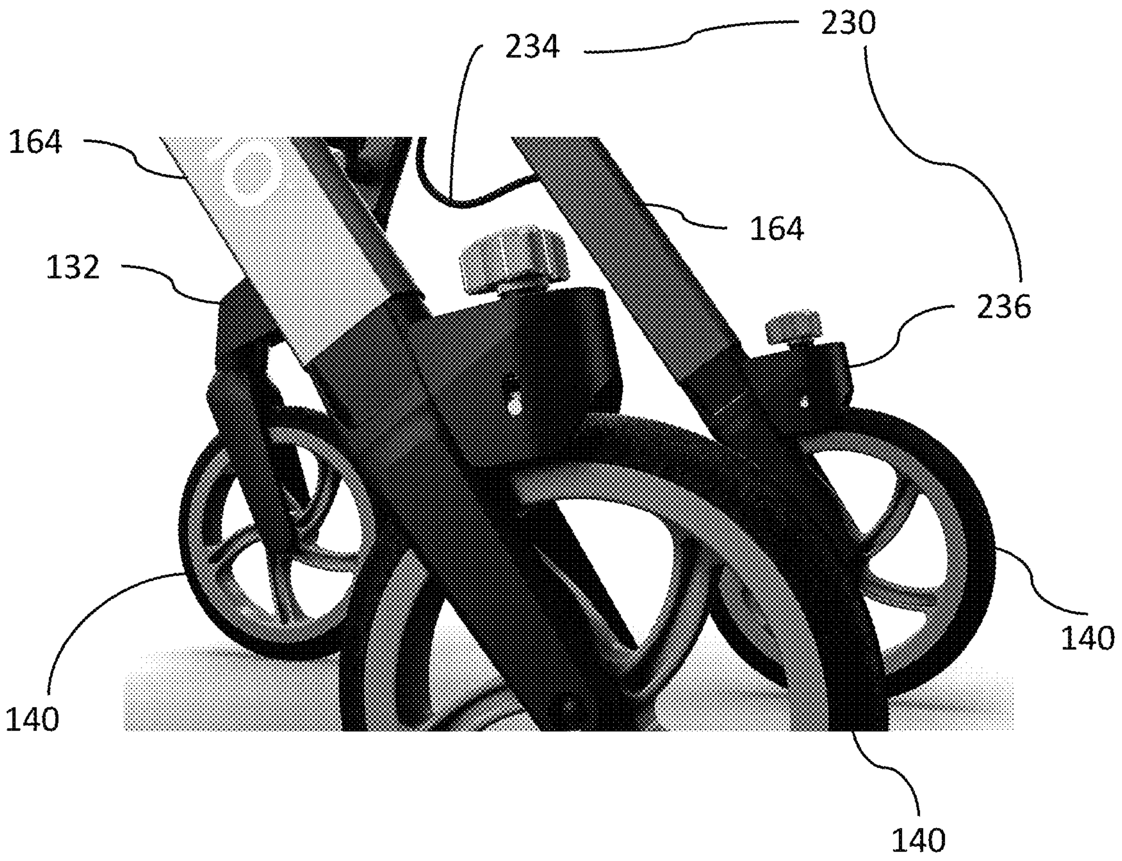
FIG. 33 shows a side perspective view of a portion of an aspect of the apparatus of the present disclosure.
Figure 34:
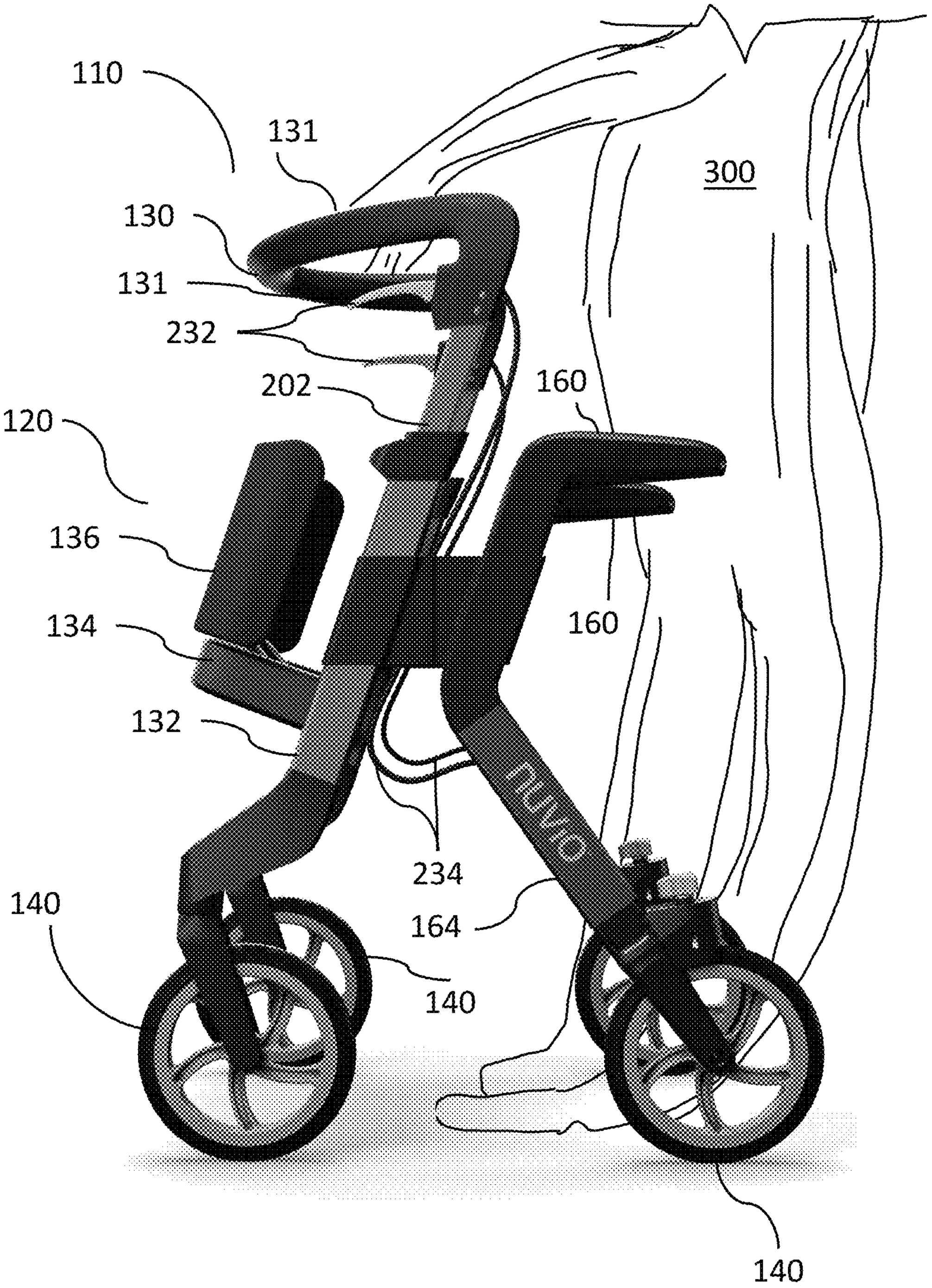
FIG. 34 shows a left side perspective view of an aspect of the apparatus of the present disclosure, with a representation of a user in one possible use of the apparatus.

A variety of arrangements of the plurality of ground units 184 and the plurality of body lower arms 142 and the plurality of elastic deformation components 182 are possible. With reference to FIG. 25A, FIG. 25B, and FIG. 25C, arrangements of the body lower arms 142 and the ground units 184 are shown in which the ground units 184 are hollow and the body lower arms 142 are disposed within them, with the elastic deformation components 182 between them, as in FIG. 25A. In FIG. 25B, the body lower arms 142 are U-shaped and over the ground units 184, with one of the plurality of elastic deformation components 182 between them. In FIG. 25C, there are two of the plurality of body lower arms 142 shown, with one of the plurality of ground units 184 between them, and two of the plurality of elastic deformation components 182 disposed between the body lower arms 142 and the ground units 184. Despite the foregoing description of the plurality of lower arm distal ends 144 and the plurality of distal end 186 moving relatively away from each other exerting force on the elastic deformation components 182 which are extended by the force of the relative motion, the present disclosure may be implemented with the plurality of ground units 184 and the plurality of body lower arms 142 moving towards each other, such that the plurality of elastic deformation components 182 are compressed by the force of the relative motion, before returning elastically or otherwise to their original positions. Or, the present disclosure may be implemented with the plurality of ground units 184 and the plurality of body lower arms 142 moving with a shear motion past each other, such that the plurality of elastic deformation components 182 are sheared or stressed by the force of the relative motion, before returning elastically or otherwise to their original positions.

In the foregoing arrangements of the plurality of ground units 184 and the plurality of body lower arms 142, the plurality of ground units 184 and the plurality of body lower arms 142 may be situated with a single one of the plurality of ground units 184 below a single one of the plurality of body lower arms 142. In another aspect, the plurality of ground units 184 and the plurality of body lower arms 142 may be situated with a single one of the plurality of ground units 184 above a single one of the plurality of body lower arms 142. In another aspect, the plurality of ground units 184 and the plurality of body lower arms 142 may be situated with a single one of the plurality of ground units 184 to the inside (meaning towards the interior of the personal mobility system 110, that is, to the left of the right side 129) of a single one of the plurality of body lower arms 142. In another aspect, the plurality of ground units 184 and the plurality of body lower arms 142 may be situated with a single one of the plurality of ground units 184 to the outside (meaning towards the exterior of the personal mobility system 110, that is, to the left of the left side 128) of a single one of the plurality of body lower arms 142. In other aspects of the present disclosure, each of the plurality of ground units 184 may be partially hollow, and each of the plurality of body lower arms 142 may be disposed within the hollow portion of the respective one of the plurality of ground units 184, such that the one of the ground-main rotational joints 188 has the rotational attachment in the interior of the one of the plurality of ground units 184, and the one of the plurality of elastic deformation components 182 is within the hollow portion of the respective one of the plurality of ground units 184, wherein the one of the plurality of elastic deformation components 182 engages the one of the plurality of body lower arms 142.

Any of the foregoing references to a single one of the foregoing components will be understood as referring to any number of the respective components from the respective pluralities of components, as it is explicitly disclosed that any number of ground units 184 and any number of body lower arms 142 and any number of elastic deformation components 182 may comprise a particular one of the plurality of elastic stabilizer mechanisms 180. The foregoing reference to particular shape or relative arrangements of the plurality of ground units 184 and the plurality of body lower arms 142 is not meant to be exhaustive or exclusive, as other arrangements of the plurality of ground units 184 and the plurality of body lower arms 142 are possible and within the scope of the present disclosure. Such other possible arrangements include, but are not limited to, the plurality of ground units 184 being U-shaped in cross-section and the plurality of body lower arms 142 fitting in the U-shaped cavity; or vice-versa with the plurality of ground units 184 fitting in the U-shaped cavity of the plurality of body lower arms 142, which are U-shaped; or of the plurality of ground units 184 and the plurality of body lower arms 142 having a variety of shapes or configurations within a particular implementation of the personal mobility system 110. As will be apparent to one of skill in the art, any implementation of the personal mobility system 110 may comprise one or more of the plurality of elastic stabilizer mechanisms 180, and each of the plurality of elastic stabilizer mechanisms 180 used may be implemented in a different manner than any other of the plurality of elastic stabilizer mechanisms 180 in that personal mobility system 110.

The plurality of elastic deformation components 182 may comprise a torsion spring, a leaf spring, a hydraulic cylinder, or, as will be apparent to one of skill in the art, one or more of the foregoing or of any suitable component now known or later invented that may be elastically or compressibly deformed and return to its original position, shape, or aspect. Additionally, the plurality of elastic deformation components 182 of the plurality of elastic stabilizer mechanisms 180 may be affixed to the plurality of elastic stabilizer mechanisms 180 with a plurality of stabilizer attachment features 196 and may include a stabilizer-locking mechanism 198 for temporarily and reversibly preventing the motion or action of the plurality of elastic stabilizer mechanisms 180. While a torsion spring or leaf spring or compressive/extensive spring is hereby contemplated for use as the plurality of elastic deformation components 182, other components may be used as the plurality of elastic deformation components 182, including but not limited to a hinged connection, a spring connection, a locking connection and/or locking mechanism, a folding mechanism, a spring loaded mechanism, a lever, a differential adjustment mechanism, a bracket, an angular adjustment mechanism, an automated feature, any combination thereof, and the like, as will be apparent to one of skill in the art.

In other aspects of the present disclosure, the plurality of elastic stabilizer mechanisms 180 may be implemented independently of the personal mobility system 110. The components which the plurality of elastic stabilizer mechanisms 180 comprise may be built, manufactured, assembled, used, retrofitted, or otherwise implemented without some or all of the other components of the personal mobility system 110 disclosed herein. In such aspects of the present disclosure, the plurality of elastic stabilizer mechanisms 180 may be assembled as parts or components of other devices or apparatuses, including but not limited to: medical or personal care apparatuses including but not limited to a Hoyer lift; transportation items including but not limited to strollers, luggage carts, or shopping carts; construction or utility equipment including but not limited to forklifts, wheelbarrows, or ladders; or other types of apparatuses, collectively a desired apparatus. In such aspects of the present disclosure, the plurality of elastic stabilizer mechanisms 180 may be built with, affixed onto, or retrofitted onto a suitable component or part of the desired apparatus. The desired apparatus may have a component which is suitable to be used as the plurality of body lower arms 142, to be engaged with the remainder of the plurality of elastic stabilizer mechanisms 180. In other aspects of the desired apparatus, the desired apparatus may require, and may have built onto it, a suitable part or parts that may serve as the plurality of body lower arms 142, and thus to engage with the plurality of elastic stabilizer mechanisms 180.

In one aspect, the plurality of elastic stabilizer mechanisms 180 is configured to provide the ability for the plurality of elevation assistance components 150 to move away from and return to close proximity with the main body 120. In this aspect, the plurality of elastic stabilizer mechanisms 180 provides for a means for the plurality of elevation assistance components 150 to engage and disengage with the floor. By providing a plurality of elastic stabilizer mechanisms 180, which connects the plurality of elevation assistance components 150 to the main body 120, the plurality of elevation assistance components 150 can engage the ground and/or floor in a way that stabilizes a user 300 during the standing and/or sitting action.

After standing or sitting is completed by a user 300, the user 300 can operate, meaning move with, the personal mobility system 110, which will aid in movement. However, in the arrangement shown, as one example, it is undesirable for the plurality of elevation assistance components 150 to be engaged with the ground during movement and operation of the personal mobility system 110. For this reason, and in the arrangement shown as one example, the plurality of elastic stabilizer mechanisms 180 causes the plurality of ground support components 170 to be released from the ground and lifted vertically so as to engage in close proximity with the main body.

In the arrangement described and shown, as one example, the plurality of elastic stabilizer mechanisms 180 comprises the plurality of elastic deformation components 182. The plurality of elastic deformation components 182 may comprise a torsion spring, a leaf spring, a hydraulic cylinder, or, as will be apparent to one of skill in the art, one or more of the foregoing or of any suitable component now known or later invented that may be elastically or compressibly deformed and return to its original position, shape, or aspect. In this way, the plurality of elevation assistance components 150 can be repeatedly locked and removed from the locked position with ease. Additionally, the plurality of elastic deformation components 182 of the plurality of elastic stabilizer mechanisms 180 may be held in place with a plurality of stabilizer attachment features 196 and may include a stabilizer-locking mechanism 198 for locking the plurality of elevation assistance components 150 in place relative to the main body 120. While a torsion spring or leaf spring or compressive/extensive spring is hereby contemplated for use as the plurality of elastic deformation components 182, other components may be used as the plurality of elastic deformation components 182, including but not limited to a hinged connection, a spring connection, a locking connection and/or locking mechanism, a folding mechanism, a spring loaded mechanism, a lever, a differential adjustment mechanism, a bracket, an angular adjustment mechanism, an automated feature, any combination thereof, and the like, as will be apparent to one of skill in the art.

In the arrangement shown, as one example, the plurality of elastic stabilizer mechanisms 180 consists of two mechanisms, one located on each side of the personal mobility system 110. However, other numbers of the plurality of elastic stabilizer mechanisms 180 are hereby contemplated for use. A plurality of elastic stabilizer mechanisms 180, even if only one is implemented in the personal mobility system 110, may be utilized to extend and retract the plurality of elevation assistance components 150. The plurality of elastic stabilizer mechanisms 180 might also include three extension mechanisms, four extension mechanisms, five extension mechanisms, or the like. Additionally, the system may not require an extension mechanism due to the angle of attachment of the ground support. In an alternative embodiment the physics of pulling the plurality of elevation assistance components 150 engages the plurality of ground support components 170 without the need for a plurality of elastic stabilizer mechanisms 180.

Telescoping Handle Mechanism.

Figure 21:
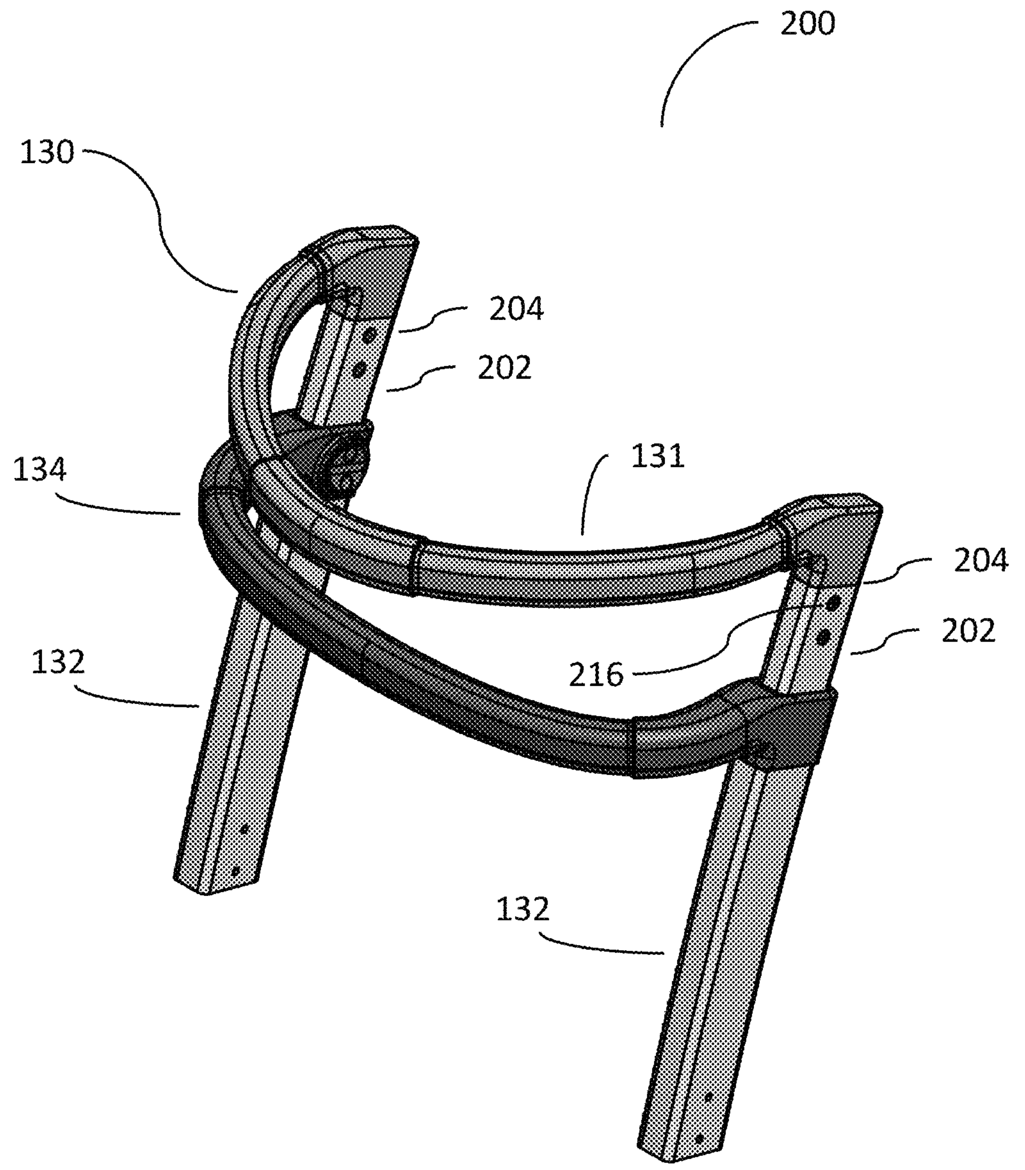
FIG. 21 shows a front and side perspective view of a selected portion of an aspect of the apparatus of the present disclosure.
Figure 22:
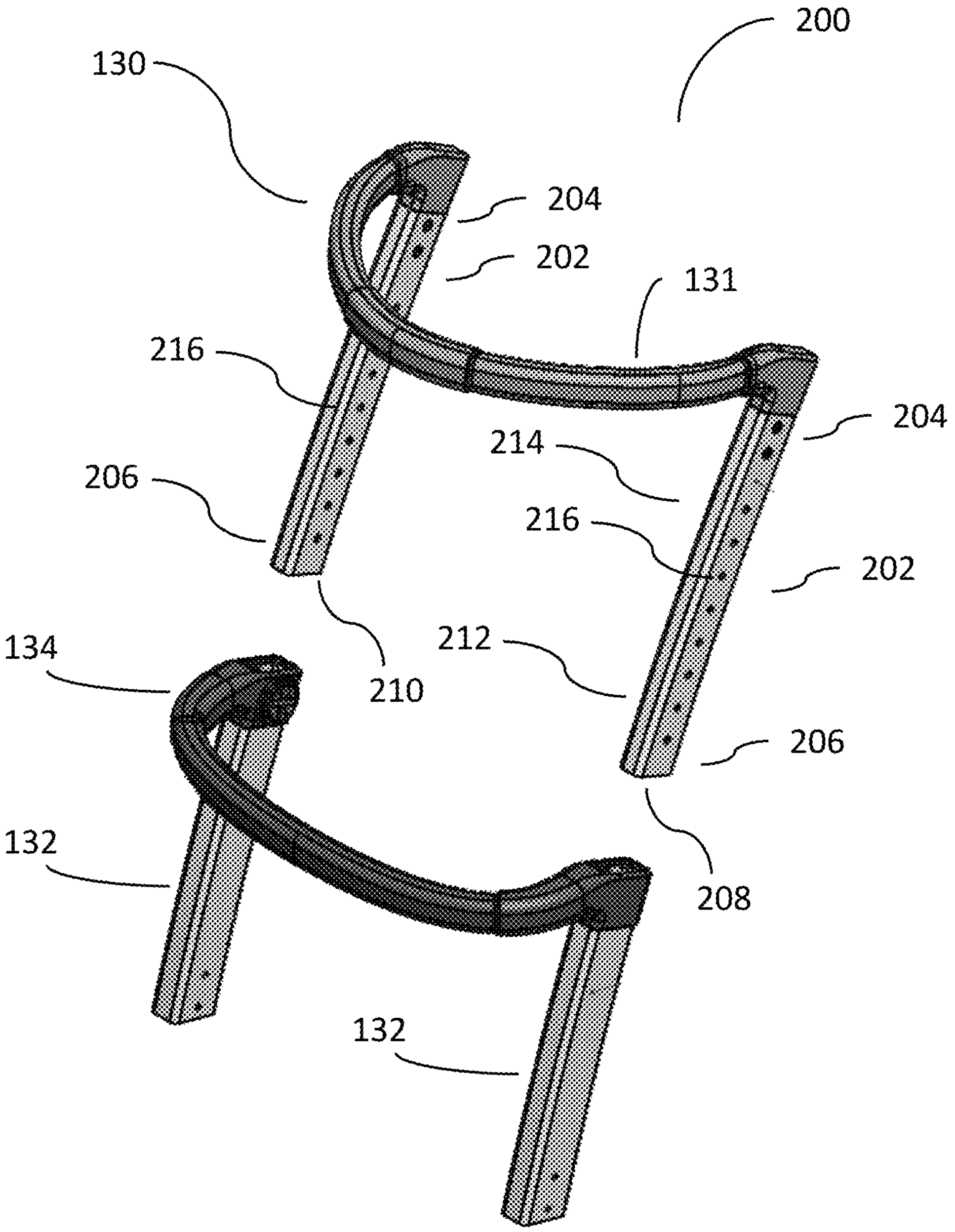
FIG. 22 shows an exploded front and side perspective view of a selected portion of an aspect of the apparatus of the present disclosure.
Figure 23:
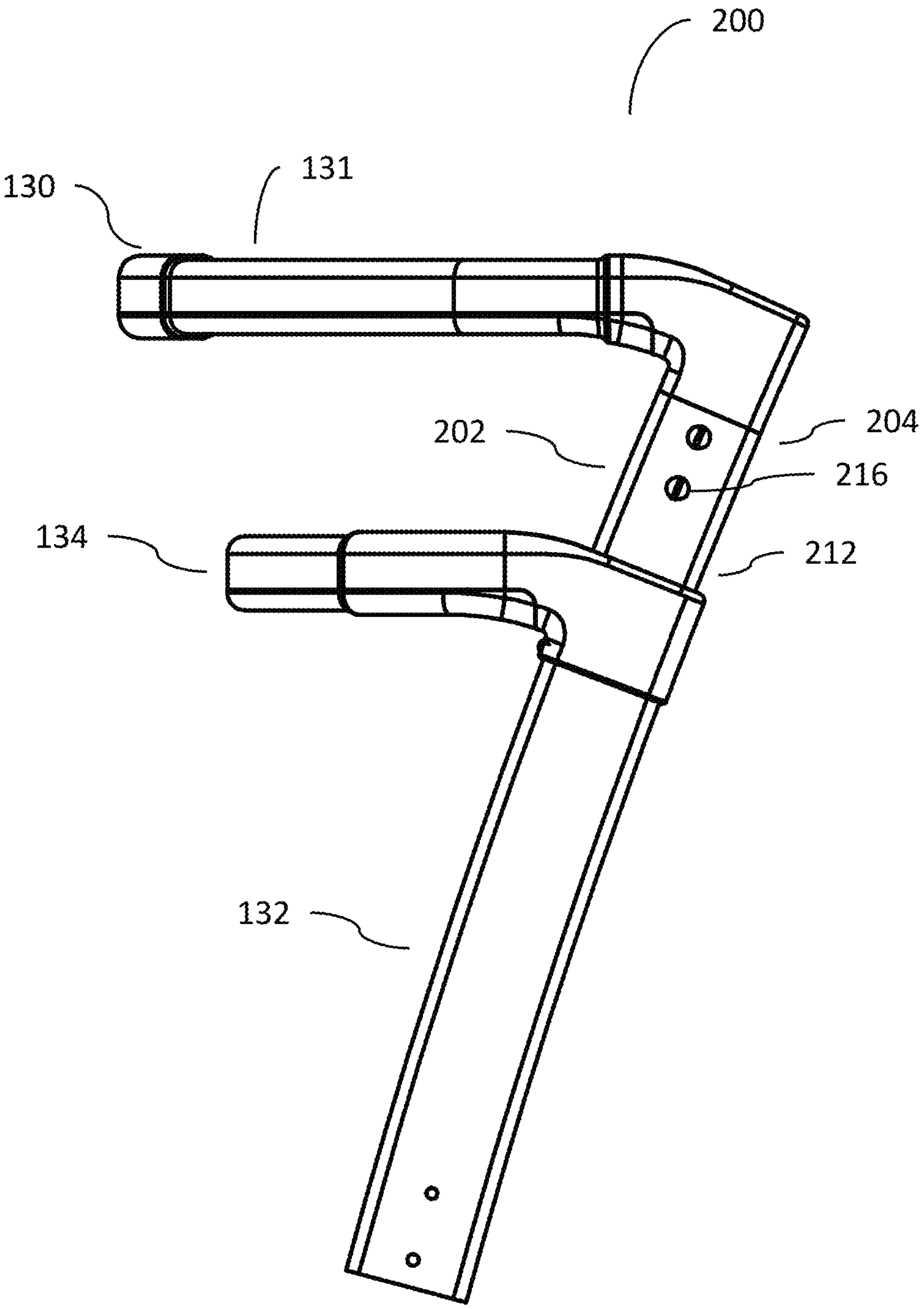
FIG. 23 shows a side elevation view of a selected portion of an aspect of the apparatus of the present disclosure.
Figure 24:
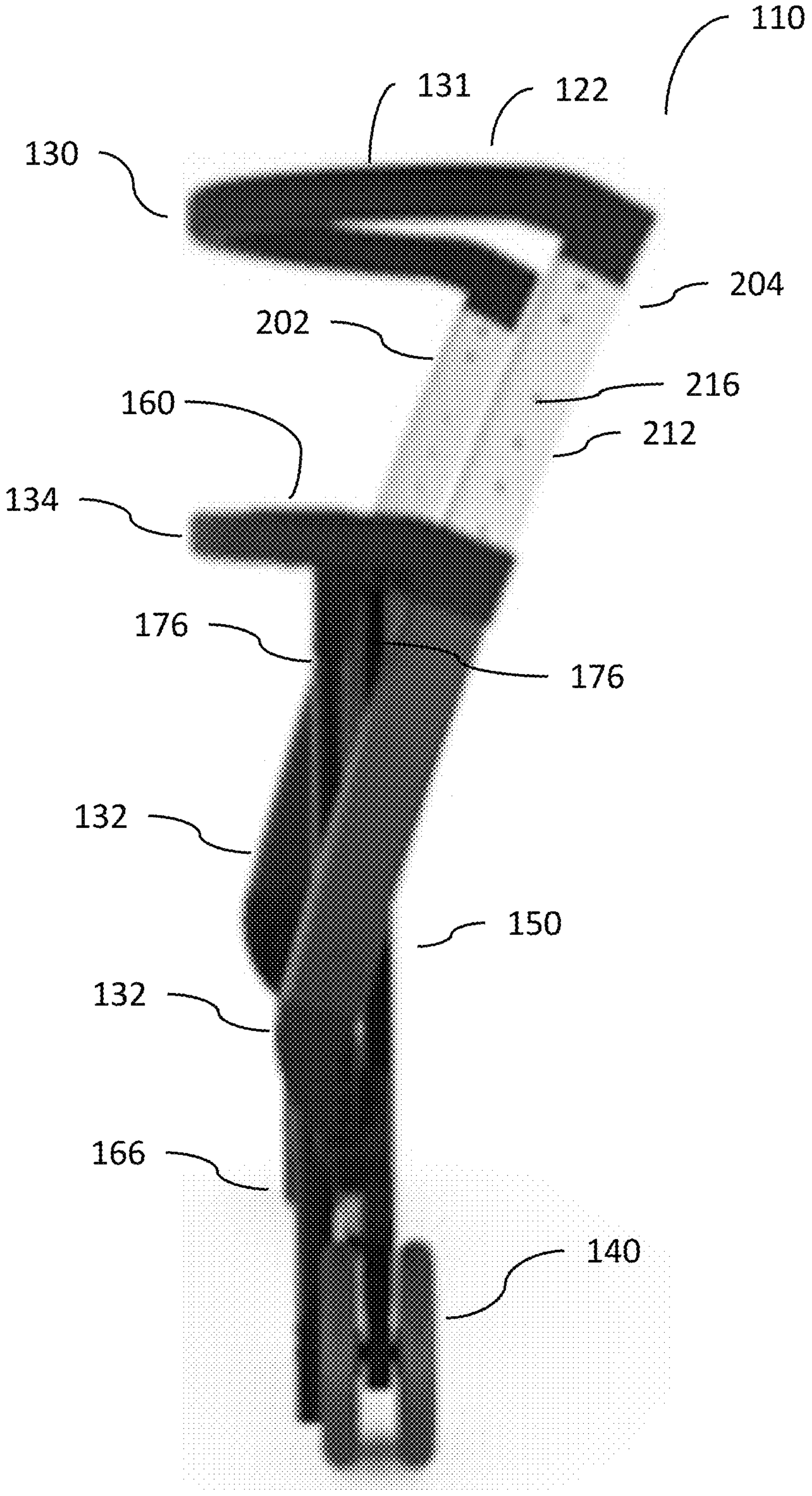
FIG. 24 shows a side perspective view of an aspect of the apparatus of the present disclosure.

In the arrangement shown, as one example, with reference to FIG. 21, FIG. 22, and FIG. 23, the personal mobility system 110 may also include a telescoping handle mechanism 200, or a plurality of telescoping handle mechanisms 200 (also referred to herein as a "telescoping system" or an "adjustable handle system"). The telescoping handle mechanism 200 may be formed of any suitable size, shape, and design and is configured to provide an adjustable feature to the present system such that the system can be comfortably and efficiently used and engaged by users of various heights and sizes, and the like.

In the arrangement shown, particularly with reference to with reference to FIG. 21, FIG. 22, and FIG. 23, the telescoping handle mechanism 200 allows reversible raising and/or lowering of any of the plurality of main handles 130 of the main body 120, and or the telescoping handle mechanism 200 allows reversible raising and/or lowering of any of the plurality of plurality of elevation handles 160. The telescoping handle mechanism 200, or a plurality of telescoping handle mechanisms 200 where more than one telescoping handle mechanism 200 is implemented in the personal mobility system 110, may be used to reversibly raise and/or lower any of the plurality of main handles 130 and/or any of the plurality of elevation handles 160, whether the plurality of elevation handles 160 is comprised as part of the main body 120 and/or as part of the elevation assistance components 150. The telescoping handle mechanism 200 may be used with any of the foregoing any of the plurality of main handles 130 and/or any of the plurality of elevation handles 160 individually, or in sets of one or more of the foregoing any of the plurality of main handles 130 and/or any of the plurality of elevation handles 160. In this way, the telescoping handle mechanism 200 provides a means for raising the height so a taller user can safely and comfortably engage with the personal mobility system 110. Said another way, the telescoping handle mechanism 200 provides for a means of lowering at least some of the plurality of main handles 130 of the main body 120 so that a user 300 who is shorter, or a user 300 with a lower grip point desired by the user 300, can safely and comfortably engage with the personal mobility system 110.

In the arrangement shown, as one example, the telescoping system comprises telescoping supports 202. The telescoping supports 202 may be approximately rectangular in cross-section, and may be hollow. The telescoping supports 202 may fit within the vertical main supports 132 and extend upwards out of the vertical main supports 132 below, wherein the vertical main supports 132 are partially hollow, advantageously. In this way, the telescoping supports 202 can extend or retract, sliding into and out of the vertical main supports 132, which are advantageously hollow or partially hollow, in this aspect of the vertical main supports 132. While rectangular metal rods are hereby contemplated for use as the telescoping supports 202, cylindrical rods and the like are also hereby contemplated. Additionally, the telescoping supports 202 may be coated of and/or made with a material which has friction reducing properties, so that the telescoping handle mechanism 200 can be easily adjusted and regularly adjusted if desired by a user 300. This is especially useful in applications where a user 300 may share a device implementing the personal mobility system 110 with another person or people, and wish to make quick changes to the personal mobility system 110.

In the arrangement shown, as one example, with reference to FIG. 21, FIG. 22, and FIG. 23, the telescoping handle mechanism 200 extends from a top end 204 where the telescoping handle mechanism 200 connects to the plurality of main handles 130, to a bottom end 206, wherein the bottom end 206 of the telescoping handle mechanism 200 frictionally fits within the main body 120 of the personal mobility system 110, specifically within the vertical main supports 132 wherein the vertical main supports 132 are hollow. Additionally, the telescoping handle mechanism 200 comprises a hollow interior 208 for the purpose of material savings, weight reduction, and the like, and additionally for the adjustable features to be further discussed herein. The telescoping handle mechanism 200 comprises an interior surface 210 and an exterior surface 212. In this way and along the interior surface 210 and/or along the exterior surface 212, the telescoping handle mechanism 200 comprises a plurality of attachment features 214.

In the arrangement shown, as one example, and with reference to FIG. 21, FIG. 22, and FIG. 23, the telescoping handle mechanism 200 may comprise a plurality of adjustment features 216. The plurality of adjustment features 216 may be formed of any suitable size, shape, and design, and are configured to allow a user 300 to easily and securely and reversibly set the telescoping handle mechanism 200, and thus the main handles 130, at different heights. In the arrangement shown, as one example, the adjustment features 216 comprise push button locks. The push button locks (or push button inserts) are comprised in the adjustment features 216 for a plurality of buttons, and corresponding holes are comprised in the vertical main supports 132, within which the buttons fit, within close and tight tolerances, as will be apparent to one of skill in the art. The buttons comprising the adjustment features 216 in this aspect of the adjustment features 216 are equipped with a resistance and are depressed or forced toward the hollow interior 208 of the telescoping supports 202 and the hollow interior of the vertical main supports 132, such that a user can slide the telescoping supports 202 up and down until the buttons are clicked into a hole at a desired height and/or desired location. The adjustment features 216 described herein are hereby contemplated for use, and the adjustment features 216 may comprise other types of components. For example, without limitation, the adjustment features 216 may also comprise clamps, pins, hinges, frictional fits, steps, levels, locking systems, snap buttons, clip systems or sync systems, spin screw system such as a wing nut or the like, and other mechanisms for the adjustment features 216 now known or later invented which allow for adjusting and securely fastening the telescoping supports 202.

These and other adjustable height features and systems are hereby contemplated for use. It will be appreciated by those skilled in the art that a user may wish to adjust a handle height and/or a handle location. Various systems may be adapted to achieve the handle height, tilt, or other variable locations for the handle for both the convenience and safety of a user who is engaging with the personal mobility system 110.

In Operation.

As one example, and in the arrangement shown, a personal mobility system is shown. The disclosure herein also considers methods of using these systems and features. In one aspect of the present disclosure, and with reference to FIG. 24, the personal mobility system 110 may be foldable, such that the plurality of elevation assistance components 150, and/or the plurality of ground support components 170, and/or the plurality of locomotion components 140, and/or selected components of the main body 120, fold. In this way, the useability and transportability of the personal mobility system 110 of the present disclosure is improved. In addition, and with further reference to FIG. 32, the personal mobility system 110 may be stable vertically while folded, and may roll in any direction with a zero-turning radius while folded. As discussed previously herein, these are significant improvements in the useability, convenience, and practicality of the system of the present disclosure, in both motion and movement for the user 300, and for storage of the apparatus, and moving the apparatus. Additionally, and in alternative embodiments the personal mobility system may be used with other systems, and may incorporate other systems therein.

It will be appreciated by those skilled in the art that other various modifications could be made to the device without parting from the spirit and scope of this disclosure. All such modifications and changes fall within the scope of the claims and are intended to be covered thereby.

Accordingly, what is claimed is:

1. A personal mobility system, the personal mobility system comprising a main body, wherein the main body further comprises a plurality of vertical main supports and wherein the main body further comprises a plurality of body lower arms, wherein each of the plurality of body lower arms comprises a lower arm proximal end and a lower arm distal end; and the personal mobility system comprising a plurality of elastic stabilizer mechanisms, wherein the plurality of elastic stabilizer mechanisms further comprises a plurality of elastic deformation components, a plurality of ground-elastic attachment components, a plurality of ground units, and a plurality of ground-main rotational joints; and wherein each of the plurality of ground units comprises a ground unit proximal end and a ground unit distal end;

and wherein each of the plurality of ground units and the plurality of body lower arms engage together in an approximate area of their respective proximal ends, forming and being engaged together at and with a plurality of ground-main rotational joints;

and wherein each of the plurality of ground units and the plurality of body lower arms engage together in an approximate area of their respective distal ends, at or with the plurality of elastic deformation components.

2. The personal mobility system of claim 1, in which the personal mobility system further comprises a plurality of elevation assistance components; wherein the plurality of elevation assistance components further comprises a plurality of vertical elevation supports and further comprises a plurality of elevation handles.

3. The personal mobility system of claim 2, in which the main body further comprises a plurality of main handles, and wherein the plurality of main handles further comprises a plurality of primary grip regions.

4. The personal mobility system of claim 3, in which the personal mobility system further comprises a plurality of telescoping handle mechanisms, and wherein the plurality of telescoping handle mechanisms may adjust at least one position of the plurality of main handles and/or the plurality of elevation handles.

5. The personal mobility system of claim 2, in which the plurality of elevation assistance components further comprises a plurality of ground support components.

6. The personal mobility system of claim 1, in which the main body further comprises a plurality of ground support components.

7. The personal mobility system of claim 1, in which the personal mobility system further comprises a plurality of locomotion components.

8. A personal mobility system, comprising: a main body, wherein the main body further comprises a plurality of vertical main supports; a plurality of elevation assistance components, wherein the plurality of elevation assistance components further comprises a plurality of vertical elevation supports and further comprises a plurality of elevation handles; and a plurality of elastic stabilizer mechanisms; and in which the personal mobility system further comprises a seat, wherein the seat is rotatably affixed to the main body at a plurality of seat attachments.

9. A personal mobility system, comprising: a main body, wherein the main body further comprises a plurality of vertical main supports; a plurality of elevation assistance components, wherein the plurality of elevation assistance components further comprises a plurality of vertical elevation supports and further comprises a plurality of elevation handles; and a plurality of elastic stabilizer mechanisms; and in which the plurality of elevation assistance components further comprises a plurality of ground support components.

10. A personal mobility system, comprising: a main body wherein the main body further comprises a plurality of vertical main supports; a plurality of elevation assistance components, wherein the plurality of elevation assistance components further comprises a plurality of vertical elevation supports and further comprises a plurality of elevation handles; and a plurality of elastic stabilizer mechanisms; and in which the plurality of elastic stabilizer mechanisms further comprises a plurality of elastic deformation components, a plurality of ground-elastic attachment components, a plurality of ground units, and a plurality of ground-main rotational joints; and wherein each of the plurality of ground units comprises a ground unit proximal end and a ground unit distal end; and wherein the main body further comprises a plurality of body lower arms, wherein each of the plurality of body lower arms comprises a lower arm proximal end and a lower arm distal end; and wherein each of the plurality of ground units and the plurality of body lower arms engage together in an approximate area of their respective distal ends, at or with the plurality of elastic deformation components.

11. A personal mobility system, comprising:

a main body, wherein the main body further comprises a plurality of vertical main supports and wherein the main body further comprises a plurality of body lower arms, wherein each of the plurality of body lower arms comprises a lower arm proximal end and a lower arm distal end; and wherein the main body further comprises a plurality of main handles;

a plurality of elastic stabilizer mechanisms, wherein the plurality of elastic stabilizer mechanisms further comprises a plurality of elastic deformation components, a plurality of ground-elastic attachment components, a plurality of ground units, and a plurality of ground-main rotational joints; and wherein each of the plurality of ground units comprises a ground unit proximal end and a ground unit distal end; and a plurality of elevation assistance components; wherein the plurality of elevation assistance components further comprises a plurality of vertical elevation supports and further comprises a plurality of elevation handles.

12. The personal mobility system of claim 11, in which the personal mobility system further comprises a plurality of telescoping handle mechanisms, and wherein the plurality of telescoping handle mechanisms may adjust at least one position of the plurality of main handles and/or the plurality of elevation handles.

13. A personal mobility system, comprising:

a main body, wherein the main body further comprises a plurality of vertical main supports;

a plurality of elevation assistance components; wherein the plurality of elevation assistance components further comprises a plurality of vertical elevation supports and further comprises a plurality of elevation handles; and a plurality of main-elevation-horizontal-supports, wherein the plurality of main-elevation-horizontal-supports affix the plurality of vertical main supports and the plurality of vertical elevation supports to each other.

14. The personal mobility system of claim 13, wherein the personal mobility system can fold, and wherein when the personal mobility system is folded, the personal mobility system is vertically stable.

15. The personal mobility system of claim 13, wherein the personal mobility system further comprises a plurality of locomotion components; and wherein the personal mobility system can fold, and wherein when the personal mobility system is folded, the personal mobility system can roll on the plurality of locomotion components with a zero-turning radius.

16. The personal mobility system of claim 13, wherein the plurality of main-elevation-horizontal-supports further comprise a plurality of elastic stabilizer mechanisms.

17. The personal mobility system of claim 13, wherein the personal mobility system further comprises a plurality of braking components; and wherein the plurality of braking components comprises a plurality of handbrake levers, a plurality of handbrake cables, and a plurality of brake shoes.

18. The personal mobility system of claim 13, wherein the personal mobility system further comprises a plurality of horizontal main supports.

19. The personal mobility system of claim 18, wherein the personal mobility system further comprises a seat, and wherein the seat is rotatably affixed to the plurality of horizontal main supports with a plurality of seat attachments, such that the seat can be raised to an upright position and can be lowered to a horizontal position, and wherein the seat folds to a vertical or stowed position by being rotated towards a front of the personal mobility system.

* * * * *